(12) United States Patent
Hatanaka et al.

(10) Patent No.: US 11,595,519 B2
(45) Date of Patent: Feb. 28, 2023

(54) ELECTRONIC APPARATUS AND PROCESSING SYSTEM

(71) Applicant: KYOCERA Corporation, Kyoto (JP)

(72) Inventors: Akihito Hatanaka, Yokohama (JP); Tomoki Iwaizumi, Osaka (JP); Youji Hamada, Kyoto (JP); Hisae Honma, Yokohama (JP); Kousuke Nagase, Yokohama (JP); Tomohiro Sudou, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 219 days.

(21) Appl. No.: 17/074,859

(22) Filed: Oct. 20, 2020

(65) Prior Publication Data
US 2021/0037134 A1 Feb. 4, 2021

Related U.S. Application Data

(63) Continuation of application No. PCT/JP2019/005357, filed on Feb. 14, 2019.

(30) Foreign Application Priority Data

Apr. 25, 2018 (JP) ............... JP2018-084153

(51) Int. Cl.
*H04M 3/42* (2006.01)
*H04M 3/02* (2006.01)
*H04W 4/02* (2018.01)

(52) U.S. Cl.
CPC ......... *H04M 3/42365* (2013.01); *H04M 3/02* (2013.01); *H04W 4/027* (2013.01)

(58) Field of Classification Search
CPC ............... H04M 3/42365; H04M 3/02; H04M 2250/12; H04M 2242/14; H04M 3/38;
(Continued)

(56) References Cited

U.S. PATENT DOCUMENTS 9,730,181 B1 * 8/2017 Matsumoto .......... H04B 1/3833
2010/0216509 A1 * 8/2010 Riemer ............. H04M 1/72463
455/557
(Continued)

FOREIGN PATENT DOCUMENTS

JP H07-250132 A 9/1995
JP 2001-119749 A 4/2001
(Continued)

OTHER PUBLICATIONS

Tchankue, Patrick, Janet Wesson, and Dieter Vogts. "The impact of an adaptive user interface on reducing driver distraction." Proceedings of the 3rd international conference on automotive user interfaces and interactive vehicular applications. 2011. (Year: 2011).*

(Continued)

*Primary Examiner* — Sharad Rampuria
(74) *Attorney, Agent, or Firm* — Studebaker & Brackett PC

(57) ABSTRACT

An electronic apparatus and a processing system are disclosed. In one embodiment, an electronic apparatus is an electronic apparatus to be operated by a first user. The electronic apparatus comprises a communication unit and at least one processor. The communication unit is configured to acquire first information related to an other-party apparatus. The at least one processor is configured to determine a movement state of a second user of the other-party apparatus, based on the first information. The at least one processor performs processing based on the determined movement state, in response to a place call command from the first user regarding first phone communication with the other-party apparatus.

19 Claims, 34 Drawing Sheets

(58) Field of Classification Search
CPC .... H04M 1/00; H04M 11/00; H04M 1/72436; H04W 4/027; H04W 4/12; H04W 4/14; G01S 5/01; G01S 5/0249; G01S 5/0246; G01S 5/0244; G01S 5/02; G01S 5/019; G01S 5/018; G01S 5/017; G01S 5/016; G01S 5/015; G01S 5/013; G01S 5/011; G01S 5/012; G01S 5/014; H04L 51/38
See application file for complete search history.

(56) References Cited

U.S. PATENT DOCUMENTS

| | | | |
|---|---|---|---|
| 2010/0233998 A1* | 9/2010 | Saito | H04M 1/6075 455/412.2 |
| 2012/0295645 A1* | 11/2012 | Yariv | H04W 4/12 455/466 |
| 2013/0072172 A1 | 3/2013 | Chang et al. | |
| 2013/0316746 A1 | 11/2013 | Miller et al. | |
| 2014/0113619 A1* | 4/2014 | Tibbitts | G01C 21/3697 455/419 |
| 2016/0050315 A1 | 2/2016 | Malhotra et al. | |
| 2017/0126888 A1 | 5/2017 | Li et al. | |
| 2018/0015376 A1* | 1/2018 | Matsumoto | H04M 1/72463 |
| 2019/0159166 A1* | 5/2019 | Aggarwal | H04L 67/535 |
| 2020/0178157 A1* | 6/2020 | Silver | H04W 48/04 |
| 2021/0092220 A1* | 3/2021 | Pandurangarao | B60R 16/023 |

FOREIGN PATENT DOCUMENTS

| | | |
|---|---|---|
| JP | 2005-341476 A | 12/2005 |
| JP | 2006-211107 A | 8/2006 |
| JP | 2008-252196 A | 10/2008 |
| JP | 2009-239586 A | 10/2009 |
| JP | 2016-042692 A | 3/2016 |
| JP | 2018-501747 A | 1/2018 |
| WO | 2013-124944 A1 | 8/2013 |

OTHER PUBLICATIONS

Lei, Hui, and Anand Ranganathan. "Context-aware unified communication." IEEE International Conference on Mobile Data Management, 2004. Proceedings. 2004. IEEE, 2004. (Year: 2004).*

* cited by examiner

F I G. 1
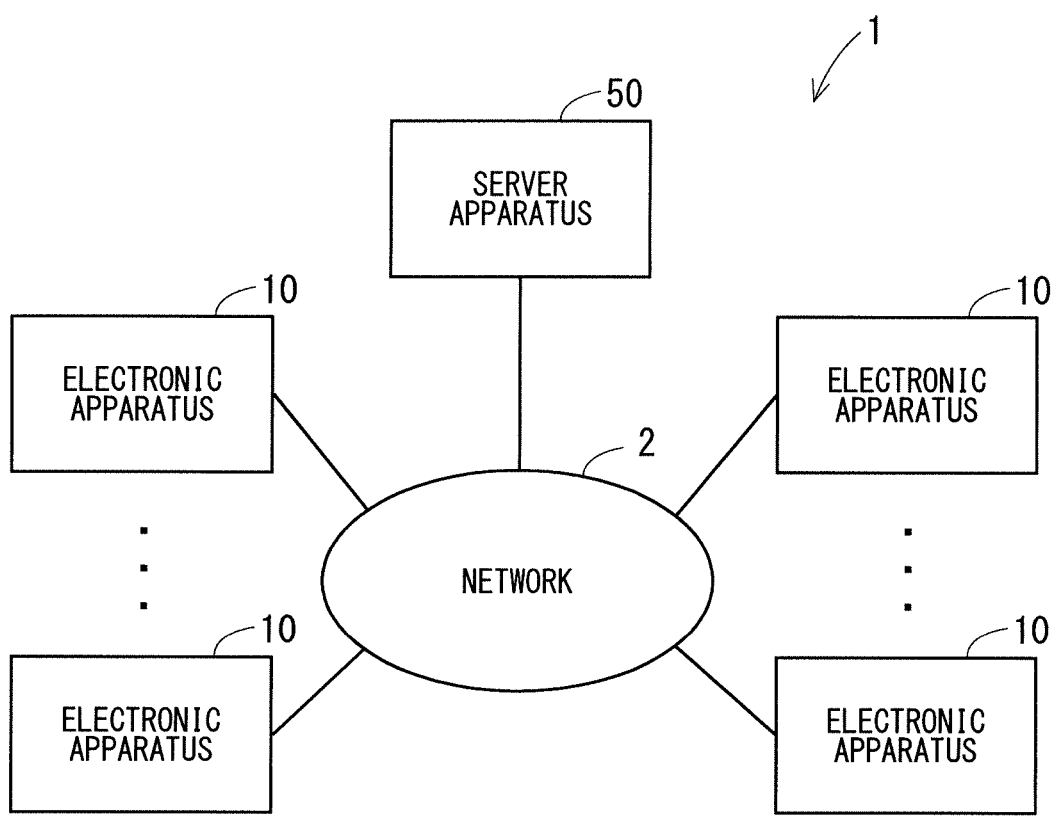

F I G. 7
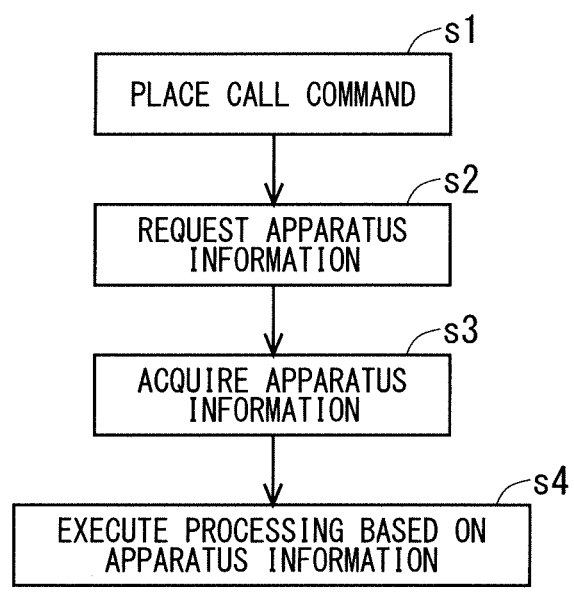

F I G. 1 1
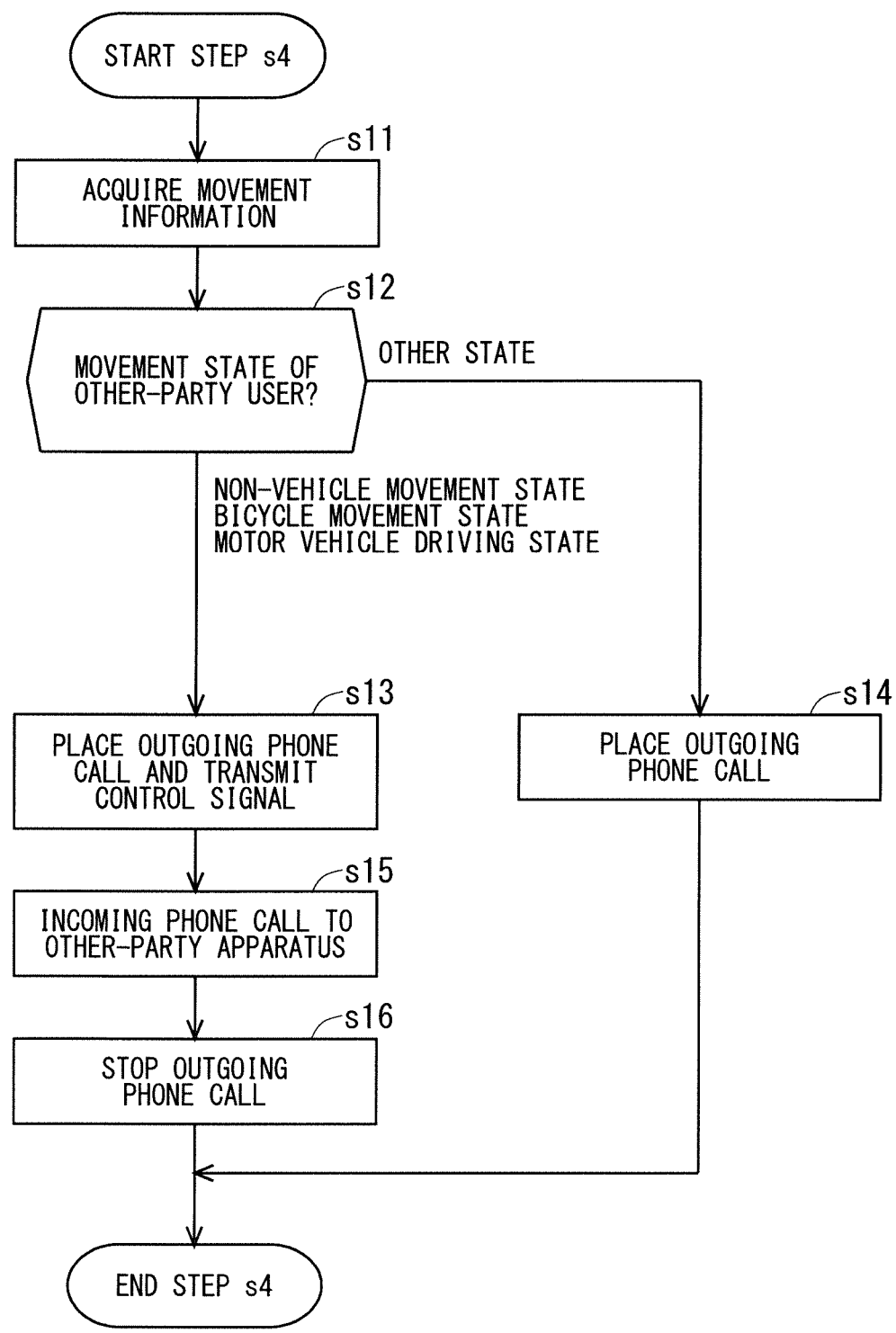

F I G. 1 5
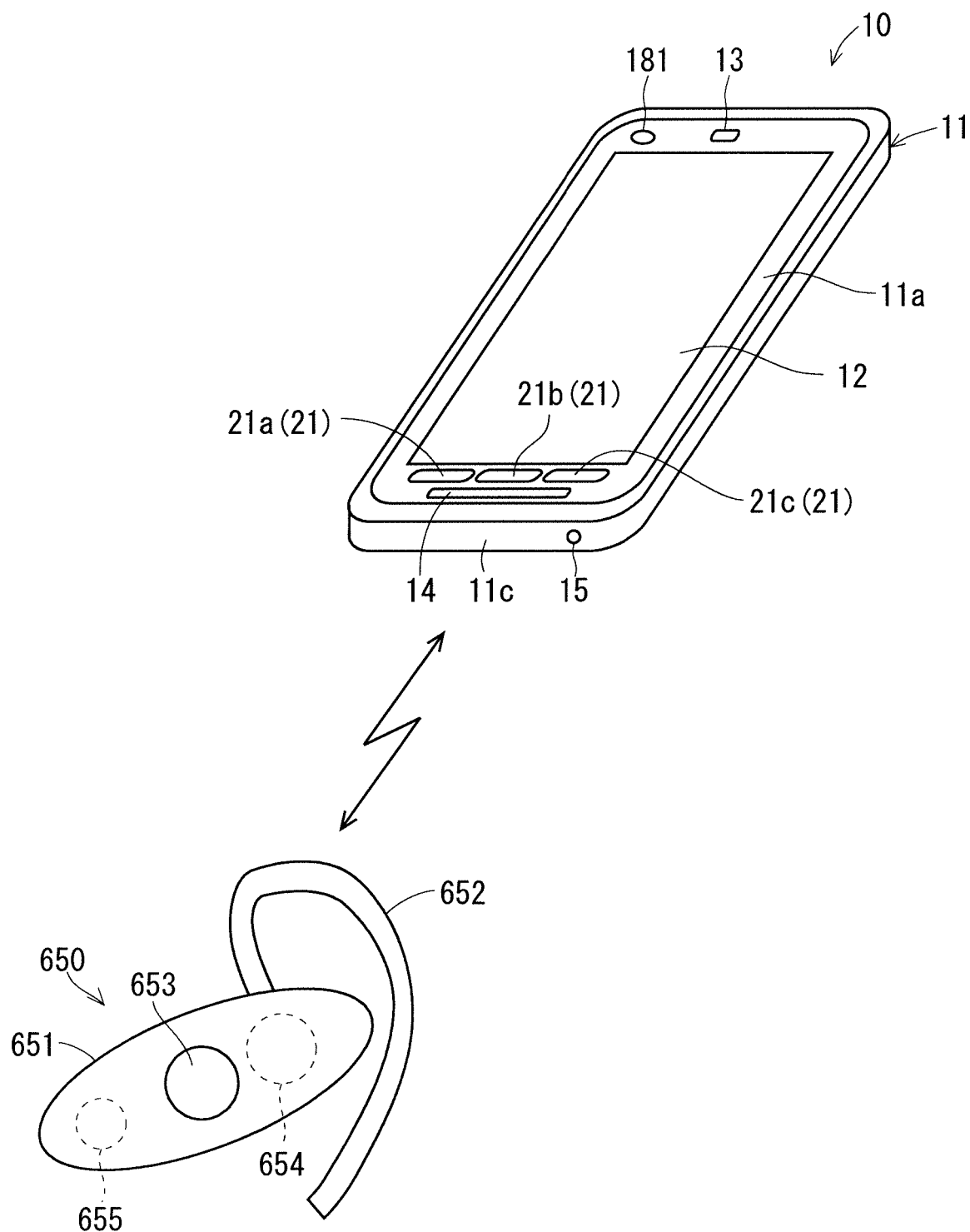

F I G. 2 0
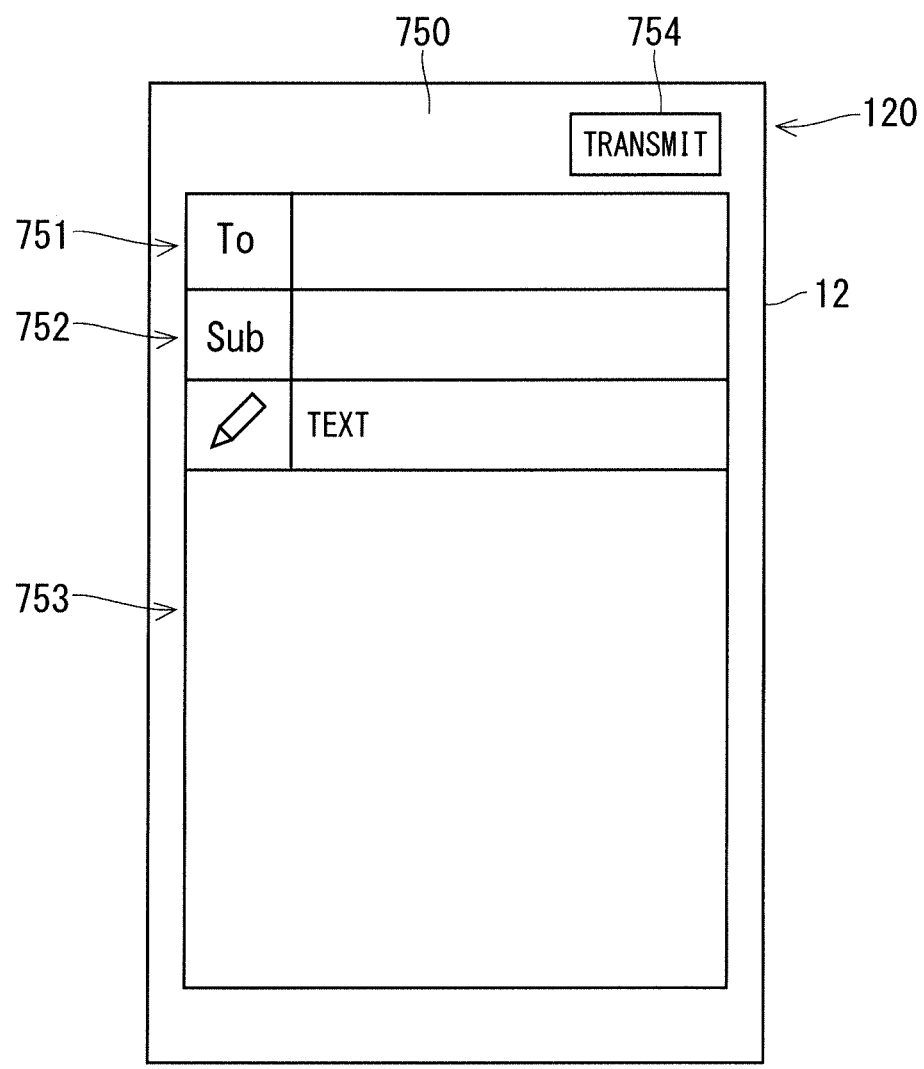

F I G. 2 3
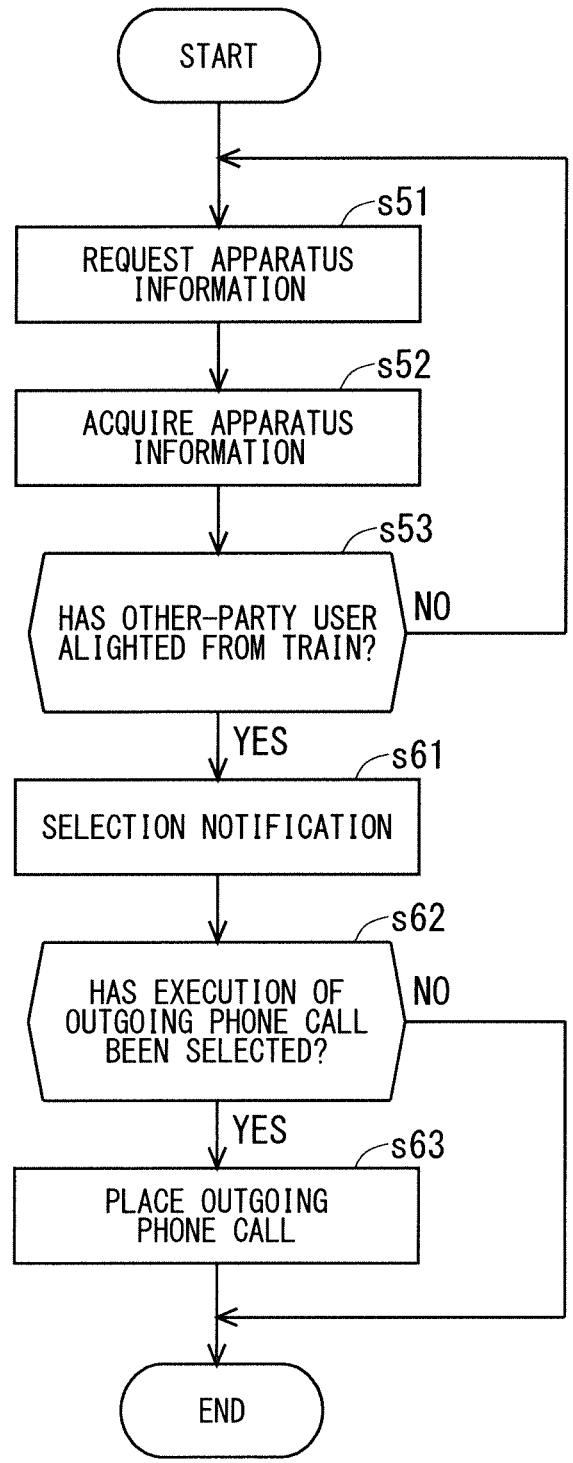

F I G. 2 8
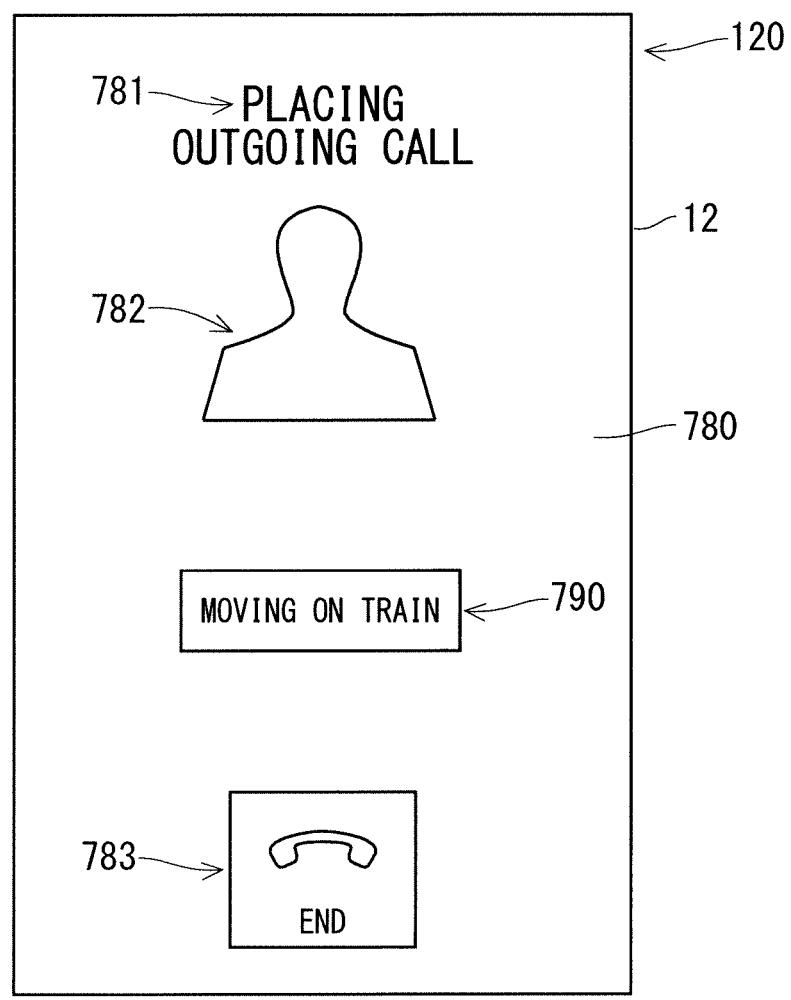

F I G. 2 9
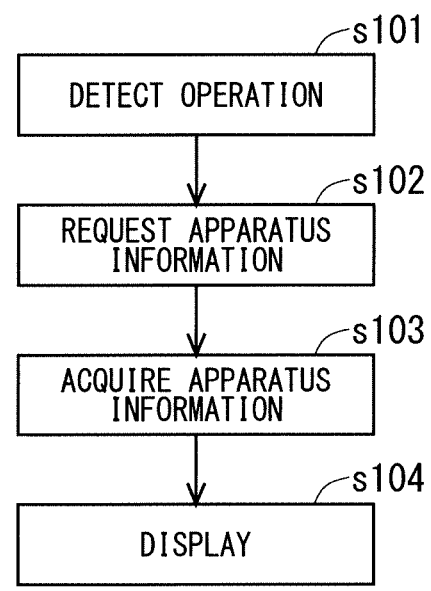

F I G. 3 1
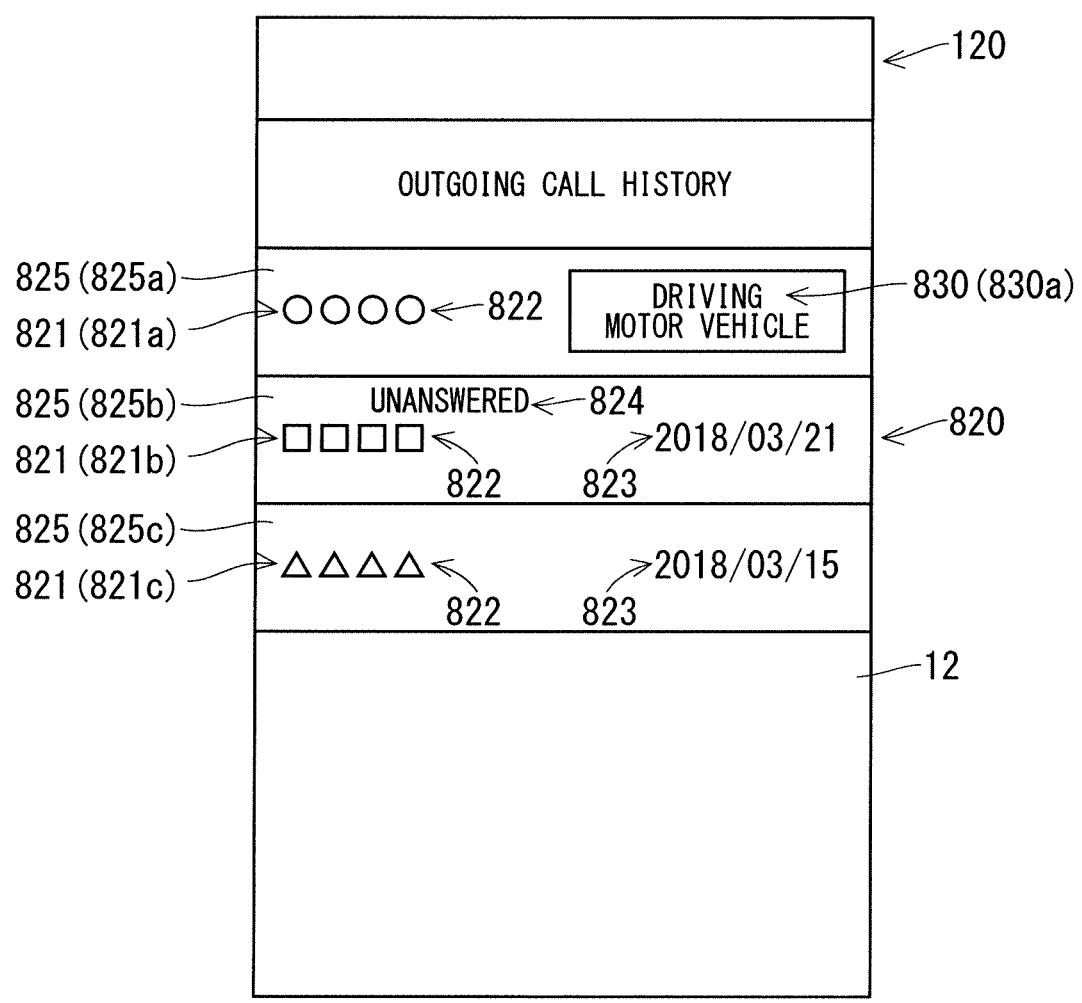

F I G. 3 2
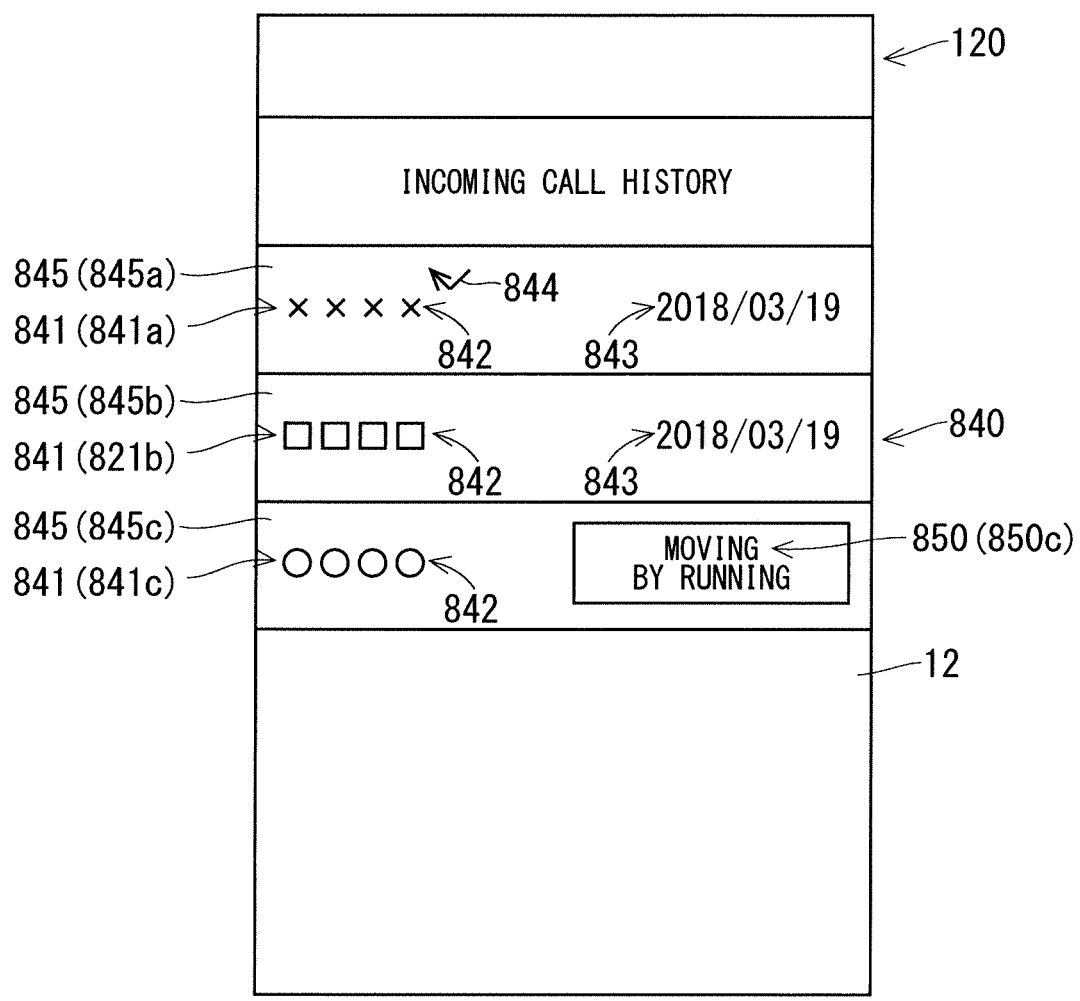

F I G. 3 4
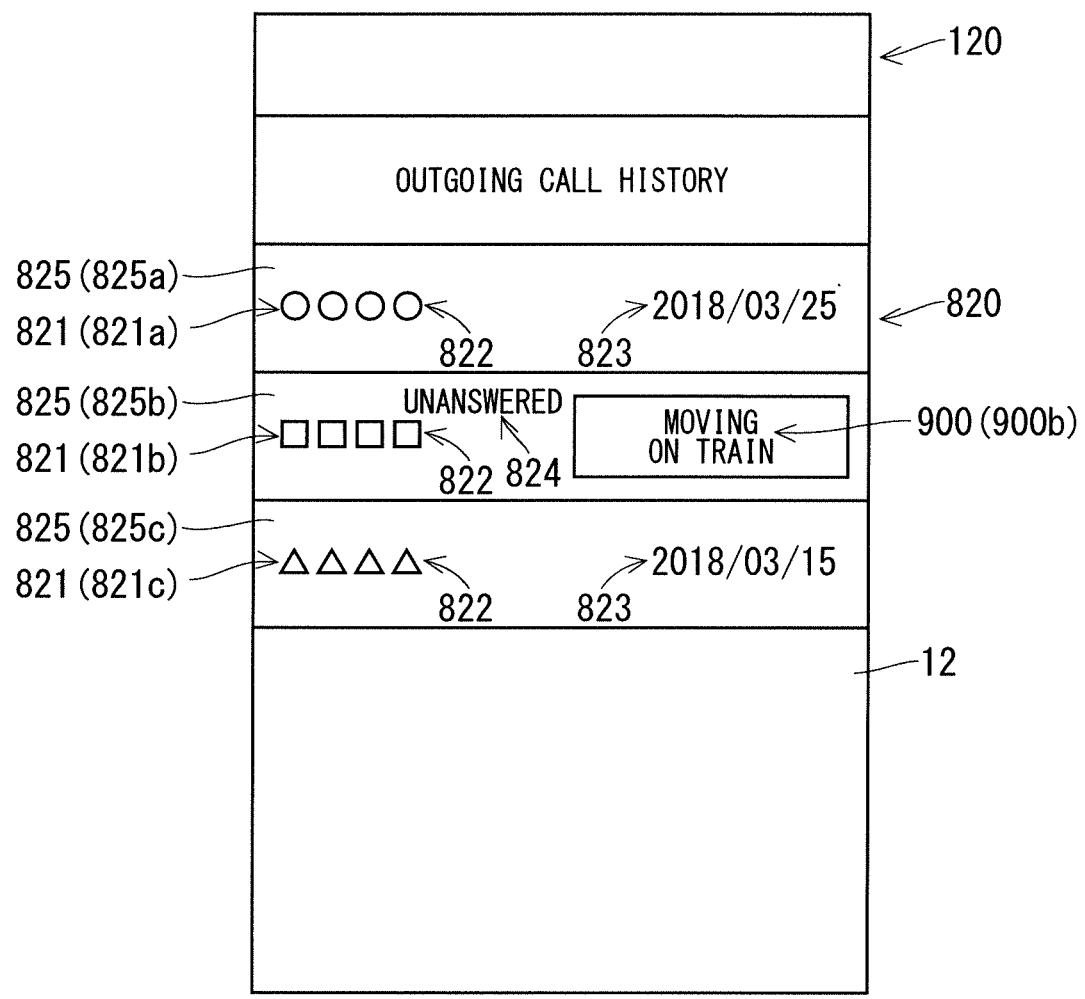

ELECTRONIC APPARATUS AND PROCESSING SYSTEM

CROSS-REFERENCE TO RELATED APPLICATION

The present application is a continuation based on PCT Application No. PCT/JP2019/005357 filed on Feb. 14, 2019, which claims the benefit of Japanese Application No. 2018-084153, filed on Apr. 25, 2018. PCT Application No. PCT/JP2019/005357 is entitled "ELECTRONIC DEVICE AND PROCESSING SYSTEM", and Japanese Application No. 2018-084153 is entitled "ELECTRONIC APPARATUS AND PROCESSING SYSTEM". The content of which are incorporated by reference herein in their entirety.

FIELD

Embodiments of the present disclosure relate generally to an electronic apparatus.

BACKGROUND

Various technologies have been proposed regarding an electronic apparatus.

SUMMARY

An electronic apparatus and a processing system are disclosed. In a first embodiment, an electronic apparatus is an electronic apparatus to be operated by a first user. The electronic apparatus comprises a communication unit and at least one processor. The communication unit is configured to acquire first information related to an other-party apparatus. The at least one processor is configured to determine a movement state of a second user of the other-party apparatus, based on the first information. The at least one processor performs processing based on the determined movement state, in response to a place call command from the first user regarding first phone communication with the other-party apparatus.

In a second embodiment, an electronic apparatus is the other-party apparatus with which the electronic apparatus according to the first embodiment is capable of communicating.

In a third embodiment, a processing system comprises the electronic apparatus according to the first embodiment, and the other-party apparatus with which the electronic apparatus is capable of communicating.

BRIEF DESCRIPTION OF THE DRAWINGS

FIG. 1 is a diagram illustrating one example of a processing system.
FIG. 7 is a flowchart illustrating one example of operation of the electronic apparatus.
FIG. 11 is a flowchart illustrating one example of operation of the electronic apparatus.
FIG. 15 is a diagram illustrating one example of a state in which the electronic apparatus and a handsfree apparatus are connected.
FIG. 20 is a diagram illustrating one example of display of the electronic apparatus.
FIG. 23 is a flowchart illustrating one example of operation of the electronic apparatus.
FIG. 28 is a diagram illustrating one example of display of the electronic apparatus.
FIG. 29 is a flowchart illustrating one example of operation of the electronic apparatus.
FIG. 31 is a diagram illustrating one example of display of the electronic apparatus.
FIG. 32 is a diagram illustrating one example of display of the electronic apparatus.
FIG. 34 is a diagram illustrating one example of display of the electronic apparatus.

DETAILED DESCRIPTION

Figure 2:
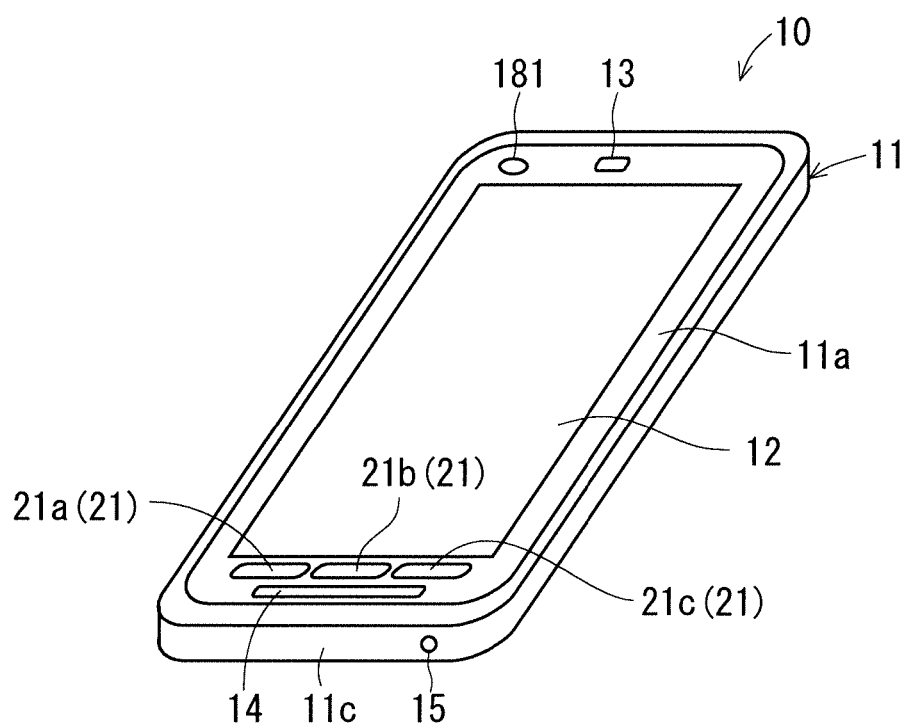
FIG. 2 is a perspective view illustrating one example of external appearance of an electronic apparatus.

<Overview of One Example of Processing System>

FIG. 1 is a diagram illustrating one example of a configuration of a processing system 1. As illustrated in FIG. 1, the processing system 1 comprises a plurality of electronic apparatuses 10 and a server apparatus 50 that are each connected to a network 2. Each of the plurality of electronic apparatuses 10 and the server apparatus 50 can communicate with each other via the network 2.

The network 2 includes at least one of a wireless network and a wired network. In one example, the network 2 includes, for example, a network of a mobile phone system including a base station etc., a wireless local area network (LAN), the Internet, etc.

Each electronic apparatus 10 can transmit information related to the electronic apparatus 10 itself to the server apparatus 50. The information related to the electronic apparatus 10 may be hereinafter referred to as "apparatus information". Further, in the description of operation of the electronic apparatus 10, the term "subject apparatus" refers to the electronic apparatus 10 itself, and the term "subject apparatus user" refers to a user of the electronic apparatus 10. Further, in the description of operation of the electronic apparatus 10, the term "user" by itself refers to a user of the electronic apparatus 10. Further, in the description of operation of the electronic apparatus 10, another electronic apparatus 10 as an apparatus of the other party with which the electronic apparatus 10 communicates may be referred to as an "other-party apparatus 10". Further, a user of the other-party apparatus 10 may be referred to as an "other-party user".

The plurality of electronic apparatuses 10 connected to the network 2 include, for example, a mobile phone device such as a smartphone, a tablet terminal, a personal computer, a wearable apparatus, etc. The wearable apparatus included in the plurality of electronic apparatuses 10 may be a type worn on the arm such as a wristband type or a wristwatch type, may be a type worn on the head such as a headband type or an eyeglass type, or may be a type worn on the body such as a garment type. The wristwatch-type wearable apparatus may be referred to as a smartwatch.

The server apparatus 50 is a type of computer apparatus. The server apparatus 50 can store apparatus information transmitted from each electronic apparatus 10. The server apparatus 50 can transmit apparatus information of another electronic apparatus 10 to the electronic apparatus 10, in response to a request made by the electronic apparatus 10. The electronic apparatus 10 can receive the apparatus information of the another electronic apparatus 10 from the server apparatus 50, and can perform processing based on the received apparatus information.

The following is a detailed description of the processing system 1. The following provides a description of the processing system 1 by principally taking an example of a case in which the electronic apparatus 10 is a mobile phone device.

<Configuration Example of Electronic Apparatus>

<One Example of External Appearance of Electronic Apparatus>

Figure 3:
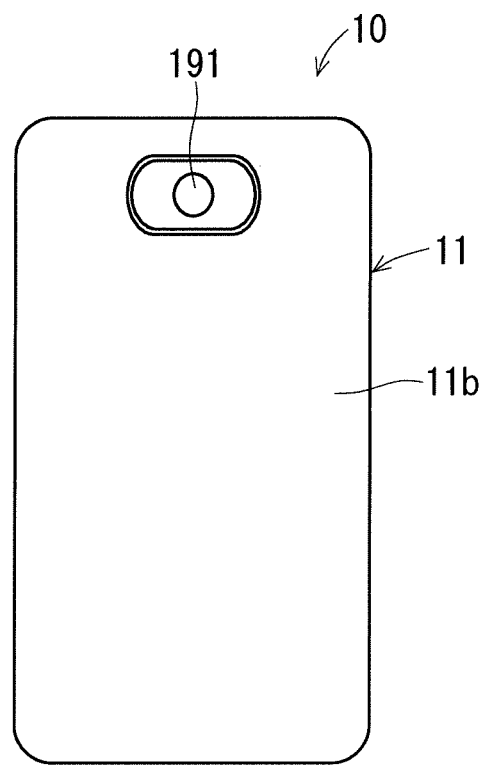
FIG. 3 is a back view illustrating one example of external appearance of the electronic apparatus.

FIGS. 2 and 3 are respectively a perspective view and a back view each illustrating one example of external appearance of the electronic apparatus 10 being a mobile phone device. As illustrated in FIGS. 2 and 3, the electronic apparatus 10 comprises a plate-like apparatus case 11 having substantially a rectangle shape in plan view. The apparatus case 11 constitutes the exterior of the electronic apparatus 10.

A display surface 12 is located on a front surface 11a of the apparatus case 11. On the display surface 12, various pieces of information such as letters, symbols, and graphics are displayed. A touch panel 130 to be described later is located on the back surface side of the display surface 12. With this configuration, the user can input various pieces of information to the electronic apparatus 10 by operating the display surface 12 on the front surface of the electronic apparatus 10 with their finger or the like. Note that the user can also input various pieces of information to the electronic apparatus 10 by operating the display surface 12 with a pointer other than their finger, for example, with a touch panel pen such as a stylus pen.

A receiver hole 13 is located at an upper end portion of the front surface 11a of the apparatus case 11. A speaker hole 14 is located at a lower end portion of the front surface 11a. A microphone hole 15 is located on a side surface 11c that is located on the lower side of the apparatus case 11.

A lens 181 of a first camera 180 to be described later is visually recognizable at the upper end portion of the front surface 11a of the apparatus case 11. As illustrated in FIG. 3, a lens 191 of a second camera 190 to be described later is visually recognizable at the upper end portion of a back surface 11b of the apparatus case 11.

The electronic apparatus 10 comprises an operation button group 210 consisting of a plurality of operation buttons 21 (see FIG. 4 to be described later). Each of the plurality of operation buttons 21 is a hardware button. Specifically, each of the plurality of operation buttons 21 is a push button. Note that at least one of the operation buttons 21 included in the operation button group 210 may be a software button displayed on the display surface 12.

The operation button group 210 comprises operation buttons 21a, 21b, 21c located at the lower end portion of the front surface 11a of the apparatus case 11. The operation button group 210 may comprise a power button and a volume button.

The operation button 21a is, for example, a back button. The back button is an operation button for switching the display of the display surface 12 to its immediately preceding display. When the user operates the operation button 21a, the display of the display surface 12 is switched to its immediately preceding display. The operation button 21b is, for example, a home button. The home button is an operation button for displaying a home screen on the display surface 12. When the user operates the operation button 21b, the home screen is displayed on the display surface 12. The operation button 21c is, for example, a history button. The history button is an operation button for displaying a history of applications executed in the electronic apparatus 10 on the display surface 12. When the user operates the operation button 21c, a history of applications executed in the electronic apparatus 10 is displayed on the display surface 12.

<One Example of Electrical Configuration of Electronic Apparatus>

Figure 4:
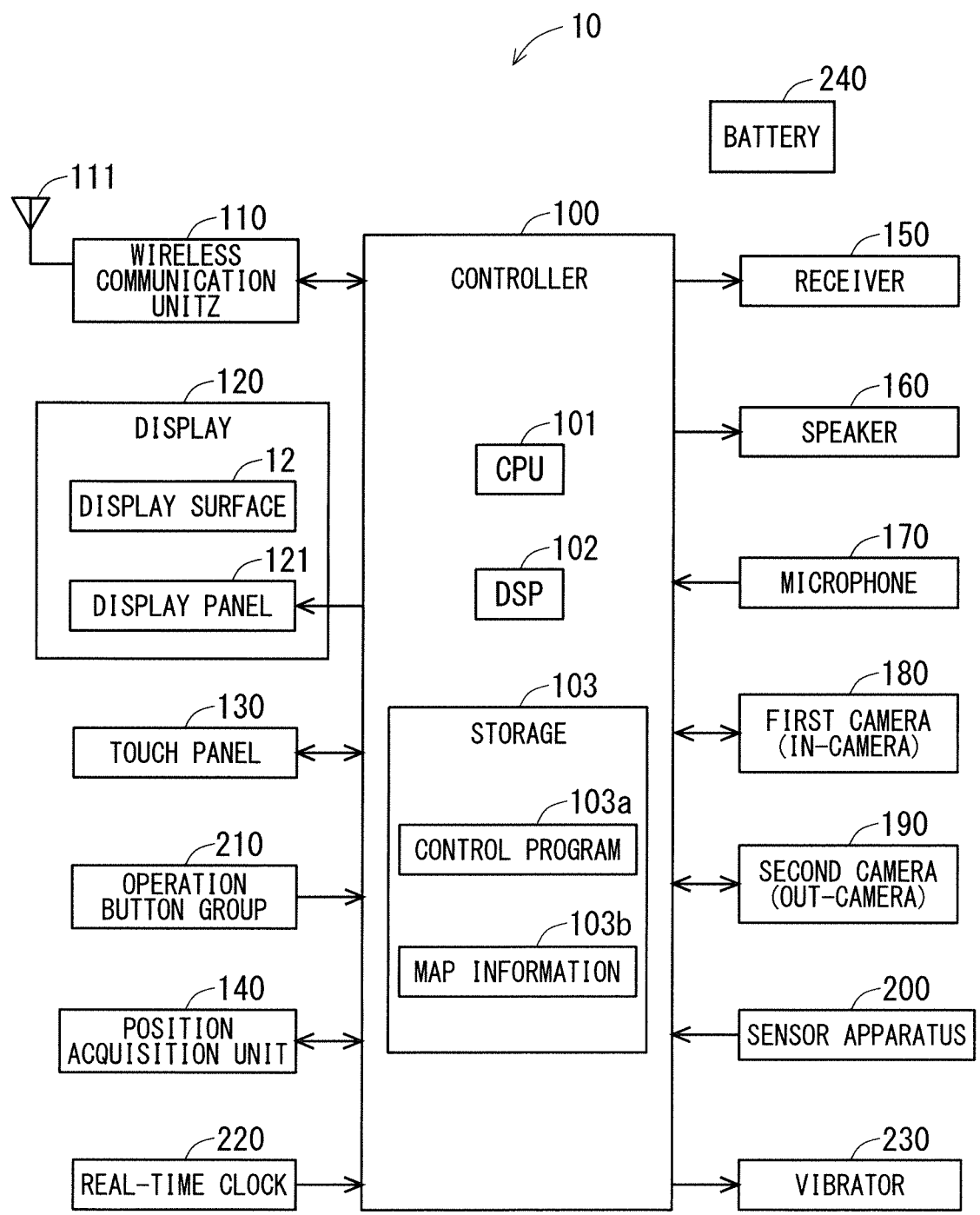
FIG. 4 is a block diagram illustrating one example of a configuration of the electronic apparatus.

FIG. 4 is a block diagram illustrating one example of an electrical configuration of the electronic apparatus 10 illustrated in FIGS. 2 and 3. As illustrated in FIG. 4, the electronic apparatus 10 comprises, for example, a controller 100, a wireless communication unit 110, a display 120, a touch panel 130, an operation button group 210, a position acquisition unit 140, and a real-time clock 220. The electronic apparatus 10 further comprises a receiver 150, a speaker 160, a microphone 170, a first camera 180, a second camera 190, a sensor apparatus 200, a vibrator 230, and a battery 240. These components of the electronic apparatus 10 are accommodated in the apparatus case 11.

The controller 100 can integrally manage operations of the electronic apparatus 10 by controlling other components of the electronic apparatus 10. It can also be said that the controller 100 is a control apparatus or a control circuit. The controller 100 comprises at least one processor for providing control and processing capability to perform various functions as described in further detail below.

In accordance with various embodiments, the at least one processor may be implemented as a single integrated circuit (IC) or as multiple communicatively coupled integrated circuits (ICs) and/or discrete circuits. It is appreciated that the at least one processor can be implemented in accordance with various known technologies.

In one embodiment, the processor comprises one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In one example, the controller 100 comprises a central processing unit (CPU) 101, a digital signal processor (DSP) 102, and a storage 103. The storage 103 comprises a non-transitory recording medium that can be read by the CPU 101 and the DSP 102, such as a read only memory (ROM) and a random access memory (RAM). The ROM of the storage 103 is, for example, a flash ROM (flash memory) being a non-volatile memory. The storage 103 stores map information 103b, a plurality of control programs 103a for controlling the electronic apparatus 10, etc. The map information 103b includes road information, railway line information for trains, facility information, etc. Various functions of the controller 100 are implemented by the CPU 101 and the DSP 102 executing the various control programs 103a in the storage 103.

The plurality of control programs 103a in the storage 103 include various applications (i.e., application programs). The storage 103 stores, for example, a phone application, a browser, a schedule management application, a camera application, a still image display application, a video player application, a music player application, a message communication application, etc.

The phone application is an application that allows the electronic apparatus 10 to perform phone communication by using the wireless communication unit 110, the receiver 150, the microphone 170, etc. It can be said that the phone application is an application that allows the user to place a call to a user of another electronic apparatus 10 by using the electronic apparatus 10. The phone communication includes a previously existing communication mode using a telephone line, and a communication mode using the Internet, which is referred to as Internet Protocol (IP) phone communication. The phone application for performing previously existing communication using a existing telephone line may be referred to as a "previously-existing phone application". Further, the phone application for performing IP phone communication may be referred to as an "IP phone application".

The storage 103 may store a plurality of types of phone applications. The plurality of types of phone applications in the storage 103 may include at least a type of previously-existing phone application, and may include at least a type of IP phone application.

The browser is an application that allows the electronic apparatus 10 to display a website. The schedule management application is an application for registering schedule information in the electronic apparatus 10. The camera application is an application that allows the electronic apparatus 10 to capture an image of an object by using the first camera 180 or the second camera 190. The still image display application is an application that allows the electronic apparatus 10 to display still images in the storage 103. The video player application is an application that allows the electronic apparatus 10 to play and display videos in the storage 103. The music player application is an application that allows the electronic apparatus 10 to play and output pieces of music in the storage 103.

The message communication application is an application that allows the electronic apparatus 10 to perform message communication by using the wireless communication unit 110 etc. The message communication includes a communication mode in which messages transmitted from a transmitter are once stored in the server apparatus and a receiver reads the messages from the server apparatus. The communication mode may be referred to as "electronic mail communication". The message communication further includes a communication mode that allows a receiver to immediately receive messages transmitted from a transmitter without reading the messages from the server apparatus, unlike the electronic mail communication. The communication mode may be referred to as "instant message communication". A message includes letters, symbols, etc. The message communication application for implementing the electronic mail communication may be hereinafter referred to as an "electronic mail application". Further, the message communication application for implementing the instant message communication may be referred to as an "IM application". The IM application may be referred to as an "instant messenger".

The storage 103 may store a plurality of types of message communication applications. The plurality of types of message communication applications in the storage 103 may include at least a type of electronic mail application, and may include at least a type of IM application.

The at least one application in the storage 103 may be an application stored in the storage 103 in advance. Further, the at least one application in the storage 103 may be an application stored in the storage 103 after being downloaded from another apparatus by the electronic apparatus 10.

Note that the configuration of the controller 100 is not limited to one example described above. For example, the controller 100 may comprise a plurality of CPUs 101. Alternatively, the controller 100 may omit the DSP 102, or may comprise a plurality of DSPs 102. Further, all of the functions of the controller 100 or some of the functions of the controller 100 may be implemented by a hardware circuit that does not require software to implement its functions. Further, the storage 103 may comprise a computer-readable non-transitory recording medium other than the ROM and the RAM. The storage 103 may comprise, for example, a small-size hard disk drive, a solid state drive (SSD), or the like.

The wireless communication unit 110 comprises an antenna 111. The wireless communication unit 110 can perform wireless communication by using the antenna 111 according to a plurality of types of wireless communication schemes, for example. The wireless communication of the wireless communication unit 110 is controlled by the controller 100. It can also be said that the wireless communication unit 110 is a wireless communication circuit.

The wireless communication unit 110 can perform wireless communication with the base station of the mobile phone system included in the network 2. The wireless communication unit 110 can communicate with another mobile phone device, web server, etc. via the base station.

Further, the wireless communication unit 110 can perform wireless communication by using the wireless LAN included in the network 2, such as WiFi.

Further, the wireless communication unit 110 can perform short-range wireless communication directly with another apparatus without using the network 2. For example, the wireless communication unit 110 can perform wireless communication in conformity to Bluetooth (trademark). The wireless communication unit 110 may be able to perform wireless communication in conformity to at least one of ZigBee (trademark) and Near Field Communication (NFC).

The wireless communication unit 110 performs various types of processing, such as amplification processing, on a signal received by the antenna 111. Then, the wireless communication unit 110 outputs the processed signal to the controller 100. The controller 100 receives the signal, and performs various types of processing on the received signal to acquire information included in the received signal. In addition, the controller 100 includes information in a signal, and outputs the signal including information to the wireless communication unit 110. The wireless communication unit 110 receives the signal, and performs various types of processing, such as amplification processing, on the received signal. Then, the wireless communication unit 110 wirelessly transmits the processed signal from the antenna 111. The controller 100 causes the wireless communication unit 110 to transmit apparatus information of the electronic apparatus 10 to the server apparatus 50 as will be described later.

The display 120 comprises a display surface 12 located on the front surface of the electronic apparatus 10, and a display panel 121. The display 120 can display various pieces of information on the display surface 12. The display panel 121 is, for example, a liquid crystal display panel or an organic EL panel. When being controlled by the controller 100, the display panel 121 can display various pieces of information such as letters, symbols, and graphics. The display panel 121 faces the display surface 12 in the apparatus case 11. The information displayed on the display panel 121 is displayed on the display surface 12. It can be said that the display 120 is a notification unit that gives notifications to the user by performing display.

The touch panel 130 can detect operations performed by a pointer, such as a finger, on the display surface 12. The touch panel 130 is, for example, a projected electrostatic capacitive touch panel. The touch panel 130 is, for example, located on the back of the display surface 12. When the user performs an operation on the display surface 12 with a pointer such as a finger, the touch panel 130 can input an electric signal according to the operation to the controller 100. The controller 100 can determine details of the operation performed on the display surface 12, based on the electric signal (output signal) from the touch panel 130. Further, the controller 100 can perform processing according to the determined details of the operation.

When being operated by the user, each operation button 21 of the operation button group 210 can output an operation signal, which indicates that the operation button 21 has been operated, to the controller 100. In this manner, the controller 100 can judge whether or not each individual operation button 21 has been operated. When the controller 100 that has received the operation signal controls other components, a function assigned to the operated operation button 21 is executed in the electronic apparatus 10.

The position acquisition unit 140 can acquire position information indicating the position of the electronic apparatus 10. For example, the position acquisition unit 140 receives satellite signals transmitted by positioning satellites. Based on the received satellite signals, the position acquisition unit 140 can acquire position information of the electronic apparatus 10. The position information acquired by the position acquisition unit 140 includes, for example, latitude and longitude that represents the position of the electronic apparatus 10. It can be said that the position acquisition unit 140 is a position acquisition circuit.

The position acquisition unit 140 is, for example, a GPS receiver, and can receive wireless signals from positioning satellites of the Global Positioning System (GPS). For example, the position acquisition unit 140 uses the received wireless signals to calculate the current position of the electronic apparatus 10 in latitude and longitude, and outputs position information including the calculated latitude and longitude to the controller 100. It can also be said that the position information of the electronic apparatus 10 is position information of the user holding the electronic apparatus 10.

Note that the position acquisition unit 140 may calculate the position information of the electronic apparatus 10, based on signals from positioning satellites of a system other than the GPS, such as the Global Navigation Satellite System (GNSS). For example, the position acquisition unit 140 may calculate the position information of the electronic apparatus 10, based on signals from positioning satellites of systems such as the Global Navigation Satellite System (GLONASS), the Indian Regional Navigational Satellite System (IRNSS), COMPASS, Galileo, and the Quasi-Zenith Satellites System (QZSS).

The electronic apparatus 10 may omit the position acquisition unit 140. In this case, the electronic apparatus 10 may be connected to such a separately provided position acquisition unit 140 by wireless or wired means.

The microphone 170 can convert sound input from the outside of the electronic apparatus 10 into an electric sound signal, and output the converted electric sound signal to the controller 100. The sound from the outside of the electronic apparatus 10 is taken into the electronic apparatus 10 through the microphone hole 15, and is input to the microphone 170.

The speaker 160 is, for example, a dynamic speaker. The speaker 160 can convert an electric sound signal from the controller 100 into sound, and output the converted sound. The sound output through the speaker 160 is externally output through the speaker hole 14. The user can hear the sound output through the speaker hole 14 at a place away from the electronic apparatus 10. It can be said that the speaker 160 is a notification unit that gives notifications to the user by outputting sound.

The receiver 150 can output received voice sound. The receiver 150 is, for example, a dynamic speaker. The receiver 150 can convert an electric sound signal from the controller 100 into sound, and output the converted sound. The sound output through the receiver 150 is externally output through the receiver hole 13. The volume of the sound output through the receiver hole 13 is smaller than the volume of the sound output through the speaker hole 14. The user can hear the sound output through the receiver hole 13 by bringing their ear close to the receiver hole 13. It can be said that the receiver 150 is a notification unit that gives notifications to the user by outputting sound. Note that, instead of the receiver 150, a vibration element for vibrating a front surface portion of the apparatus case 11, such as a piezoelectric vibration element, may be provided. In this case, the sound is transferred to the user through vibration of the front surface portion.

The first camera 180 comprises a lens 181, an image sensor, etc. The second camera 190 comprises a lens 191, an image sensor, etc. Each of the first camera 180 and the second camera 190 can capture an image of an object according to control of the controller 100, generate a still image or a video of the captured object, and output the generated still image or video to the controller 100.

The lens 181 of the first camera 180 is visually recognizable on the front surface 11a of the apparatus case 11. This configuration allows the first camera 180 to capture an image of an object that is present on the front surface side (display surface 12 side) of the electronic apparatus 10. The first camera 180 is referred to as an in-camera. In contrast, the lens 191 of the second camera 190 is visually recognizable on the back surface 11b of the apparatus case 11. This configuration allows the second camera 190 to capture an image of an object that is present on the back surface side of the electronic apparatus 10. The second camera 190 is referred to as an out-camera.

The sensor apparatus 200 comprises at least one sensor. In one example, the sensor apparatus 200 comprises, for example, an accelerometer, an atmospheric pressure sensor, a geomagnetic sensor, and a gyro sensor. The accelerometer is, for example, a three-axis accelerometer that can detect acceleration of the electronic apparatus 10. The accelerometer can detect acceleration in the x-axis direction, the y-axis direction, and the z-axis direction that are set in the electronic apparatus 10. The x-axis direction, the y-axis direction, and the z-axis direction are set in, for example, the longitudinal direction, the transverse direction, and the thickness direction of the electronic apparatus 10, respectively. The atmospheric pressure sensor can detect atmospheric pressure surrounding the electronic apparatus 10. The geomagnetic sensor is, for example, a three-axis geomagnetic sensor that can detect a magnetic field surrounding the electronic apparatus 10. The geomagnetic sensor can detect a magnetic field in the x-axis direction, the y-axis direction, and the z-axis direction that are set in the electronic apparatus 10. The gyro sensor is, for example, a three-axis gyro sensor that can detect angular velocity of the electronic apparatus 10. The gyro sensor can detect angular velocity about each axis of the x-axis, the y-axis, and the z-axis that are set in the electronic apparatus 10.

Note that the sensor apparatus 200 may omit at least one sensor out of the accelerometer, the atmospheric pressure sensor, the geomagnetic sensor, and the gyro sensor. In this case, the electronic apparatus 10 may be connected to such separately provided at least one sensor by wireless or wired means. Further, the sensor apparatus 200 may comprise a sensor other than the accelerometer, the atmospheric pressure sensor, the geomagnetic sensor, and the gyro sensor. For example, the sensor apparatus 200 may comprise at least one of a proximity sensor, an illuminometer, and a temperature sensor. Further, the electronic apparatus 10 may be connected to such a separately provided sensor other than the accelerometer, the atmospheric pressure sensor, the geomagnetic sensor, and the gyro sensor by wireless or wired means.

The real-time clock 220 measures the current time and notifies the controller 100 of the measured current time. The vibrator 230 can vibrate the electronic apparatus 10. Specifically, the vibrator 230 can vibrate the apparatus case 11 according to control of the controller 100. The vibrator 230 can give a notification to the user holding the electronic apparatus 10 by vibrating the apparatus case 11. The vibrator 230 comprises, for example, an eccentric motor. It can be said that the vibrator 230 is a notification unit that gives notifications to the user by vibrating the apparatus case 11.

The battery 240 is, for example, a rechargeable battery. Power output from the battery 240 is supplied to various components of the electronic apparatus 10, such as the controller 100 and the wireless communication unit 110.

<Configuration Example of Server Apparatus>

Figure 5:
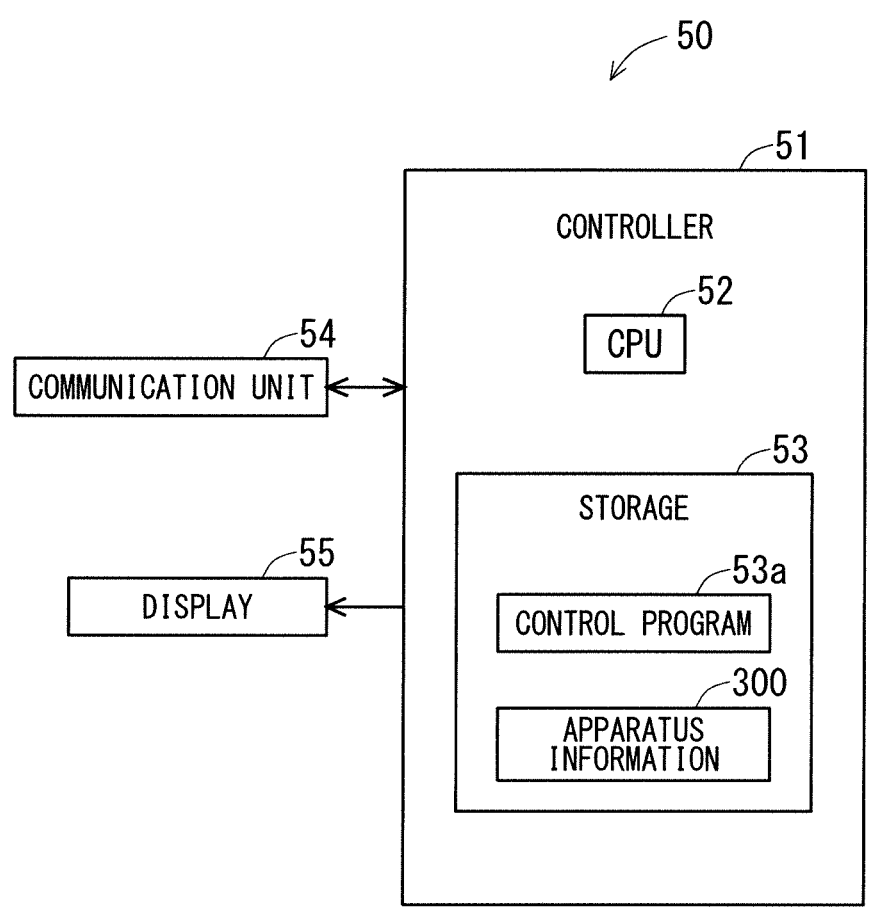
FIG. 5 is a block diagram illustrating one example of a configuration of a server apparatus.

FIG. 5 is a diagram illustrating one example of a configuration of the server apparatus 50. As illustrated in FIG. 5, the server apparatus 50 comprises, for example, a controller 51, a communication unit 54 to be connected to the network 2, and a display 55.

The display 55 is, for example, a liquid crystal display panel or an organic EL panel. When being controlled by the controller 51, the display 55 can display various pieces of information such as letters, symbols, and graphics.

The controller 51 can integrally manage operations of the server apparatus 50 by controlling other components of the server apparatus 50. It can also be said that the controller 51 is a control apparatus or a control circuit. The controller 51 comprises at least one processor for providing control and processing capability to perform various functions as described in further detail below. The above description of the processor of the controller 100 of the electronic apparatus 10 applies to the processor of the controller 51 as well.

In one example, the controller 51 comprises a CPU 52 and a storage 53. The storage 53 comprises a non-transitory recording medium that can be read by the CPU 52, such as a ROM and a RAM. The ROM of the storage 53 is, for example, a flash ROM being a non-volatile memory. The storage 53 stores a plurality of control programs 53a for controlling the server apparatus 50. The storage 53 further stores apparatus information 300 transmitted by the electronic apparatus 10. In the storage 53, the apparatus information 300 is managed for each individual electronic apparatus 10. The various functions of the controller 51 are implemented by the CPU 52 executing the various control programs 53a in the storage 53.

The communication unit 54 is connected to the network 2 by wired or wireless means. The communication unit 54 can communicate with an apparatus connected to the network 2, such as the electronic apparatus 10, via the network 2. The communication unit 54 can input information received from the network 2 to the controller 51. Further, the communication unit 54 can output information received from the controller 51 to the network 2.

The configuration of the server apparatus 50 is not limited to one example of FIG. 5. For example, the controller 51 may comprise a plurality of CPUs 52. Further, the controller 51 may comprise at least one DSP. Further, all of the functions of the controller 51 or some of the functions of the controller 51 may be implemented by a hardware circuit that does not require software to implement its functions.

Further, the storage 53 may comprise a computer-readable non-transitory recording medium other than the ROM and the RAM. The storage 53 may comprise, for example, a small-size hard disk drive, an SSD, or the like. At least one of the control programs 53a in the storage 53 may be a program stored in the storage 53 in advance. Further, the at least one of the control programs 53a in the storage 53 may be a program stored in the storage 53 after being downloaded from another apparatus by the server apparatus 50.

The server apparatus 50 may comprise components other than the controller 51, the communication unit 54, and the display 55. The server apparatus 50 may comprise an input apparatus that allows the user to input information to the server apparatus 50, such as a touch panel.

<Display Example of Electronic Apparatus>

Figure 6:
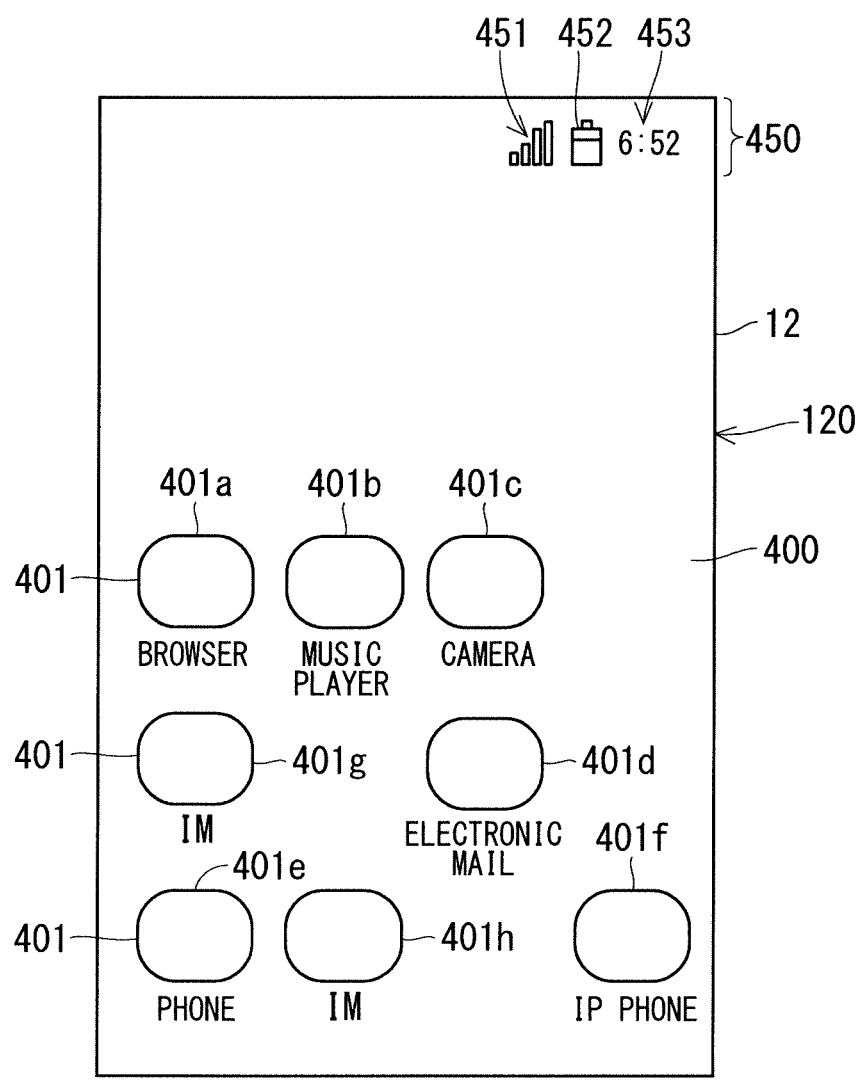
FIG. 6 is a diagram illustrating one example of display of the electronic apparatus.

FIG. 6 is a diagram illustrating a display example of the electronic apparatus 10. FIG. 6 schematically illustrates one example of a home screen 400. As illustrated in FIG. 6, icons 401 are shown on the home screen 400 that is displayed on the display surface 12. Each of the icons 401 corresponds to one application in the storage 103, and is used to command the electronic apparatus 10 to execute the corresponding application.

In one example of FIG. 6, the home screen 400 comprises an icon 401a corresponding to the browser, an icon 401b corresponding to the music player application, an icon 401c corresponding to the camera application, and an icon 401d corresponding to the electronic mail application. The home screen 400 further comprises an icon 401e corresponding to the previously-existing phone application and an icon 401f corresponding to the IP phone application. The home screen 400 further comprises two icons 401g and 401h corresponding to two respective types of IM applications provided by different companies, for example.

The user can select one icon 401 comprised in the home screen 400 by performing a predetermined operation (for example, a tap operation) on the icon 401. The controller 100 reads an application corresponding to the selected icon 401 from the storage 103 and executes the read application. Specifically, when the touch panel 130 detects a predetermined operation performed on one icon 401, the controller 100 reads an application corresponding to the icon 401 and executes the read application. In this manner, the user can select an icon 401 by operating the icon 401, and cause the electronic apparatus 10 to execute an application corresponding to the selected icon 401. For example, when the user performs a tap operation on the icon 401d corresponding to the electronic mail application, the electronic mail application is executed in the electronic apparatus 10. Further, when the user performs a tap operation on the icon 401e corresponding to the previously-existing phone application, the previously-existing phone application is executed in the electronic apparatus 10.

A notification area 450 for giving notifications about a state of the electronic apparatus 10 is comprised in every screen displayed on the display surface 12, including the home screen 400. The notification area 450 is also referred to as a status bar. As illustrated in FIG. 6, the notification area 450 comprises, for example, an icon 451 representing a communication state of the wireless communication unit 110, an icon 452 representing the remaining amount of the battery 240, and an icon 453 representing the current time acquired by the real-time clock 220.

Further, when a specific event occurs in the electronic apparatus 10, information related to the occurring event is shown in the notification area 450. The information includes, for example, an icon for giving a notification about reception of a new message, an icon for giving a notification about a missed call, etc.

In the following description provided for the display example of the electronic apparatus 10, illustration of the notification area 450 may be omitted when the notification area 450 is not particularly relevant to the subject being described.

<Operation Example of Electronic Apparatus>
<One Example of Incoming Call/Message Notification of Electronic Apparatus>

When the electronic apparatus 10 receives an incoming call, i.e., receives an outgoing call of phone communication from the other-party apparatus 10, the electronic apparatus 10 gives an incoming call notification about the phone communication to the subject apparatus user. Further, when the electronic apparatus 10 receives a message (i.e., incoming message) transmitted by the other-party apparatus 10 through message communication, the electronic apparatus 10 gives an incoming message notification about the message communication to the subject apparatus user. The outgoing call of phone communication may be hereinafter referred to as an "outgoing phone call". Further, the incoming call notification of phone communication may be hereinafter referred to as an "incoming phone call notification", and the incoming message notification of message communication may be hereinafter referred to as an "incoming message notification". Further, the incoming call of phone communication may be hereinafter referred to as an "incoming phone call".

The electronic apparatus 10 can give an incoming phone call notification and an incoming message notification by using the display 120, the speaker 160, and the vibrator 230, for example. For example, while the electronic apparatus 10 receives an incoming call of phone communication (which may be hereinafter replaced by the expression "during reception of an incoming phone call"), the controller 100 causes the display 120 to display an incoming call notification screen for giving a notification about the incoming phone call. In this manner, the electronic apparatus 10 can give an incoming phone call notification to the subject apparatus user. It can also be said that the incoming call notification screen serves as incoming call notification information for giving a notification about an incoming phone call. Further, during reception of an incoming phone call, the controller 100 causes the speaker 160 to output a ringtone for phone communication (which may be hereinafter referred to as a "phone ringtone"). In this manner, the electronic apparatus 10 can give an incoming phone call notification to the subject apparatus user. The incoming phone call notification may be referred to as an "incoming phone call notification using sound". Further, during reception of an incoming phone call, the controller 100 causes the vibrator 230 to vibrate the apparatus case 11. In this manner, the electronic apparatus 10 can give an incoming phone call notification to the subject apparatus user. The incoming phone call notification may be referred to as an "incoming phone call notification using vibration".

In a similar manner, the controller 100 causes the display 120 to display information for giving a notification about the reception of the message in the notification area 450, for example, in response to the electronic apparatus 10 receiving a message.

In this manner, the electronic apparatus 10 can give an incoming message notification to the subject apparatus user. Further, the controller 100 causes the speaker 160 to output a ringtone for message communication, in response to the electronic apparatus 10 receiving a message. In this manner, the electronic apparatus 10 can give an incoming message notification to the subject apparatus user. The incoming message notification may be referred to as an "incoming message notification using sound". Further, the controller 100 causes the vibrator 230 to vibrate the apparatus case 11, in response to the electronic apparatus 10 receiving a message. In this manner, the electronic apparatus 10 can give an incoming message notification to the subject apparatus user. The incoming message notification may be referred to as an "incoming message notification using vibration".

The user can adjust the settings of the electronic apparatus 10 related to the incoming call/message notification by operating the display surface 12, for example. For example, the user can adjust the settings of the electronic apparatus 10 related to the incoming phone call notification, as to whether or not to execute the incoming phone call notification using sound and whether or not to execute the incoming phone call notification using vibration. Further, the user can adjust the settings of the electronic apparatus 10 related to the incoming message notification, as to whether or not to execute the incoming message notification using sound and whether or not to execute the incoming message notification using vibration. Basically, the electronic apparatus 10 gives the incoming call/message notification according to the settings of related to the incoming call/message notification of the subject apparatus. As will be described later, however, the incoming call/message notification of the electronic apparatus 10 may in some cases be controlled by another electronic apparatus 10.

<Transmission of Apparatus Information>

In one example, the controller 100 of the electronic apparatus 10 can generate apparatus information of the subject apparatus, and cause the wireless communication unit 110 to transmit the generated apparatus information to the server apparatus 50.

In the electronic apparatus 10, for example, the controller 100 causes the wireless communication unit 110 to transmit the latest apparatus information to the server apparatus 50 once every certain period of time. Alternatively, the controller 100 may cause the wireless communication unit 110 to transmit apparatus information to the server apparatus 50 every time information included in the apparatus information is changed. Alternatively, the controller 100 may cause the wireless communication unit 110 to transmit the latest apparatus information to the server apparatus 50 every time the server apparatus 50 makes a transmission request for apparatus information. The electronic apparatus 10 transmits apparatus information of the subject apparatus along with identification information of the subject apparatus. As the identification information, for example, a telephone number assigned to the electronic apparatus 10 is adopted.

In the server apparatus 50, when the communication unit 54 acquires the apparatus information and the identification information of the electronic apparatus 10, the controller 51 stores the acquired apparatus information and identification information in the storage 53 by correlating both the pieces of information to each other. In this case, when the storage 53 stores old apparatus information that corresponds to the received identification information, the controller 51 stores the received apparatus information in the storage 53, instead of the old apparatus information. In this manner, the storage 53 stores the latest apparatus information of each electronic apparatus 10.

In one example, when the user of the electronic apparatus 10 is moving, movement information, which indicates a movement state of the user, is included in the apparatus information of the electronic apparatus 10. It can also be said that the movement information is information indicating a movement state of the electronic apparatus 10. The controller 100 determines the movement state of the user, based on detection results etc. obtained from the sensor apparatus 200. Then, the controller 100 generates apparatus information including the movement information indicating the determined movement state. The apparatus information may or may not include information other than the movement information. Note that, when the user of the electronic apparatus 10 is stopping without making any movement, the apparatus information of the electronic apparatus 10 does not include the movement information.

<One Example of Method of Determining Movement State>

The controller 100 can determine various movement states of the user. For example, the controller 100 can determine a state in which the user is moving on their own without riding any vehicle and a state in which the user is moving by riding a vehicle, based on detection results obtained from the accelerometer of the sensor apparatus 200.

Here, a situation where the user moves on their own without riding a vehicle refers to a situation in which the user moves on their own feet without riding any vehicle. The state in which the user is moving on their own without riding a vehicle is referred to as a "non-vehicle movement state". In this case, it can be said that the controller 100 can determine the non-vehicle movement state of the user, based on detection results obtained from the accelerometer of the sensor apparatus 200. The detection results obtained from the accelerometer of the sensor apparatus 200 may be hereinafter referred to as "acceleration detection results".

As the non-vehicle movement state of the user, the controller 100 can determine a state in which the user is moving by walking and a state in which the user is moving by running. The former state is referred to as a "walking state" and the latter state is referred to as a "running state". In this case, the controller 100 can determine the walking state and the running state of the user, based on acceleration detection results.

Further, as the state in which the user is moving by riding a vehicle, the controller 100 can determine a state in which the user is moving by riding a bicycle and a state in which the user is moving by riding a vehicle that allows the user to move faster than a bicycle, such as a motor vehicle, a train, and a bus. To distinguish between a bicycle and a vehicle that allows the user to move faster than a bicycle, the term "vehicle" by itself hereinafter refers to the vehicle that allows the user to move faster than a bicycle.

The state in which the user is moving by riding a bicycle is referred to as a "bicycle movement state", and the state in which the user is moving by riding a vehicle is referred to as a "vehicle movement state". In this case, the controller 100 can determine the bicycle movement state and the vehicle movement state of the user, based on acceleration detection results.

Here, as a known fact, acceleration of the electronic apparatus 10 exhibits a time-varying pattern specific to a movement state of the user holding the electronic apparatus 10. When the time-varying pattern of acceleration detected by the accelerometer of the sensor apparatus 200 exhibits a pattern specific to the walking state, the controller 100 determines that the movement state of the user is the walking state. Further, when the time-varying pattern of acceleration detected by the accelerometer exhibits a pattern specific to the "running state", the controller 100 determines that the movement state of the user is the running state. Further, when the time-varying pattern of acceleration detected by the accelerometer exhibits a pattern specific to the bicycle movement state, the controller 100 determines that the movement state of the user is the bicycle movement state. Further, when the time-varying pattern of acceleration detected by the accelerometer exhibits a pattern specific to the vehicle movement state, the controller 100 determines that the movement state of the user is the vehicle movement state.

Further, when the movement state of the user is the vehicle movement state, the controller 100 can determine whether the user is in a state in which the user is moving by riding a train or is in a state in which the user is moving by driving an automobile. The state in which the user is moving by riding a train may be hereinafter referred to as a "train movement state". Further, the state in which the user is moving by driving a motor vehicle may be referred to as a "motor vehicle driving state".

For example, when the controller 100 determines that the movement state of the user is the vehicle movement state and the position of the subject apparatus is located on a railway line of a train, the controller 100 determines that the movement state of the user is the train movement state. In this case, for example, the controller 100 uses a position indicated by the position information acquired by the position acquisition unit 140 as the position of the subject apparatus. Further, the controller 100 can determine a position of the railway line of the train, based on the map information 103b in the storage 103.

In one example, the electronic apparatus 10 can be used as a smart key of the motor vehicle. By using the electronic apparatus 10, the user can cause a door of the motor vehicle to be used to be locked, the door thereof to be unlocked, an engine thereof to be started, and the engine thereof to be stopped. The electronic apparatus 10 can cause the door of the motor vehicle to be locked, the door thereof to be unlocked, the engine thereof to be started, and the engine thereof to be stopped with the wireless communication unit 110 performing wireless communication with a communication apparatus mounted on the motor vehicle. The storage 103 of the electronic apparatus 10 stores a history of the start and the stop of the engine as an engine operation history. When the controller 100 determines that the movement state of the user is the vehicle movement state and the engine of the motor vehicle is currently operating based on the engine operation history in the storage 103, the controller 100 determines that the movement state of the user is the motor vehicle driving state.

When the movement state of the user is the vehicle movement state but is not the train movement state and the motor vehicle driving state, the controller 100 determines that the movement state of the user is another vehicle movement state.

Note that the electronic apparatus 10 may determine that the movement state of the user is the motor vehicle driving state by using another method. For example, it is assumed that a camera for capturing a state in the automobile is installed in the motor vehicle, and the electronic apparatus 10 in the motor vehicle can receive a captured image of the camera. In this case, the controller 100 determines whether or not a person is present in the driver's seat by analyzing the captured image received by the subject apparatus. Then, when the controller 100 determines that the movement state of the user is the vehicle movement state and determines that a person is present in the driver's seat of the motor vehicle, the controller 100 determines that the movement state of the user is the motor vehicle driving state.

In another example, it is assumed that the electronic apparatus 10 is a wristwatch wearable apparatus and can detect a motion of a hand of the user. In this case, the controller 100 determines whether or not the user is operating a steering wheel of the motor vehicle, based on detection results about the motion of the hand of the user. Then, when the electronic apparatus 10 determines that the movement state of the user is the vehicle movement state and determines that the user is operating the steering wheel of the motor vehicle, the electronic apparatus 10 determines that the movement state of the user is the motor vehicle driving state.

In still another example, it is assumed that a directional microphone that only collects voice of a driver is provided in the motor vehicle, and the electronic apparatus 10 in the motor vehicle can receive a signal output from the directional microphone. In this case, the controller 100 determines whether or not a person is present in the driver's seat, based on the signal from the directional microphone. Then, when the controller 100 determines that the movement state of the user is the vehicle movement state and determines that a person is present in the driver's seat of the motor vehicle, the controller 100 determines that the movement state of the user is the motor vehicle driving state.

In this manner, as the movement state of the user, the controller 100 can determine the walking state, the running state, the bicycle movement state, the train movement state, the motor vehicle driving state, and the another vehicle movement state. When the controller 100 determines that the movement state of the user is the walking state, the controller 100 generates movement information indicating that the movement state of the user is the non-vehicle movement state. When the controller 100 determines that the movement state of the user is the running state, the controller 100 generates movement information indicating that the movement state of the user is the non-vehicle movement state. When the controller 100 determines that the movement state of the user is the train movement state, the controller 100 generates movement information indicating that the movement state of the user is the train movement state. When the controller 100 determines that the movement state of the user is the motor vehicle driving state, the controller 100 generates movement information indicating that the movement state of the user is the motor vehicle driving state. When the controller 100 determines that the movement state of the user is the another vehicle movement state, the controller 100 generates movement information indicating that the movement state of the user is the another vehicle movement state. Note that the method of determining the movement state of the user is not limited to examples described above.

<Operation Example of Electronic Apparatus after Phone Application is Started>

In one example, after the phone application is started, the electronic apparatus 10 can perform processing based on apparatus information of the other-party apparatus 10, in response to receiving a place call command of phone communication to be performed with the other-party apparatus 10 issued by the subject apparatus user. Because the user can use such an electronic apparatus 10 as described above, convenience of the electronic apparatus 10 is enhanced.

FIG. 7 is a flowchart illustrating one example of operation of the electronic apparatus 10 after the phone application is started. When the touch panel 130 detects a tap operation performed on the icon 401e or the icon 40f described above, the controller 100 of the electronic apparatus 10 reads a phone application corresponding to the tapped icon 401 from the storage 103, and executes the read phone application. In this manner, the phone application is started.

After the phone application is started, in Step s1, when the controller 100 determines that the subject apparatus has received input of a place call command of phone communication to be performed with the other-party apparatus 10 issued by the subject apparatus user, based on an output signal from the touch panel 130, the controller 100 executes Step s2.

The term "place call command" by itself hereinafter refers to a place call command of phone communication. Further, when the electronic apparatus 10 receives input of a place call command of phone communication to be performed with a certain other-party apparatus 10, this other-party apparatus 10 may be referred to as a "target other-party apparatus 10". Further, a user of the target other-party apparatus 10 may be referred to as a "target other-party user". Further, the electronic apparatus 10 that has received input of a place call command may be referred to as a "place call command-received apparatus 10" or a "command-received apparatus 10".

Figure 8:
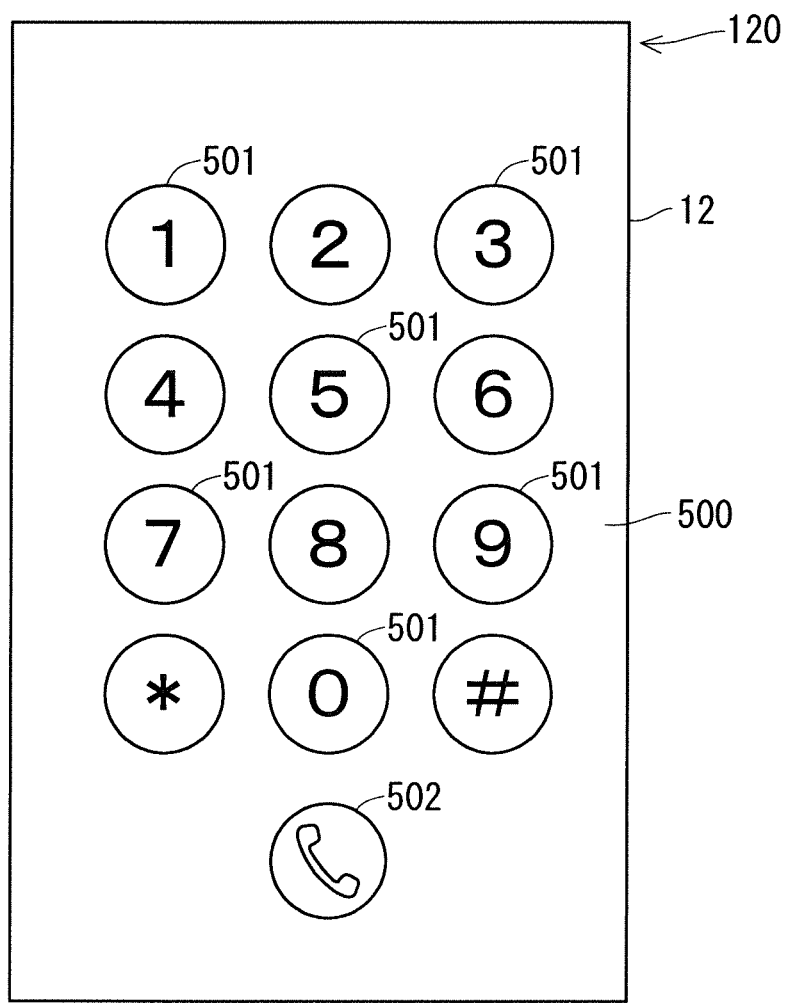
FIG. 8 is a diagram illustrating one example of display of the electronic apparatus.

FIG. 8 is a diagram illustrating a display example when the phone application is executed. FIG. 8 illustrates a display example when the previously-existing phone application is executed. FIG. 8 illustrates one example of an input screen 500 for enabling input of a telephone number that is assigned to the other-party apparatus 10 with which phone communication is to be performed. The input screen 500 may be referred to as a dial pad or a keypad.

As illustrated in FIG. 8, the input screen 500 comprises twelve input buttons 501 for enabling input of symbols such as numbers. Each input button 501 is assigned a symbol. For example, when a tap operation is performed on the input button 501, a symbol assigned to the tapped input button 501 is input to the electronic apparatus 10. The user can input the telephone number of the other-party apparatus 10 to the electronic apparatus 10 by operating a plurality of input buttons 501.

The input screen 500 further comprises a place call command button 502 for inputting a place call command to the electronic apparatus 10. For example, when a tap operation is performed on the place call command button 502, a place call command is input to the electronic apparatus 10. The user can input a place call command of phone communication to be performed with the other-party apparatus 10 to the electronic apparatus 10 by inputting the telephone number of the other-party apparatus 10 to the electronic apparatus 10 and then operating the place call command button 502.

The method in which the user inputs a place call command to the electronic apparatus 10 is not limited to one example described above. For example, the user can input a place call command to the electronic apparatus 10 by using an address book (also referred to as a phone book) in the storage 103. In this case, for example, the user performs a predetermined operation on the display surface 12 to cause the electronic apparatus 10 to display the telephone number of the other-party apparatus 10 included in the address book of the storage 103 on the display surface 12. Then, for example, the user performs a tap operation on the telephone number of the other-party apparatus 10 displayed on the display surface 12. Through such operation, the user can input a place call command of phone communication to be performed with the other-party apparatus 10 to the electronic apparatus 10. Alternatively, the user may input a place call command to the electronic apparatus 10 by using an incoming phone call history or an outgoing phone call history displayed on the display surface 12. Further, the user may input a place call command to the electronic apparatus 10 by inputting predetermined voice to the microphone 170.

Note that, in one example described above, a telephone number is used as identification information of the other-party apparatus 10 that is used when the electronic apparatus 10 performs phone communication with the other-party apparatus 10. However, in the IP phone application, identification information other than a telephone number may be used.

In Step s2, the controller 100 generates a first request signal for requesting the server apparatus 50 to transmit apparatus information of the target other-party apparatus 10. The first request signal includes identification information of the target other-party apparatus 10. Then, the controller 100 causes the wireless communication unit 110 to transmit the first request signal to the server apparatus 50.

In the server apparatus 50 that has received the first request signal, the controller 51 reads apparatus information that corresponds to the identification information included in the first request signal from the storage 53. Then, the server apparatus 50 transmits the read apparatus information to the place call command-received apparatus 10. In this manner, the place call command-received apparatus 10 can acquire the apparatus information of the target other-party apparatus 10.

After Step s2, in Step s3, when the wireless communication unit 110 acquires the apparatus information of the target other-party apparatus 10 from the server apparatus 50, in Step s4, the controller 100 executes processing based on the acquired apparatus 20 information. A specific example of Step s4 will be described later in detail.

In one example, the command-received apparatus 10 performs processing according to the target other-party apparatus 10, instead of unconditionally placing an outgoing call of phone communication in response to the place call command. In Step s4, the controller 100 determines the current movement state of the target other-party user, based on the movement information included in the apparatus information acquired by the subject apparatus. Then, the controller 100 performs processing based on the determined movement state. In Step s4, the controller 100 may perform control of the operation of the subject apparatus based on the determined movement state, or may perform of control of the operation of the target other-party apparatus 10 based on the determined movement state. A specific example of Step s4 will be described later in detail.

Note that the controller 100 may register the acquired apparatus information in the address book in the storage 103. In this case, the controller 100 may register the apparatus information of the other-party apparatus 10 in the address book by correlating the apparatus information to the telephone number of the other-party apparatus 10. In this manner, when the electronic apparatus 10 displays the address book, the user can check the apparatus information.

Figure 9:
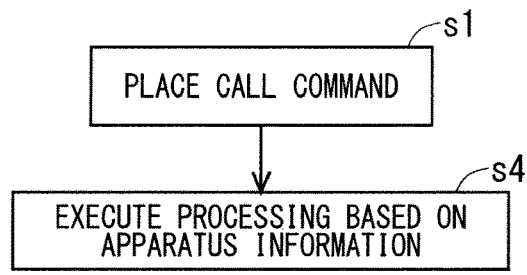
FIG. 9 is a flowchart illustrating one example of operation of the electronic apparatus.

Further, in one example described above, the electronic apparatus 10 transmits the first request signal to the server apparatus 50 with the place call command being a trigger for the transmission. However, the electronic apparatus 10 may transmit the first request signal to the server apparatus 50 with another condition being the trigger. For example, the electronic apparatus 10 may transmit the first request signal to the server apparatus 50 once every certain period of time. In this case, as illustrated in FIG. 9, Steps s2 and s3 are not required, and in Step s4, the command-received apparatus 10 executes processing based on the most recently acquired apparatus information.

Further, the electronic apparatus 10 may acquire the apparatus information from the other-party apparatus 10 that is related to the place call command, without using the server apparatus 50. In this case, for example, in Step s2, the controller 100 of the command-received apparatus 10 causes the wireless communication unit 110 to transmit a second request signal to the target other-party apparatus 10. The second request signal is a signal for requesting the target other-party apparatus 10 to transmit apparatus information. In the target other-party apparatus 10, when the wireless communication unit 110 receives the second request signal, the controller 100 causes the wireless communication unit 110 to transmit the apparatus information of the subject apparatus to the command-received apparatus 10. In the command-received apparatus 10, when the wireless communication unit 110 acquires the apparatus information of the target other-party apparatus 10 in Step s3, in Step s4, the controller 100 executes processing based on the acquired apparatus information.

Further, the electronic apparatus 10 may transmit the second request signal to the other-party apparatus 10 with a condition other than the place call command being the trigger. For example, the electronic apparatus 10 may transmit the second request signal to the other-party apparatus 10 once every certain period of time. In this case, as illustrated in FIG. 9 described above, Steps s2 and s3 are not required, and in Step s4, the command-received apparatus 10 executes processing based on the most recently acquired apparatus information.

Further, the electronic apparatus 10 may voluntarily transmit apparatus information of the electronic apparatus 10 to another electronic apparatus 10, instead of transmitting the apparatus information in response to a request made by another electronic apparatus 10. For example, the electronic apparatus 10 may transmit the apparatus information of the subject apparatus to another electronic apparatus 10 once every certain period of time. In this case, as in FIG. 9, Steps s2 and s3 are not required, and in Step s4 the command-received apparatus 10 performs processing based on the apparatus information that is most recently acquired from the target other-party apparatus 10.

Note that, when the electronic apparatus 10 acquires apparatus information from the server apparatus 50 or from another electronic apparatus 10, a wireless communication scheme with high communication speed and low latency may be used, such as a wireless communication scheme conforming to the fifth generation mobile communication systems (5G). For example, a wireless communication scheme conforming to 5G may be used in Steps s2 and s3 described above.

As described above, after the phone application is started, the electronic apparatus 10 according to one example can perform processing based on the movement state of the other-party apparatus 10, in response to receiving a place call command of phone communication to be performed with the other-party apparatus 10 issued by the subject apparatus user. Because the user can use such an electronic apparatus 10 as described above, convenience of the electronic apparatus 10 is enhanced. The following is a description of various specific examples of Step s4.

First Example

Figure 10:
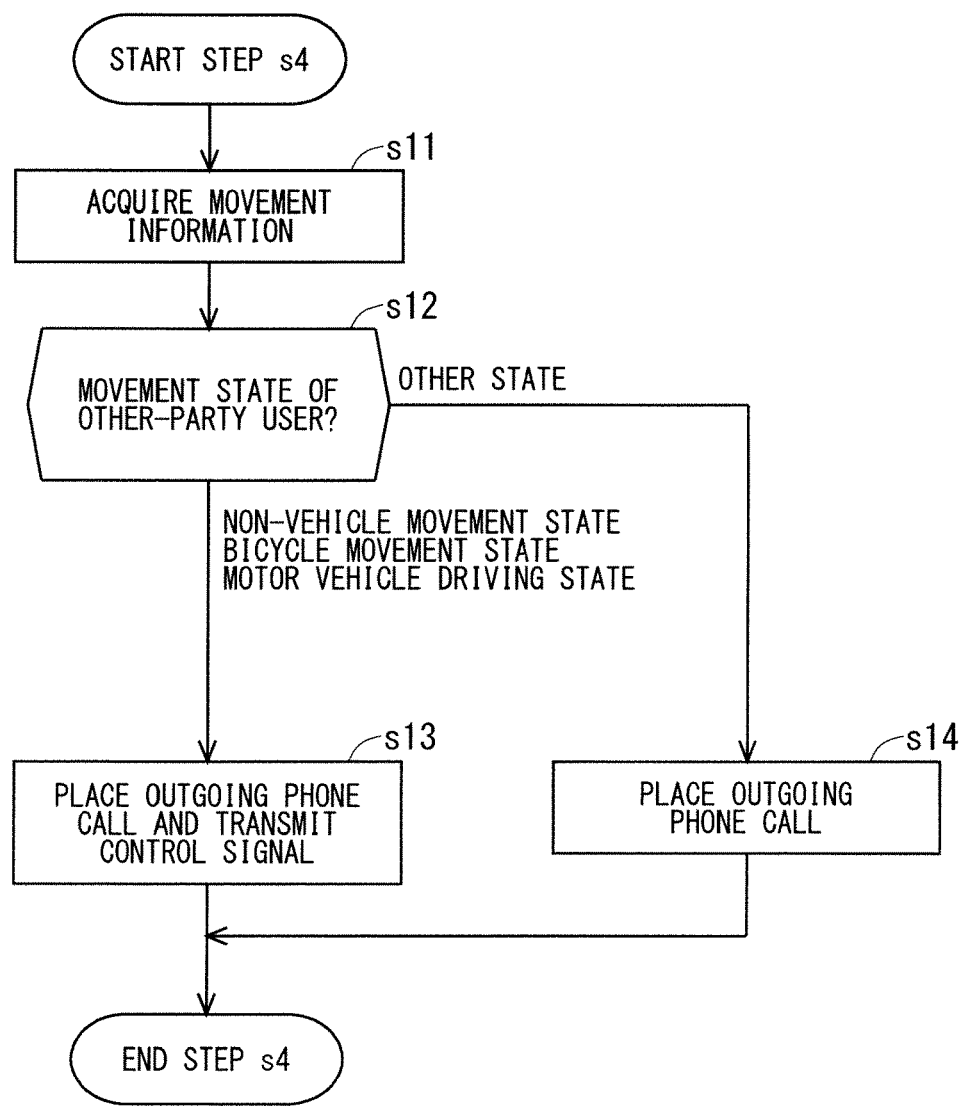
FIG. 10 is a flowchart illustrating one example of operation of the electronic apparatus.

In one example, in Step s4, the controller 100 of the command-received apparatus 10 controls the incoming phone call notification of the target other-party apparatus 10, according to the movement state of the target other-party user determined based on the movement information of the target other-party apparatus 10. This configuration enhances convenience of the electronic apparatus 10. FIG. 10 is a flowchart illustrating Step s4 according to one example.

As illustrated in FIG. 10, in Step s1, the controller 100 of the command-received apparatus 10 acquires movement information from the apparatus information of the target other-party apparatus 10. Next, in Step s12, the controller 100 determines the movement state of the target other-party user, based on the acquired movement information. In Step s12, if it is determined that the movement state of the user is the non-vehicle movement state, Step s13 is executed. In other words, if the movement information of the target other-party apparatus 10 indicates the non-vehicle movement state, Step s13 is executed. Further, in Step s12, if it is determined that the movement state of the user is the bicycle movement state, Step s13 is executed. In other words, if the movement information of the target other-party apparatus 10 indicates the bicycle movement state, Step s13 is executed. Further, in Step s12, if it is determined that the movement state of the user is the motor vehicle driving state, Step s13 is executed. In other words, if the movement information of the target other-party apparatus 10 indicates the bicycle movement state, Step s13 is executed.

In contrast, in Step s12, if it is determined that the movement state of the user is a state other than the non-vehicle movement state, the bicycle movement state, and the motor vehicle driving state, Step s14 is executed. In other words, if the movement information of the target other-party apparatus 10 indicates a state other than the non-vehicle movement state, the bicycle movement state, and the motor vehicle driving state, Step s14 is executed.

Note that, when the latest apparatus information acquired by the command-received apparatus 10 does not include the movement information, i.e., when the user of the target other-party apparatus 10 is stopping, Step s14 is executed.

In Step s13, the controller 100 generates an incoming call notification control signal for controlling the incoming phone call notification of the target other-party apparatus 10. Specifically, the controller 100 generates an incoming call notification control signal for commanding no execution of the incoming phone call notification using sound. Further, the command-received apparatus 10 places an outgoing call of phone communication to the target other-party apparatus 10, and transmits the generated incoming call notification control signal. In the target other-party apparatus 10 that has received the outgoing call of phone communication from the command-received apparatus 10, the controller 100 controls the target other-party apparatus 10 so that the target other-party apparatus 10 does not give the incoming phone call notification using sound in response to the received incoming call notification control signal, regardless of details of the settings related to the incoming call notification of the subject apparatus. In other words, the controller 100 does not allow the speaker 160 to output a phone ringtone, regardless of details of the settings related to the incoming call notification of the subject apparatus.

In Step s14, the command-received apparatus 10 places an outgoing call of phone communication to the target other-party apparatus 10. In this case, the incoming call notification control signal transmitted in Step s13 is not transmitted to the target other-party apparatus 10. The target other-party apparatus 10 that has received the outgoing call of Step s14 gives the incoming phone call notification according to the settings related to the incoming call notification of the subject apparatus.

When the target other-party apparatus 10 responds to the outgoing phone call from the command-received apparatus 10, phone communication is performed between the command-received apparatus 10 and the target other-party apparatus 10. In the command-received apparatus 10 performing the phone communication, voice input to the microphone 170 is transmitted to the target other-party apparatus 10 from the wireless communication unit 110. In the target other-party apparatus 10 performing the phone communication, voice received by the wireless communication unit 110 is output through the receiver 150 or the speaker 160. Further, in the target other-party apparatus 10 performing the phone communication, voice input to the microphone 170 is transmitted from the wireless communication unit 110 to the command-received apparatus 10. In the command-received apparatus 10 performing the phone communication, voice received by the wireless communication unit 110 is output through the receiver 150 or the speaker 160.

As described above, in one example, when the movement state of the target other-party user is the non-vehicle movement state, the controller 100 controls the target other-party apparatus 10 so that the target other-party apparatus 10 does not output a phone ringtone. With this configuration, the user moving on their own is less likely to notice an incoming phone call of the electronic apparatus 10. As a result, the user is less likely to operate the electronic apparatus 10 while the user is moving on their own. Operating the electronic apparatus 10 while the user is in a walking state or a running state may be dangerous. In one example, the user is less likely to operate the electronic apparatus 10 while the user is moving on their own, and thus safety of the user and people around the user can be enhanced. As a result, convenience of the electronic apparatus 10 is enhanced.

Further, in one example, when the movement state of the target other-party user is the bicycle movement state, the controller 100 controls the target other-party apparatus 10 so that the case, target other-party apparatus 10 does not output a phone ringtone. With this configuration, the user moving by riding a bicycle is less likely to notice an incoming phone call of the electronic apparatus 10. As a result, the user is less likely to operate the electronic apparatus 10 while the user is moving by riding a bicycle. Operating the electronic apparatus 10 while the user is moving by riding a bicycle may be dangerous. In one example, the user is less likely to operate the electronic apparatus 10 while the user is moving by riding a bicycle, and thus safety of the user and people around the user can be enhanced. As a result, convenience of the electronic apparatus 10 is enhanced.

Further, in one example, when the movement state of the target other-party user is the motor vehicle driving state, the controller 100 controls the target other-party apparatus 10 so that the target other-party apparatus 10 does not output a phone ringtone. With this configuration, the user driving a motor vehicle is less likely to notice an incoming call of phone communication of the electronic apparatus 10. As a result, the user is less likely to operate the electronic apparatus 10 while the user is driving a motor vehicle. Operating the electronic apparatus 10 in a state in which the user is driving a motor vehicle may be dangerous. In one example, the user is less likely to operate the electronic apparatus 10 while the user is driving a motor vehicle, and thus safety of the user and people around the user can be enhanced. As a result, convenience of the electronic apparatus 10 is enhanced.

Note that, when the target other-party apparatus 10 receives an outgoing phone call from the command-received apparatus 10, an incoming call history of phone communication of the target other-party apparatus 10, i.e., the incoming phone call history, includes incoming call information indicating an incoming call corresponding to the outgoing phone call from the command-received apparatus 10. Thus, the target other-party user can check incoming calls of the phone communication with the command-received apparatus 10 received in the target other-party apparatus 10 by checking the incoming phone call history of the target other-party apparatus 10. As a result, the target other-party user can cause the target other-party apparatus 10 to place an outgoing phone call to the command-received apparatus 10 while the target other-party user is stopping, for example.

In Step s13 described above, the controller 100 may generate an incoming call notification control signal for commanding no execution of the incoming phone call notification using sound and the incoming phone call notification using vibration. In this case, in the target other-party apparatus 10 that has received the outgoing phone call from the command-received apparatus 10, the controller 100 controls the target other-party apparatus 10 so that the target other-party apparatus 10 does not perform neither the incoming phone call notification using sound nor the incoming phone call notification using vibration in response to the received incoming call notification control signal, regardless of details of the settings related to the incoming call notification of the subject apparatus. With this configuration, the user moving on their own, the user moving by riding a bicycle, or the user driving a motor vehicle is further less likely to notice an incoming phone call of the electronic apparatus 10. As a result, safety of the user and people around the user can further be enhanced.

Further, after execution of Step s13, when the target other-party apparatus 10 receives the outgoing phone call of Step s13, the command-received apparatus 10 may stop the outgoing phone call. FIG. 11 is a flowchart illustrating one example of Step s4 in the above-mentioned case.

As illustrated in FIG. 11, after Step s13, in Step s15, when the controller 100 of the command-received apparatus 10 judges that the target other-party apparatus 10 has received the outgoing phone call of Step s13, the controller 100 executes Step s16. In Step s16, the controller 100 controls operation of the command-received apparatus 10 so that the command-received apparatus 10 stops the outgoing phone call to the target other-party apparatus 10. Note that, when the target other-party apparatus 10 receives the outgoing phone call from the command-received apparatus 10, the target other-party apparatus 10 notifies the command-received apparatus 10 that the target other-party apparatus 10 has received the outgoing phone call from the command-received apparatus 10. Thus, in Step s15, the command-received apparatus 10 can judge that the target other-party apparatus 10 has received the outgoing phone call of Step s13.

As in one example of FIG. 11, with the command-received apparatus 10 stopping the outgoing phone call when the target other-party apparatus 10 receives the outgoing phone call of Step s13, the target other-party user is further less likely to notice an incoming phone call of the target other-party apparatus 10. As a result, safety of the user and people around the user can further be enhanced. Note that, in this case as well, the incoming phone call history of the target other-party apparatus 10 includes incoming call information indicating an incoming call corresponding to the outgoing phone call from the command-received apparatus 10, and thus the target other-party user can check incoming calls of the phone communication with the command-received apparatus 10 received in the target other-party apparatus 10 by checking the incoming phone call history of the target other-party apparatus 10.

Further, in one example of FIG. 11, in Step s12, when it is determined that the movement state of the target other-party user is the non-vehicle movement state, in Step s13, the controller 100 may cause the wireless communication unit 110 to transmit the incoming call notification control signal and a first notification command signal to the target other-party apparatus 10. The first notification command signal refers to a signal for commanding the target other-party apparatus 10 to notify the command-received apparatus 10 that the non-vehicle movement state has finished when the target other-party apparatus 10 determines that the non-vehicle movement state has finished. In this case, in the target other-party apparatus 10 that has received the outgoing phone call from the command-received apparatus 10 and that has received the first notification command signal and the incoming call notification control signal, the controller 100 determines whether or not the non-vehicle movement state of the target other-party user has finished. For example, when the position indicated by the position information acquired by the position acquisition unit 140 stops changing, the controller 100 determines that the non-vehicle movement state of the target other-party user has finished. When the controller 100 determines that the non-vehicle movement state of the target other-party user has finished, the controller 100 generates first notification information for giving a notification that the non-vehicle movement state of the target other-party user has finished. Then, the controller 100 causes the wireless communication unit 110 to transmit the generated first notification information to the command-received apparatus 10.

Figure 12:
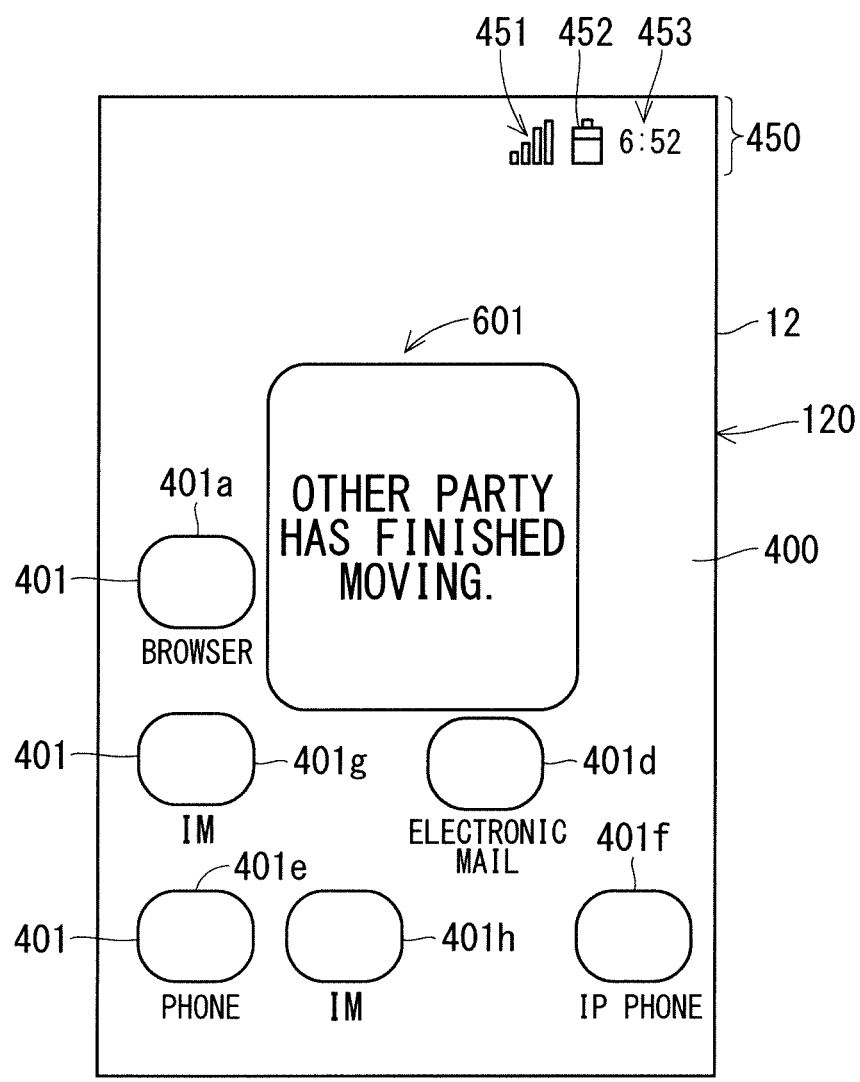
FIG. 12 is a diagram illustrating one example of display of the electronic apparatus.

In the command-received apparatus 10 that has received the first notification information, the controller 100 causes a notification unit of the subject apparatus to give a notification that the non-vehicle movement state of the target other-party user has finished. As the notification unit, for example, the display 120 is adopted. In this case, the controller 100 causes the display 120 to display first finish information 601 indicating that the non-vehicle movement state of the target other-party user has finished. FIG. 12 is a diagram illustrating a display example of the first finish information 601. In one example of FIG. 12, the first finish information 601 is superimposed and displayed on the home screen 400 that is displayed after Step s16. The user of the command-received apparatus 10 who has checked the first finish information 601 causes the command-received apparatus 10 to place an outgoing phone call to the target other-party apparatus 10 again, for example.

Further, in one example of FIG. 11, when it is determined that the movement state of the target other-party user is the bicycle movement state in Step s12, in Step s13, the controller 100 may cause the wireless communication unit 110 to transmit the incoming call notification control signal and a second notification command signal to the target other-party apparatus 10. The second notification command signal refers to a signal for commanding the target other-party apparatus 10 to notify the command-received apparatus 10 that the bicycle movement state has finished when the target other-party apparatus 10 determines that the bicycle movement state has finished. In this case, in the target other-party apparatus 10 that has received the outgoing phone call from the command-received apparatus 10 and that has received the second notification command signal and the incoming call notification control signal, the controller 100 determines whether or not the bicycle movement state of the target other-party user has finished. For example, when the position indicated by the position information acquired by the position acquisition unit 140 stops changing, the controller 100 determines that the bicycle movement state of the target other-party user has finished. When the controller 100 determines that the bicycle movement state of the target other-party user has finished, the controller 100 generates second notification information for giving a notification that the bicycle movement state of the target other-party user has finished. Then, the controller 100 causes the wireless communication unit 110 to transmit the generated second notification information to the command-received apparatus 10.

Figure 13:
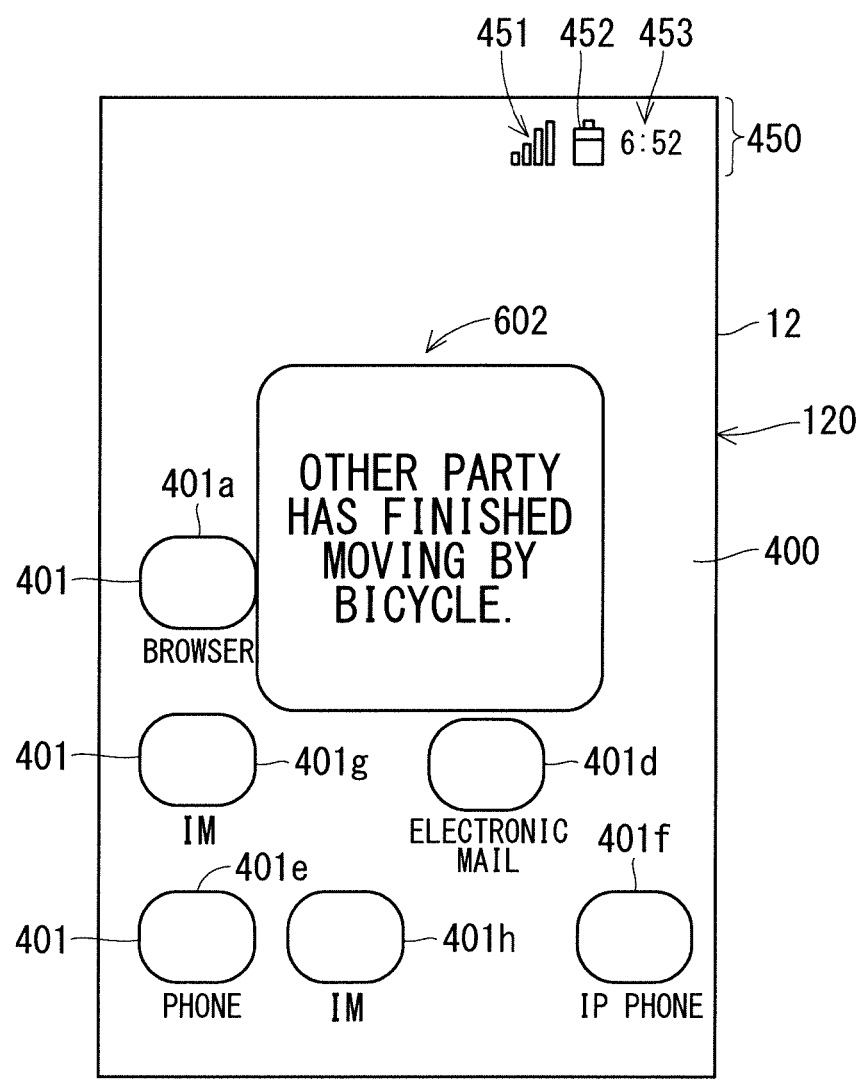
FIG. 13 is a diagram illustrating one example of display of the electronic apparatus.

In the command-received apparatus 10 that has received the second notification information, the controller 100 causes a notification unit of the subject apparatus to give a notification that the bicycle movement state of the target other-party user has finished. As the notification unit, for example, the display 120 is adopted. In this case, the controller 100 causes the display 120 to display second finish information 602 indicating that the bicycle movement state of the target other-party user has finished. FIG. 13 is a diagram illustrating a display example of the second finish information 602. In one example of FIG. 13, similarly to one example of FIG. 12 described above, the second finish information 602 is superimposed and displayed on the home screen 400. The user of the command-received apparatus 10 who has checked the second finish information 602 causes the command-received apparatus 10 place an outgoing phone call to the target other-party apparatus 10 again, for example. Note that the second finish information 602 may be the same as the first finish information 601.

Further, in one example of FIG. 11, when it is determined that the movement state of the target other-party user is the motor vehicle driving state in Step s12, in Step s13, the controller 100 may cause the wireless communication unit 110 to transmit the incoming call notification control signal and a third notification command signal to the target other-party apparatus 10. The third notification command signal is a signal for commanding the target other-party apparatus 10 to notify the command-received apparatus 10 that the motor vehicle driving state has finished when the target other-party apparatus 10 determines that the motor vehicle driving state has finished. In this case, in the target other-party apparatus 10 that has received the outgoing phone call from the command-received apparatus 10 and that has received the third notification command signal and the incoming call notification control signal, the controller 100 determines whether or not the motor vehicle driving state of the target other-party user has finished. For example, when the controller 100 determines that the engine of the motor vehicle has stopped based on the engine operation history in the storage 103, the controller 100 determines that the motor vehicle driving state of the target other-party user has finished. In other words, the controller 100 determines that driving of a motor vehicle of the target other-party user has finished. When the controller 100 determines that the motor vehicle driving state of the target other-party user has finished, the controller 100 generates third notification information indicating that the motor vehicle driving state of the target other-party user has finished. Then, the controller 100 causes the wireless communication unit 110 to transmit the generated third notification information to the command-received apparatus 10.

Figure 14:
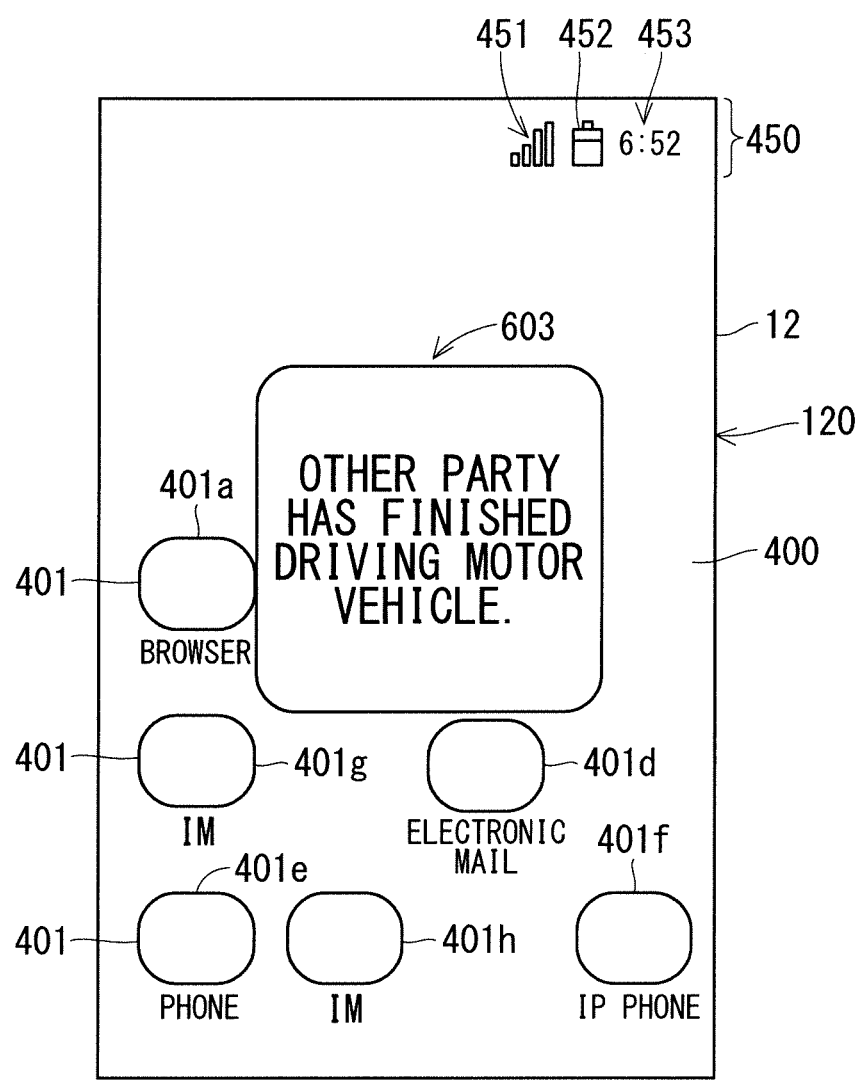
FIG. 14 is a diagram illustrating one example of display of the electronic apparatus.

In the command-received apparatus 10 that has received the third notification information, the controller 100 causes a notification unit of the subject apparatus to give a notification that the motor vehicle driving state of the target other-party user has finished. As the notification unit, for example, the display 120 is adopted. In this case, the controller 100 causes the display 120 to display third finish information 603 indicating that the motor vehicle driving state of the target other-party user has finished. FIG. 14 is a diagram illustrating a display example of the third finish information 603. In one example of FIG. 14, similarly to one example of FIG. 12 described above, the third finish information 603 is superimposed and displayed on the home screen 400. The user of the command-received apparatus 10 who has checked the third finish information 603 causes the command-received apparatus 10 to place an outgoing phone call to the for example, target other-party apparatus 10 again, for example. Note that the third finish information 603 may be the same as the first finish information 601.

The notification unit that gives a notification that the non-vehicle movement state, the bicycle movement state, or the motor vehicle driving state has finished may be other than the display 120. For example, the notification unit may be the speaker 160 or the vibrator 230. In this case, the speaker 160 outputs voice indicating that the non-vehicle movement state, the bicycle movement state, or the motor vehicle driving state has finished. Further, the vibrator 230 notifies the subject apparatus user that the non-vehicle movement state, the bicycle movement state, or the motor vehicle driving state has finished by vibrating the apparatus case 11 in a specific vibration pattern.

In this manner, the electronic apparatus 10 notifies the subject apparatus user that the non-vehicle movement state, the bicycle movement state, or the motor vehicle driving state of the user of the other-party apparatus 10 has finished. As a result, convenience of the electronic apparatus 10 is further enhanced.

In one example described above, when the movement state of the target other-party user is the non-vehicle movement state, Step s13 is executed. However, Step s14 may be executed. Further, when the movement state of the target other-party user is the bicycle movement state, Step s14 may be executed instead of Step s13. Further, when the movement state of the target other-party user is the motor vehicle driving state, Step s14 may be executed instead of Step s13.

Second Example

In one example, the apparatus information includes handsfree connection information. The handsfree connection information refers to information indicating that a handsfree apparatus for phone communication which the electronic apparatus 10 is capable of controlling is connected to the electronic apparatus 10 by wireless or wired means. The users of the electronic apparatus 10 and the handsfree apparatus are the same. In one example, if the handsfree apparatus is connected to the subject apparatus, the controller 100 generates apparatus information including the handsfree connection information. In contrast, if the handsfree apparatus is not connected to the subject apparatus, the controller 100 generates apparatus information not including the handsfree connection information.

FIG. 15 is a diagram illustrating one example of a state in which a handsfree apparatus 650 is connected to the electronic apparatus 10. The handsfree apparatus 650 illustrated in FIG. 15 includes a main body 651 and an ear hook 652. The main body 651 includes an operation button 653, a speaker 654, and a microphone 655. The handsfree apparatus 650 is worn on the ear, with the ear hook 652 being hooked over the ear of the user.

The electronic apparatus 10 can communicate with the handsfree apparatus 650, by using a short-range wireless communication scheme such as Bluetooth, for example. The electronic apparatus 10 can cause the handsfree apparatus 650 to give a notification about the incoming phone call of the subject apparatus by controlling the handsfree apparatus 650. The handsfree apparatus 650 illustrated in FIG. 15 can give the incoming phone call notification to the user of the electronic apparatus 10 by outputting a phone ringtone through the speaker 654.

Note that, in one example of FIG. 15, the electronic apparatus 10 and the handsfree apparatus 650 are wirelessly connected, but may be connected with a cable. Further, the handsfree apparatus 650 illustrated in FIG. 15 is a handsfree apparatus of a type worn over the ear of the user, but may be a handsfree apparatus of another type. Further, the handsfree apparatus 650 may give the incoming phone call notification by vibrating the main body 651.

For example, the user can perform such setting for the electronic apparatus 10 that the electronic apparatus 10 controls the handsfree apparatus 650 so that a phone ringtone is output from the handsfree apparatus 650 by operating the display surface 12 of the electronic apparatus 10. The setting may be hereinafter referred to as "handsfree setting". In the electronic apparatus 10 in which the handsfree setting is performed, the incoming phone call notification using sound and the incoming phone call notification using vibration are not performed.

When the user operates the operation button 653 while a phone ringtone is output through the speaker 654 of the handsfree apparatus 650 connected to the electronic apparatus 10 receiving an incoming phone call, the electronic apparatus 10 answers the incoming phone call and starts phone communication with the other-party apparatus 10. The electronic apparatus 10 performing the phone communication outputs voice transmitted from the other-party apparatus 10 through the speaker 654 of the handsfree apparatus 650. Further, the electronic apparatus 10 performing the phone communication transmits voice input to the microphone 655 of the handsfree apparatus 650 to the other-party apparatus 10.

In this manner, the electronic apparatus 10 can perform the phone communication with the other-party apparatus 10 using the handsfree apparatus 650 connected to the electronic apparatus 10.

Figure 16:
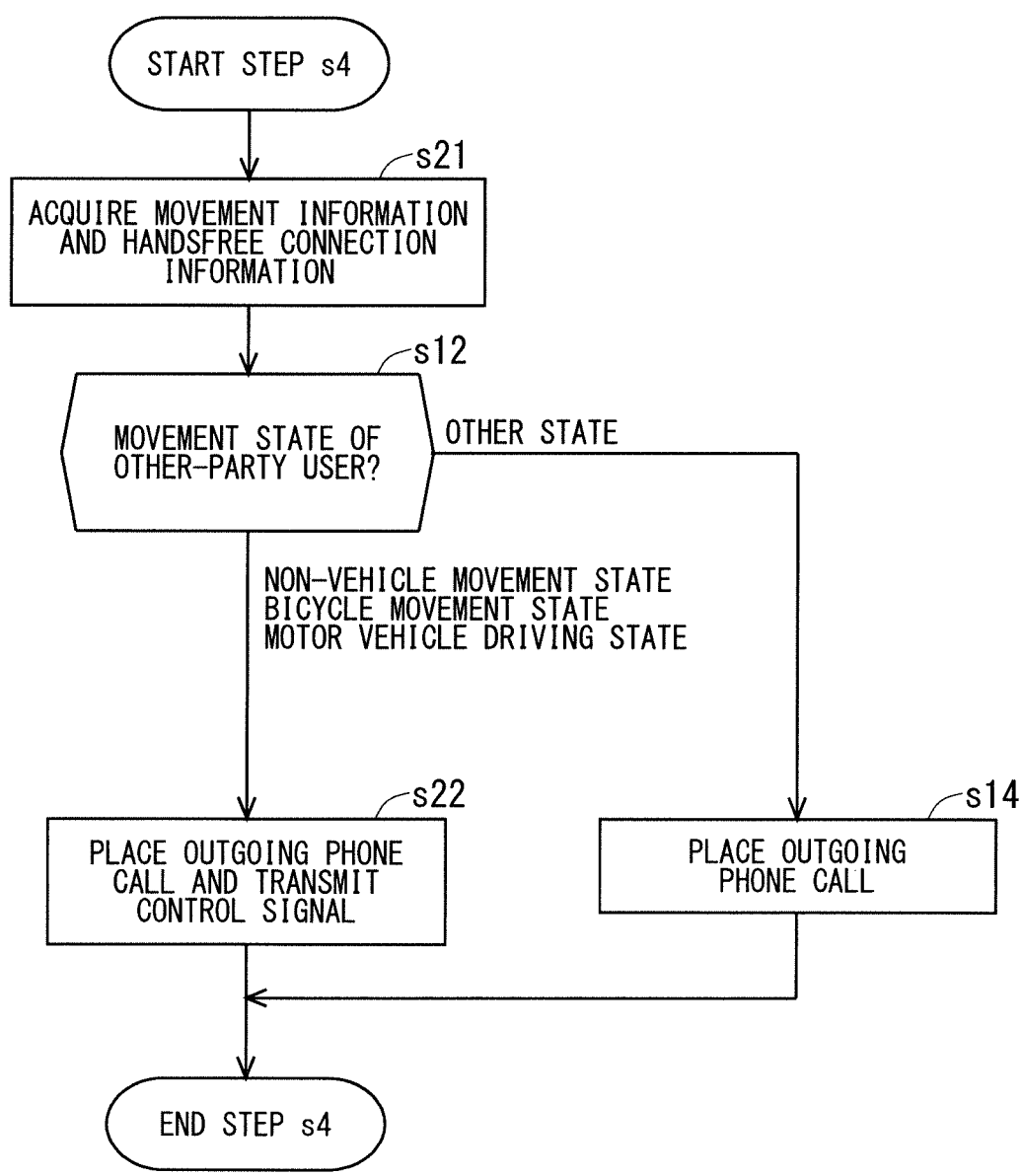
FIG. 16 is a flowchart illustrating one example of operation of the electronic apparatus.

FIG. 16 is a flowchart illustrating Step s4 according to one example. As illustrated in FIG. 16, in Step s21, the controller 100 acquires the movement information and the handsfree connection information from the apparatus information of the target other-party apparatus 10. Next, Step s12 described above is executed, and the movement state of the target other-party user is determined. In Step s12, when it is determined that the movement state of the user is the non-vehicle movement state, Step s22 is executed. Further, in Step s12, when it is determined that the movement state of the user is the bicycle movement state, Step s22 is executed. Further, in Step s12, when it is determined that the movement state of the user is the motor vehicle driving state, Step s22 is executed. In contrast, in Step s12, when it is determined that the movement state of the user is a state other than the non-vehicle movement state, the bicycle movement state, and the motor vehicle driving state, Step s14 described above is executed. If the handsfree setting is performed, the target other-party apparatus 10 that has received the outgoing phone call of Step s14 causes the handsfree apparatus 650 to execute the incoming phone call notification by controlling the handsfree apparatus 650. Specifically, the target other-party apparatus 10 controls the handsfree apparatus 650, and causes a phone ringtone to be output through the speaker 654 thereof. In contrast, if the handsfree setting is not performed, the target other-party apparatus 10 that has received the outgoing phone call of Step s14 gives the incoming phone call notification according to the settings related to the incoming call notification of the subject apparatus.

In Step s22, the controller 100 generates a control signal to be transmitted to the target other-party apparatus 10. The control signal is a signal for commanding the target other-party apparatus 10 to control the handsfree apparatus 650 so that the handsfree apparatus 650 gives the incoming phone call notification. When the controller 100 generates the control signal, the command-received apparatus 10 places an outgoing call of phone communication to the target other-party apparatus 10, and transmits the generated control signal to the target other-party apparatus 10.

In the target other-party apparatus 10 that has received the outgoing call of phone communication from the command-received apparatus 10 and that has received the control signal, the controller 100 causes the handsfree apparatus 650 to give the incoming phone call notification by controlling the handsfree apparatus 650 via the wireless communication unit 110, regardless of whether or not the handsfree setting is performed for the subject apparatus. Specifically, the target other-party apparatus 10 controls the handsfree apparatus 650, and causes a phone ringtone to be output through the speaker 654 thereof.

Note that, when the latest apparatus information acquired by the command-received apparatus 10 does not include the movement information, Step s14 described above is executed. Further, when the latest apparatus information acquired by the command-received apparatus 10 includes the movement information but does not include the handsfree connection information, i.e., when the handsfree apparatus 650 is not connected to the target other-party apparatus 10, the command-received apparatus 10 may operate similarly to the first example described above.

As described above, in one example, when the movement state of the target other-party user is the non-vehicle movement state, the controller 100 controls the target other-party apparatus 10 so that the handsfree apparatus 650 gives the incoming phone call notification based on control of the target other-party apparatus 10. With this configuration, the user moving on their own can call the user of the other-party apparatus 10 by using the handsfree apparatus 650. Thus, the user is less likely to operate the electronic apparatus 10 in a state in which the user is moving on their own. As a result, convenience of the electronic apparatus 10 is enhanced.

Further, in one example, when the movement state of the target other-party user is the bicycle movement state, the controller 100 controls the target other-party apparatus 10 so that the handsfree apparatus 650 gives the incoming phone call notification based on control of the target other-party apparatus 10. With this configuration, the user moving by riding a bicycle can call the user of the other-party apparatus 10 by using the handsfree apparatus 650. Thus, the user is less likely to operate the electronic apparatus 10 in a state in which the user is moving by riding a bicycle. As a result, convenience of the electronic apparatus 10 is enhanced.

Further, in one example, when the movement state of the target other-party user is the motor vehicle driving state, the controller 100 controls the target other-party apparatus 10 so that the handsfree apparatus 650 gives the incoming phone call notification based on control of the target other-party apparatus 10. With this configuration, the user driving a motor vehicle can call the user of the other-party apparatus 10 by using the handsfree apparatus 650. Thus, the user is less likely to operate the electronic apparatus 10 in a state in which the user is driving a motor vehicle. As a result, convenience of the electronic apparatus 10 is enhanced.

In one example described above, when the movement state of the target other-party user is the non-vehicle movement state, Step s22 is executed. However, Step s14 may be executed. Further, when the movement state of the target other-party user is the bicycle movement state, Step s14 may be executed instead of Step s22. Further, when the movement state of the target other-party user is the motor vehicle driving state, Step s14 may be executed instead of Step s22.

Third Example

In one example, the apparatus information transmitted by the electronic apparatus 10 includes the address book stored in the electronic apparatus 10, the position information of the electronic apparatus 10, and speed information indicating speed of the electronic apparatus 10. In the electronic apparatus 10 according to one example, the controller 100 obtains the speed of the subject apparatus. The controller 100 can obtain the speed of the subject apparatus, based on the position information acquired in the position acquisition unit 140, for example. The controller 100 may obtain the speed of the subject apparatus, based on the acceleration detection results. The controller 100 according to one example generates apparatus information including the address book stored in the storage 103, the position information acquired in the position acquisition unit 140, the speed information indicating the obtained speed of the subject apparatus, and the movement information, and causes the wireless communication unit 110 to transmit the generated apparatus information.

Figure 17:
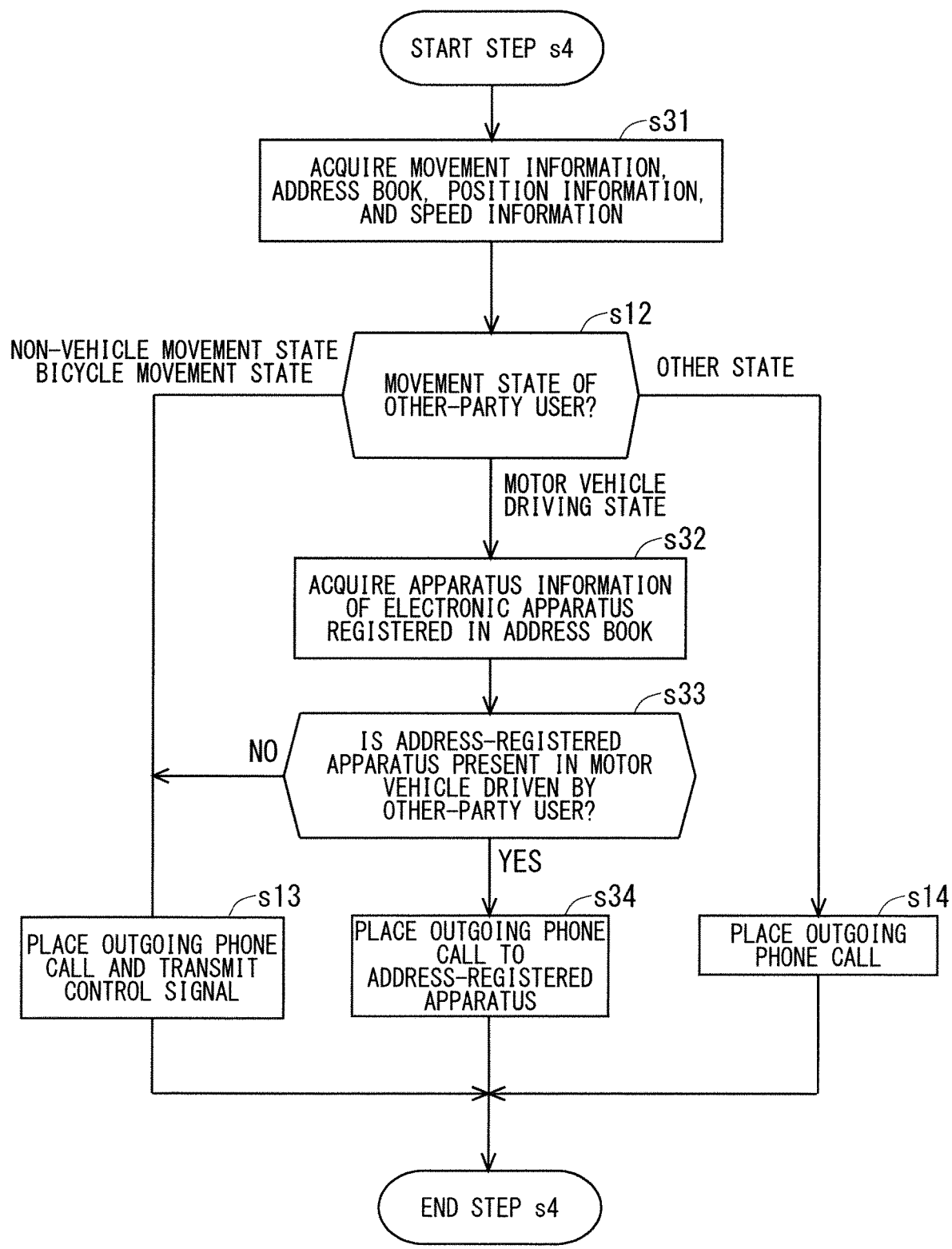
FIG. 17 is a flowchart illustrating one example of operation of the electronic apparatus.

FIG. 17 is a flowchart illustrating Step s4 according to one example. Basically, Step s4 according to one example is different from Step s illustrated in FIG. 10 described above in the operation of the command-received apparatus 10 when the movement state of the target other-party user is the motor vehicle driving state.

As illustrated in FIG. 17, in Step s31, the controller 100 of the command-received apparatus 10 acquires the movement information, the address book, the position information, and the speed information from the apparatus information of the target other-party apparatus 10. Next, Step s12 described above is executed, and the movement state of the target other-party user is determined. In Step s12, when it is determined that the movement state of the user is the non-vehicle movement state, Step s13 described above is executed. In Step s12, when it is determined that the movement state of the user is the bicycle movement state, Step s13 described above is executed. In Step s12, when it is determined that the movement state of the user is the motor vehicle driving state, Step s32 is executed. In Step s12, when it is determined that the movement state of the user is a state other than the non-vehicle movement state, the bicycle movement state, and the motor vehicle driving state, Step s14 described above is executed.

In Step s32, the controller 100 acquires the apparatus information of each electronic apparatus 10 other than the target other-party apparatus 10 that is registered in the address book acquired in Step s31. Specifically, the controller 100 acquires telephone numbers assigned to the electronic apparatuses 10 other than the target other-party apparatus 10 from the address book. Then, the controller 100 generates a third request signal including the acquired telephone numbers. The third request signal is a signal for requesting the server apparatus 50 to transmit apparatus information of the electronic apparatus 10 assigned the telephone number included in the third request signal. Then, the controller 100 causes the wireless communication unit 110 to transmit the third request signal to the server apparatus 50. The controller 100 performs such processing by using the telephone number of each electronic apparatus 10 other than the target other-party apparatus 10 that is registered in the address book. The electronic apparatus 10 other than the target other-party apparatus 10 that is registered in the address book of the target other-party apparatus 10 may be hereinafter simply referred to as an "address-registered apparatus 10".

In the server apparatus 50 that has received the third request signal, the controller 51 reads the apparatus information corresponding to the telephone number (i.e., identification information) included in the third request signal from the storage 53. Then, the controller 51 causes the communication unit 54 to transmit the read apparatus information to the command-received apparatus 10. With this configuration, the command-received apparatus 10 can acquire the apparatus information of each address-registered apparatus 10.

After Step s32, in Step s33, the controller 100 determines whether or not the address-registered apparatus 10 is present in the motor vehicle driven by the target other-party user, based on the apparatus information of each address-registered apparatus 10 acquired in Step s32. The motor vehicle driven by the target other-party user may be hereinafter referred to as a "target motor vehicle". Further, the address-registered apparatus 10 being described may be hereinafter referred to as a "target address-registered apparatus 10".

In Step s33, the controller 100 acquires the position information and the speed information from the apparatus information of the target address-registered apparatus 10 acquired in Step s32. Then, the controller 100 determines whether or not the target address-registered apparatus 10 is present in the target motor vehicle, based on the position information and the speed information of the target other-party apparatus 10 acquired in Step s31 and the position information and the speed information of the target address-registered apparatus 10. When the positions of the target other-party apparatus 10 and the target address-registered apparatus 10 are close to each other and the speeds of the target other-party apparatus 10 and the target address-registered apparatus 10 are substantially the same, the controller 100 determines that the target address-registered apparatus 10 is present in the case, target motor vehicle. When a distance between the position indicated by the position information of the target other-party apparatus 10 and the position indicated by the position information of the target address-registered apparatus 10 is equal to or less than a threshold, the controller 100 determines that the positions of the target other-party apparatus 10 and the target address-registered apparatus 10 are close to each other. Further, when an absolute value of a difference between the speed indicated by the speed information of the target other-party apparatus 10 and the speed indicated by the speed information of the target address-registered apparatus 10 is equal to or less than a threshold, the controller 100 determines that the speeds of the target other-party apparatus 10 and the target address-registered apparatus 10 are substantially the same.

In this manner, for each address-registered apparatus 10, the controller 100 determines whether or not the address-registered apparatus 10 is present in the target motor vehicle. If the controller 100 determines that at least one address-registered apparatus 10 is present in the target motor vehicle, the process proceeds to YES in Step s33. In contrast, if the controller 100 determines that none of the address-registered apparatuses 10 is present in the target motor vehicle, the process proceeds to NO in Step s33.

If the process proceeds to NO in Step s33, Step s13 described above is executed. In contrast, if the process proceeds to YES in Step s33, Step s34 is executed. In Step s34, the controller 100 controls operation of the command-received apparatus 10 so that the command-received apparatus 10 places an outgoing phone call to the address-registered apparatus 10 present in the target motor vehicle instead of placing an outgoing phone call to the target other-party apparatus 10. In Step s33, when a plurality of address-registered apparatuses 10 present in the target motor vehicle are determined, the command-received apparatus 10 places an outgoing phone call to any one address-registered apparatus 10 out of the plurality of address-registered apparatuses 10. The address-registered apparatus 10 that has received the outgoing phone call from the command-received apparatus 10 gives the incoming phone call notification according to the settings related to the incoming call notification of the subject apparatus.

As described above, in one example, when the movement state of the target other-party apparatus 10 is the motor vehicle driving state, the controller 100 determines the electronic apparatus 10 other than the target other-party apparatus 10 present in the motor vehicle driven by the target other-party user. In other words, when the movement state of the target other-party apparatus 10 is the motor vehicle driving state, the controller 100 determines an apparatus capable of phone communication other than the target other-party apparatus 10 present in the target motor vehicle. Then, the controller 100 controls operation of the command-received apparatus 10 so that the command-received apparatus 10 places an outgoing phone call to the determined electronic apparatus 10. With this configuration, the command-received apparatus 10 can give the incoming phone call notification to the electronic apparatus 10 of other occupants in the motor vehicle, instead of the electronic apparatus 10 of the user who is driving the motor vehicle. Thus, the user who is driving the motor vehicle can be less likely to operate the electronic apparatus 10. As a result, convenience of the electronic apparatus 10 is enhanced.

Note that, in one example as well, similarly to one example of FIG. 11 described above, Steps s15 and s16 may be executed after Step s13.

Further, in one example as well, similarly to the second example described above, if the handsfree apparatus is connected to the subject apparatus, the electronic apparatus 10 may generate apparatus information including the handsfree connection information, and if the handsfree apparatus is not connected to the subject apparatus, the electronic apparatus 10 may generate the apparatus information not including the handsfree connection information. In this case, if the controller 100 can acquire the handsfree connection information from the apparatus information of the target other-party apparatus 10 in Step s31, the controller 100 executes Steps s12, s14, and s22 similarly to FIG. 16 described above. In contrast, if the controller 100 cannot acquire the handsfree connection information from the apparatus information of the target other-party apparatus 10, the controller 100 executes Steps s12 to s14 and Steps s32 to s34 similarly to FIG. 17.

Further, in one example described above, when the movement state of the target other-party user is the non-vehicle movement state, Step s13 is executed. However, Step s14 may be executed. Further, when the movement state of the target other-party user is the bicycle movement state, Step s14 may be executed instead of Step s13.

Fourth Example

Figure 18:
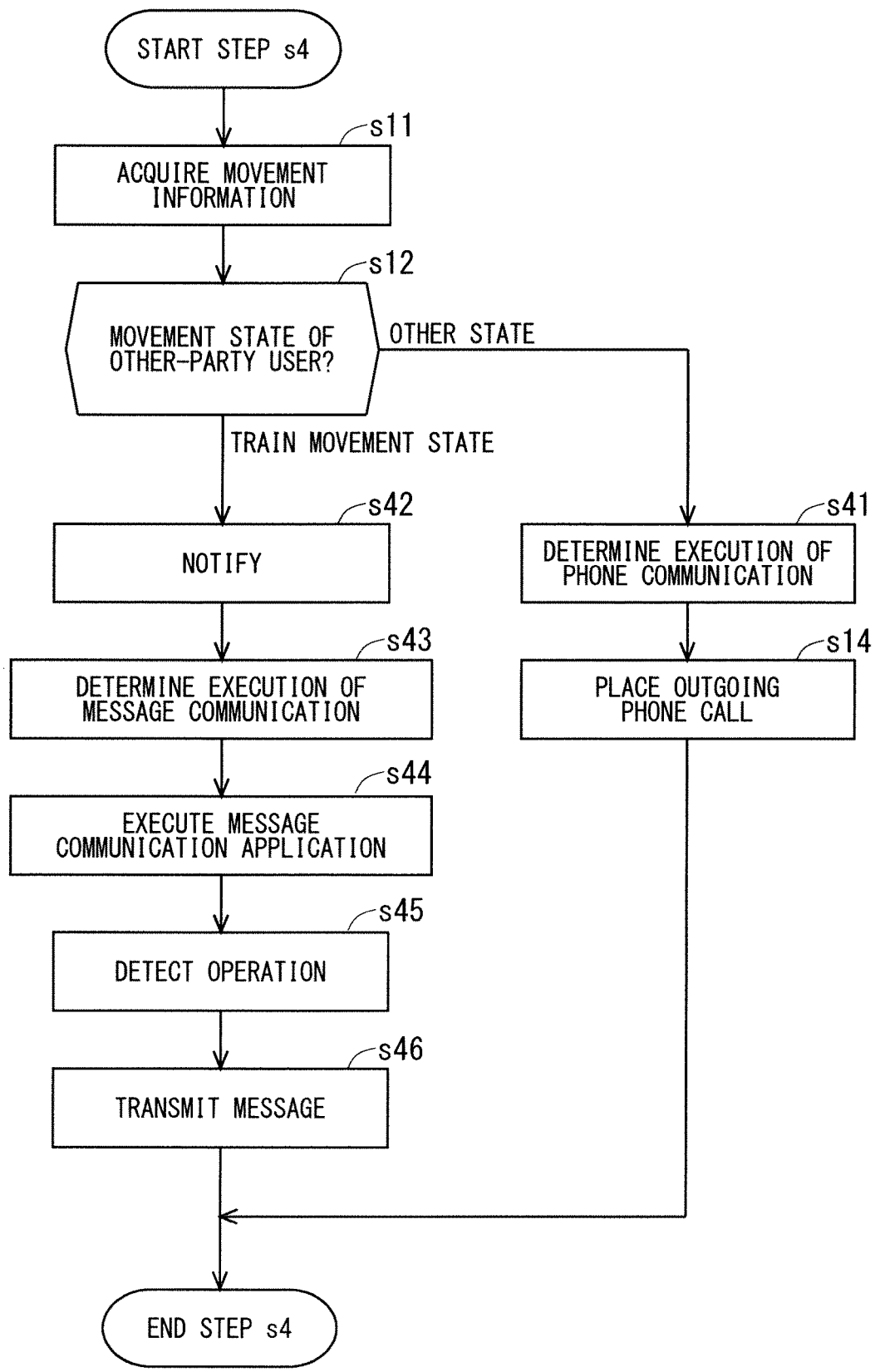
FIG. 18 is a flowchart illustrating one example of operation of the electronic apparatus.

In one example, in Step s4, the controller 100 of the command-received apparatus 10 determines which of the phone communication or the message communication is to be performed by the command-received apparatus 10, according to the movement state of the target other-party user determined based on the movement information of the target other-party apparatus 10. This configuration enhances convenience of the electronic apparatus 10. FIG. 18 is a flowchart illustrating Step s4 according to one example.

As illustrated in FIG. 18, Steps s11 and s12 described above are executed. In Step s12, when it is determined that the movement state of the target other-party user is the train movement state, Step s42 is executed. In contrast, when it is determined that the movement state of the target other-party user is a state other than the train movement state, in Step s41, the controller 100 determines that the command-received apparatus 10 is to perform the phone communication. Subsequently, Step s14 described above is executed.

Figure 19:
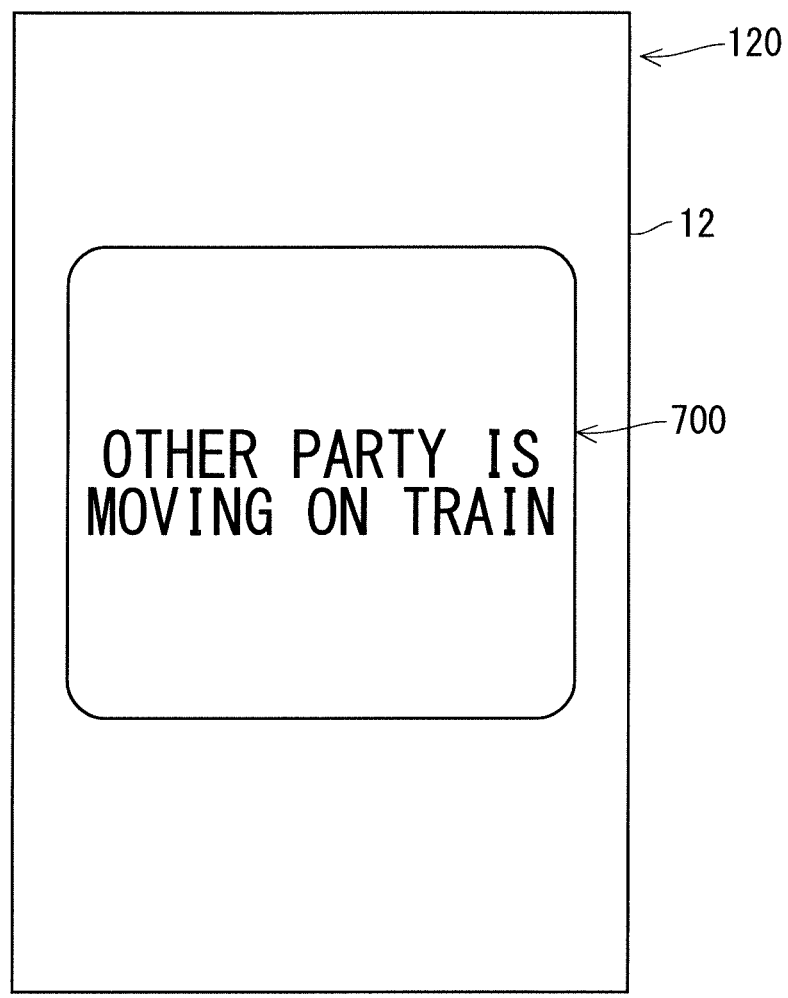
FIG. 19 is a diagram illustrating one example of display of the electronic apparatus.

In Step s42, the controller 100 notifies a notification unit of the command-received apparatus 10 that the movement state of the target other-party user is the train movement state. As the notification unit, for example, the display 120 is adopted. In this case, the controller 100 causes the display 120 to display information 700 indicating that the movement state of the target other-party user is the train movement state. FIG. 19 is a diagram illustrating a display example of the information 700. Note that the controller 100 may notify a notification unit other than the display 120 that the movement state of the target other-party user is the train movement state.

When the display 120 displays the information 700 for a predetermined period of time, in Step s43, the controller 100 determines that the command-received apparatus 10 is to perform the message communication. Then, in Step s44, the controller 100 executes the message communication application in the storage 103. In this case, the controller 100 may execute the electronic mail application or may execute the IM application.

After Step s44, in Step s45, the touch panel 130 detects a transmission destination selection operation being an operation of selecting a message transmission destination, a message input operation, and a message transmit command operation (i.e., a transmit message command operation), each of which is performed on the display surface 12. The user of the command-received apparatus 10 selects the target other-party apparatus 10 as the transmission destination of the message. After Step s45, in Step s46, the controller 100 transmits a message to the selected other-party apparatus 10, i.e., the target other-party apparatus 10.

In the target other-party apparatus 10 that has received the message from the command-received apparatus 10, the message communication application is started, and the controller 100 causes the display 120 to display the received message. With this configuration, the target other-party user can check the message from the command-received apparatus 10.

Note that Step s42 need not be executed. In other words, the notification unit need not notify the subject apparatus user that the movement state of the target other-party user is the train movement state.

Further, when the message communication application is intended to be executed in Step s44, the controller 100 may arrange that the message transmission destination is automatically set to the target other-party apparatus 10. With this configuration, in Step s45, the user no longer needs to perform the transmission destination selection operation on the display surface 12.

As described above, in one example, when the movement state of the target other-party user is the train movement state, the controller 100 determines execution of the message communication, and executes the message communication application. With this configuration, when the target other-party user is moving by riding a train, the target other-party apparatus 10 can receive a message from the target other-party apparatus 10 instead of receiving an outgoing phone call from the command-received apparatus 10. When the user moving by riding a train places a call by using the electronic apparatus 10, the user may bother people around the user. As in one example, when the target other-party user is moving by riding a train, with the target other-party apparatus 10 receiving a message from the target other-party apparatus 10 instead of receiving an outgoing phone call from the command-received apparatus 10, people around the target other-party user can be less likely to be bothered. As a result, convenience of the electronic apparatus 10 is enhanced.

Note that, in the first to third examples described above, when it is determined in Step s12 that the movement state of the target other-party user is the train movement state, similarly to FIG. 18, Steps s42 to s46 may be executed.

Further, while a create message screen of the message communication application started in Step s44 is displayed on the display 120, the controller 100 may execute predetermined processing when the controller 100 determines that the target other-party user has alighted from a train. The processing in which the controller 100 executes predetermined processing when the controller 100 determines that the target other-party user has alighted from a train while a create message screen of the message communication application started in Step s44 is displayed may be hereinafter referred to as "train-alighting processing".

Figure 21:
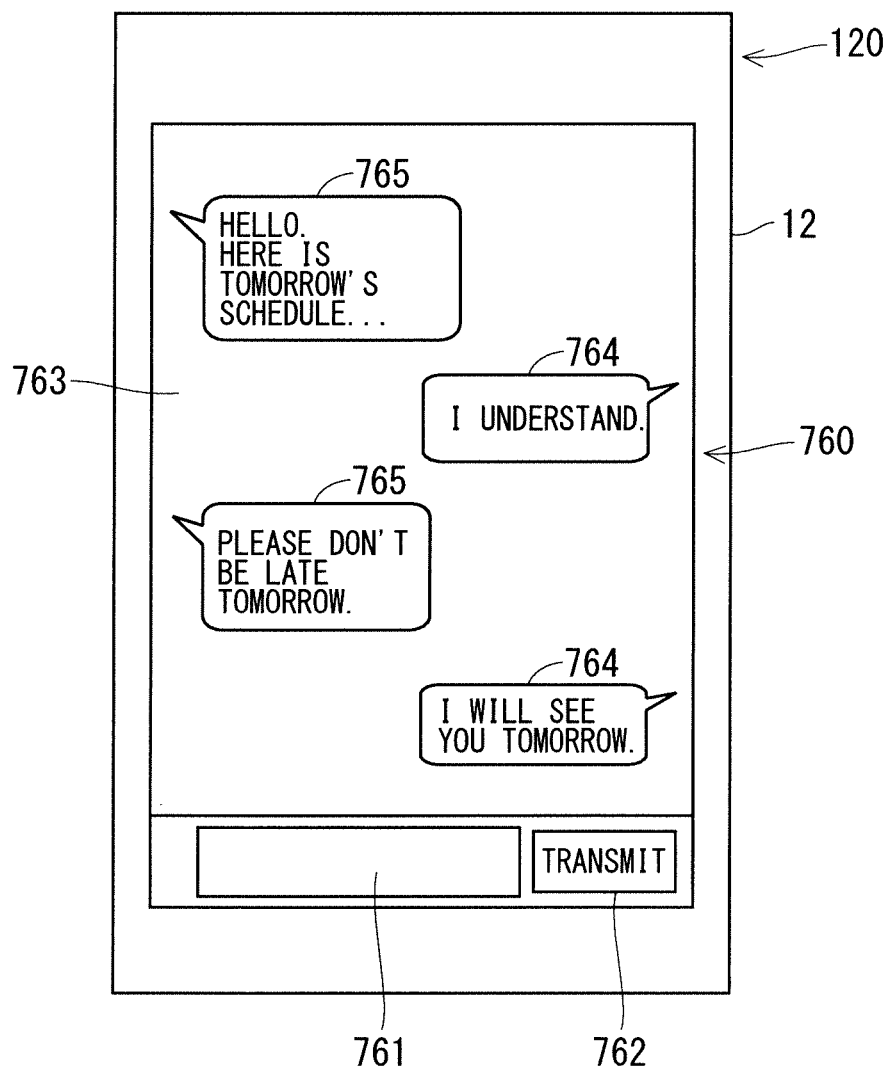
FIG. 21 is a diagram illustrating one example of display of the electronic apparatus.

FIG. 20 is a diagram illustrating one example of a create message screen 750 when the message communication application being executed is the electronic mail application. FIG. 21 is a diagram illustrating one example of a create message screen 760 when the message communication application being executed is the IM application. It can also be said that the create message screen 750 is an electronic mail create screen 750. Further, when the create message screen 760 is displayed, the message transmission destination is already selected in the electronic apparatus 10 executing the IM application.

As illustrated in FIG. 20, for example, the create message screen 750 comprises a destination bar 751 for indicating a message transmission destination, a title bar 752 for indicating a title, a text bar 753 for indicating a text, and a transmit button 754. The user can input the message transmission destination, the title, and the text to the electronic apparatus 10 by operating the display surface 12 displaying the create message screen 750. Then, for example, when a tap operation is performed on the transmit button 754, the electronic apparatus 10 transmits a message created according to a command of the user.

In contrast, as illustrated in FIG. 21, the create message screen 760 of the IM application comprises a message bar 761 for indicating a message to be transmitted, i.e., a message input by the user, a transmit button 762, and a history screen 763. The history screen 763 comprises transmitted messages 764 that are previously transmitted, and received messages 765 that are previously received. The user can input the message to be transmitted to the electronic apparatus 10 by operating the display surface 12 displaying the create message screen 760. Then, for example, when a tap operation is performed on the transmit button 762, the electronic apparatus 10 transmits an input message. It can also be said that the create message screen 760 of the IM application is a transmitted/received message display screen that displays transmitted/received messages.

Figure 22:
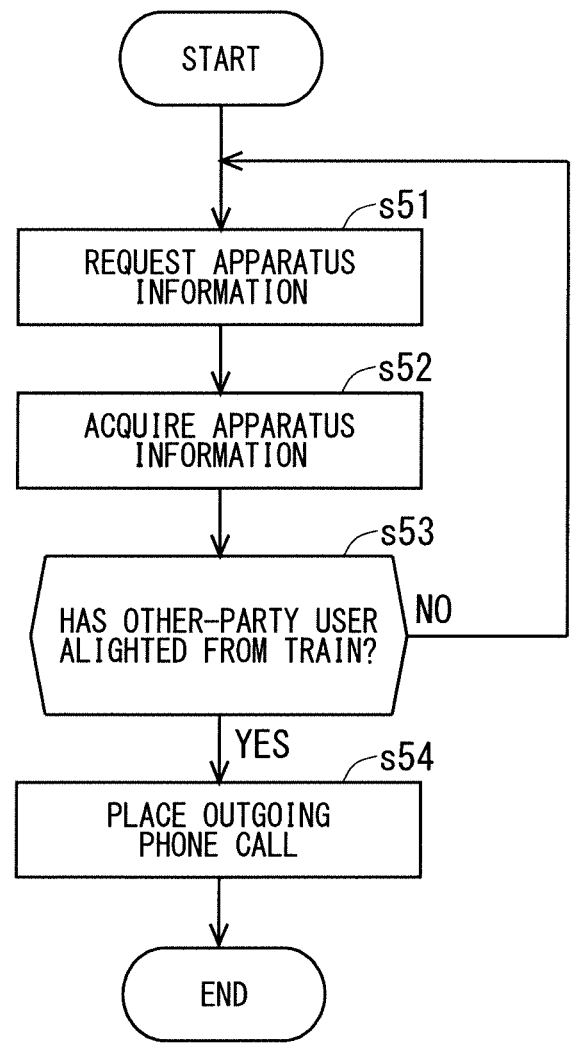
FIG. 22 is a flowchart illustrating one example of operation of the electronic apparatus.

FIG. 22 is a flowchart illustrating one example of the train-alighting processing. For example, the train-alighting processing is executed between the time when the create message screen is first displayed on the display 120 after the message communication application is started in Step s44 and the time when the create message screen stops being displayed on the display 120.

When the message communication application is started in Step s44 and the create message screen is displayed on the display 120, Step s51 is executed as illustrated in FIG. 22. In Step s51, the controller 100 generates the first request signal described above for requesting the server apparatus 50 to transmit apparatus information of the target other-party apparatus 10. Then, the controller 100 causes the wireless communication unit 110 to transmit the generated first request signal to the server apparatus 50.

After Step s51, in Step s52, when the command-received apparatus 10 receives the latest apparatus information of the target other-party apparatus 10, Step s53 is executed. In Step s53, the controller 100 determines whether or not the target other-party user has alighted from a train, based on the apparatus information received in Step s52. The controller 100 determines that the target other-party user has alighted from a train if the movement information included in the apparatus information received in Step s52 indicates a state other than the train movement state. In contrast, the controller 100 determines that the target other-party user has not alighted from a train if the movement information included in the apparatus information received in Step s52 indicates the train movement state.

In Step s53, if it is determined that the target other-party user has alighted from a train, Step s54 is executed. In Step s54, the controller 100 controls operation of the command-received apparatus 10 so that the command-received apparatus 10 places an outgoing call of phone communication with the target other-party apparatus 10. In other words, in Step s54, the command-received apparatus 10 places an outgoing phone call to the target other-party apparatus 10. When Step s54 is executed, the train-alighting processing ends.

In contrast, in Step s53, if it is determined that the target other-party user has not alighted from a train, Step s51 is executed again. After this operation, the command-received apparatus 10 operates in a manner similar to the above. Note that, even if the process does not proceed to YES in Step s53, the train-alighting processing ends when the create message screen first displayed after the message communication application is started in Step s44 stops being displayed.

In this manner, in the train-alighting processing illustrated in FIG. 22, when the command-received apparatus 10 determines that the target other-party user has alighted from a train while the create message screen is displayed on the display 120, the command-received apparatus 10 automatically places an outgoing phone call to the target other-party apparatus 10. Thus, when the target other-party user alights from a train while the user of the command-received apparatus 10 creates a message, the user can place an originally intended call to the target other-party user without operating the command-received apparatus 10. As a result, convenience of the electronic apparatus 10 is further enhanced.

In the train-alighting processing of FIG. 22, the command-received apparatus 10 automatically places an outgoing phone call to the target other-party apparatus 10 without a command from the user. However, the command-received apparatus 10 may place an outgoing phone call to the target other-party apparatus 10 when there is a command from the user. FIG. 23 is a flowchart illustrating one example of the train-alighting processing in the above-mentioned case.

As illustrated in FIG. 23, Steps s51 to s53 described above are executed. If the process proceeds to YES in Step s53, Step s61 is executed. In contrast, if the process proceeds to NO in Step s53, Step s51 is executed again. After this operation, the command-received apparatus 10 operates in a manner similar to the above.

In Step s61, the controller 100 causes a notification unit to give a notification suggesting that the user make a selection as to whether or not the command-received apparatus 10 places an outgoing call of phone communication with the target other-party apparatus 10. As the notification unit, for example, the display 120 is adopted. In this case, for example, the controller 100 causes the display 120 to display a selection screen 770 for allowing the subject apparatus user to make a selection as to whether or not the command-received apparatus 10 places an outgoing call of phone communication with the target other-party apparatus 10.

Figure 24:
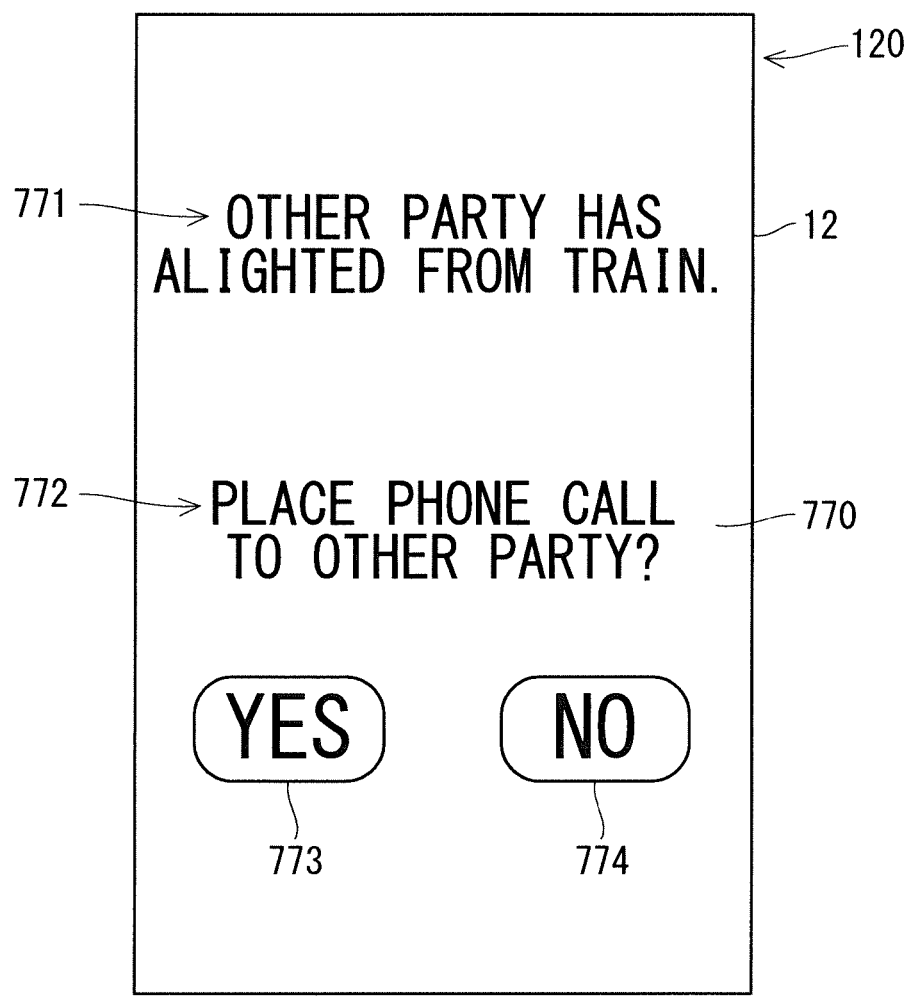
FIG. 24 is a diagram illustrating one example of display of the electronic apparatus.

FIG. 24 is a diagram illustrating one example of the selection screen 770. As illustrated in FIG. 24, the selection screen 770 comprises pieces of information 771 and 772 and select buttons 773 and 774. The information 771 is information indicating that the target other-party user has alighted from a train. The information 772 is information for asking the user to make a selection as to whether or not the command-received apparatus 10 places an outgoing phone call to the target other-party apparatus 10. The select button 773 is a button to be operated when the user makes a selection that the command-received apparatus 10 places an outgoing phone call to the target other-party apparatus 10. In other words, the select button 773 is a button to be operated when the user selects execution of an outgoing phone call to the target other-party apparatus 10. The select button 774 is a button to be operated when the user makes a selection that the command-received apparatus 10 does not place an outgoing phone call to the target other-party apparatus 10. In other words, the select button 774 is a button to be operated when the user selects non-execution of an outgoing phone call to the target other-party apparatus 10. The user can notify the electronic apparatus 10 that the user has selected execution of an outgoing phone call to the target other-party apparatus 10 by performing a tap operation on the select button 773, for example. Alternatively, the user can notify the electronic apparatus 10 that the user has selected non-execution of an outgoing phone call to the target other-party apparatus 10 by performing a tap operation on the select button 774, for example. Note that the information 771 need not necessarily be shown on the selection screen 770.

After the selection screen 770 is displayed in Step s61, in Step s62, the controller 100 judges whether the subject apparatus user has selected execution of an outgoing phone call to the target other-party apparatus 10 or has selected non-execution of an outgoing phone call to the target other-party apparatus 10, based on detection results obtained from the touch panel 130. If the touch panel 130 detects an operation performed on the select button 773, the controller 100 judges that the subject apparatus user has selected execution of an outgoing phone call. In contrast, if the touch panel 130 detects an operation performed on the select button 774, the controller 100 judges that the subject apparatus user has selected non-execution of outgoing phone call.

In Step s62, if it is judged that execution of an outgoing phone call has been selected, in Step s63, the controller 100 controls operation of the command-received apparatus 10 so that the command-received apparatus 10 places an outgoing call of phone communication with the target other-party apparatus 10. In other words, the command-received apparatus 10 places an outgoing phone call to the target other-party apparatus 10. When Step s63 is executed, the train-alighting processing ends. In contrast, in Step s62, if it is judged that non-execution of an outgoing phone call has been selected, the train-alighting processing ends.

Note that the notification unit that gives a notification suggesting that the user make a selection as to whether or not the command-received apparatus 10 places an outgoing call of phone communication with the target other-party apparatus 10 in Step s61 may be other than the display 120. For example, the speaker 160 may output voice for suggesting the user make a selection as to whether or not the command-received apparatus 10 places an outgoing call of phone communication with the target other-party apparatus 10. Alternatively, the user may be notified to make a selection as to whether or not the command-received apparatus 10 places an outgoing call of phone communication with the target other-party apparatus 10 by the vibrator 230 vibrating the apparatus case 11 in a specific vibration pattern. Alternatively, at least two of the display 120, the speaker 160, and the vibrator 230 may notify the user to make a selection as to whether or not the command-received apparatus 10 places an outgoing call of phone communication with the target other-party apparatus 10. When at least one of the speaker 160 and the vibrator 230 notifies the user to make a selection as to whether or not the command-received apparatus 10 places an outgoing call of phone communication with the target other-party apparatus 10, the subject apparatus user can select execution of an outgoing phone call or select non-execution of an outgoing phone call by performing a predetermined operation on the display surface 12. Alternatively, the subject apparatus user may select execution of an outgoing phone call or select non-execution of an outgoing phone call by inputting predetermined voice to the microphone 170.

As described above, in one example of FIG. 23, when the controller 100 determines that the target other-party user has alighted from a train while the create message screen is displayed, the controller 100 causes the notification unit to give a notification suggesting that the user make a selection as to whether or not the command-received apparatus 10 places an outgoing phone call to the target other-party apparatus 10. In this manner, when the target other-party user alights from a train while the user of the command-received apparatus 10 creates a message, the user can make a selection as to whether or not the command-received apparatus 10 places an outgoing phone call to the target other-party apparatus 10. As a result, convenience of the electronic apparatus 10 is further enhanced.

Fifth Example

Figure 25:
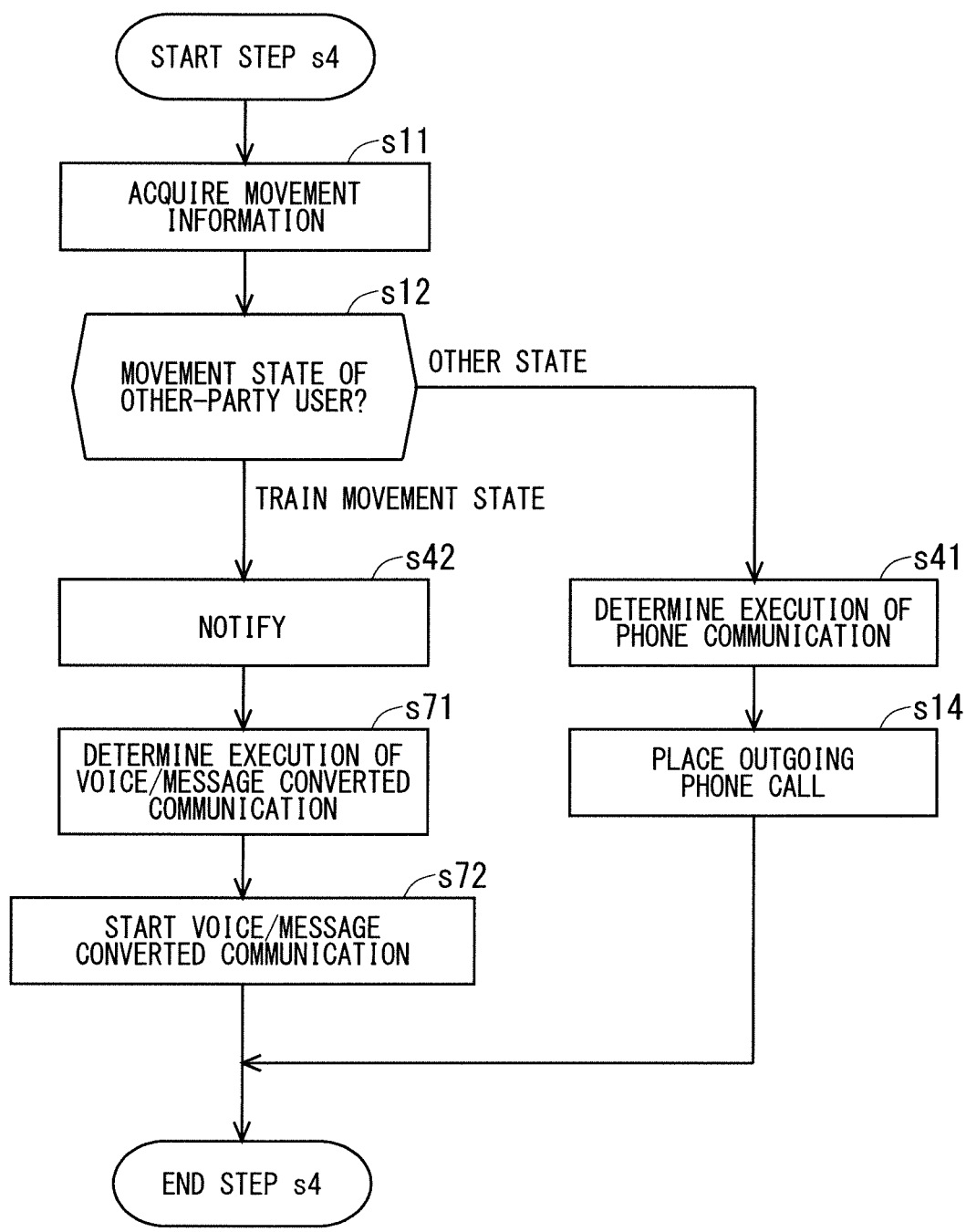
FIG. 25 is a flowchart illustrating one example of operation of the electronic apparatus.

FIG. 25 is a flowchart illustrating Step s4 according to one example. In the flowchart illustrated in FIG. 25, Steps s71 and s72 are executed instead of Steps s43 to s46 of the flowchart illustrated in FIG. 18 described above.

As illustrated in FIG. 25, Steps s11 and s12 described above are executed. In Step s12, if it is determined that the movement state of the target other-party user is the train movement state, Step s42 described above is executed, and the information 700 is displayed on the display 120 of the command-received apparatus 10. When the display 120 displays the information 700 for a predetermined period of time, Step s71 is executed. In contrast, if it is determined that the movement state of the target other-party user is a state other than the train movement state, Steps s41 and s14 described above are executed, and the command-received apparatus 10 places an outgoing phone call to the target other-party apparatus 10.

In Step s71, the controller 100 determines execution of voice/message converted communication. Then, in Step s72, the command-received apparatus 10 starts voice/message converted communication with the target other-party apparatus 10.

Here, the voice/message converted communication is communicate in which voice of the user input to the command-received apparatus 10 is converted into a message, the message is displayed on the target other-party apparatus 10, a message to be transmitted to the target other-party apparatus 10 is converted into voice, and the voice is output from the command-received apparatus 10. In a case where the voice/message converted communication is performed between the command-received apparatus 10 and the target other-party apparatus 10, when the user of the command-received apparatus 10 inputs voice to the command-received apparatus 10, the voice is converted into a message of the message communication application and is input to the target other-party apparatus 10, and the message is displayed on the target other-party apparatus 10. In contrast, when the user of the target other-party apparatus 10 inputs a message to the target other-party apparatus 10, the message is converted into voice and is input to the command-received apparatus 10, and the voice is output from the command-received apparatus 10.

Figure 26:
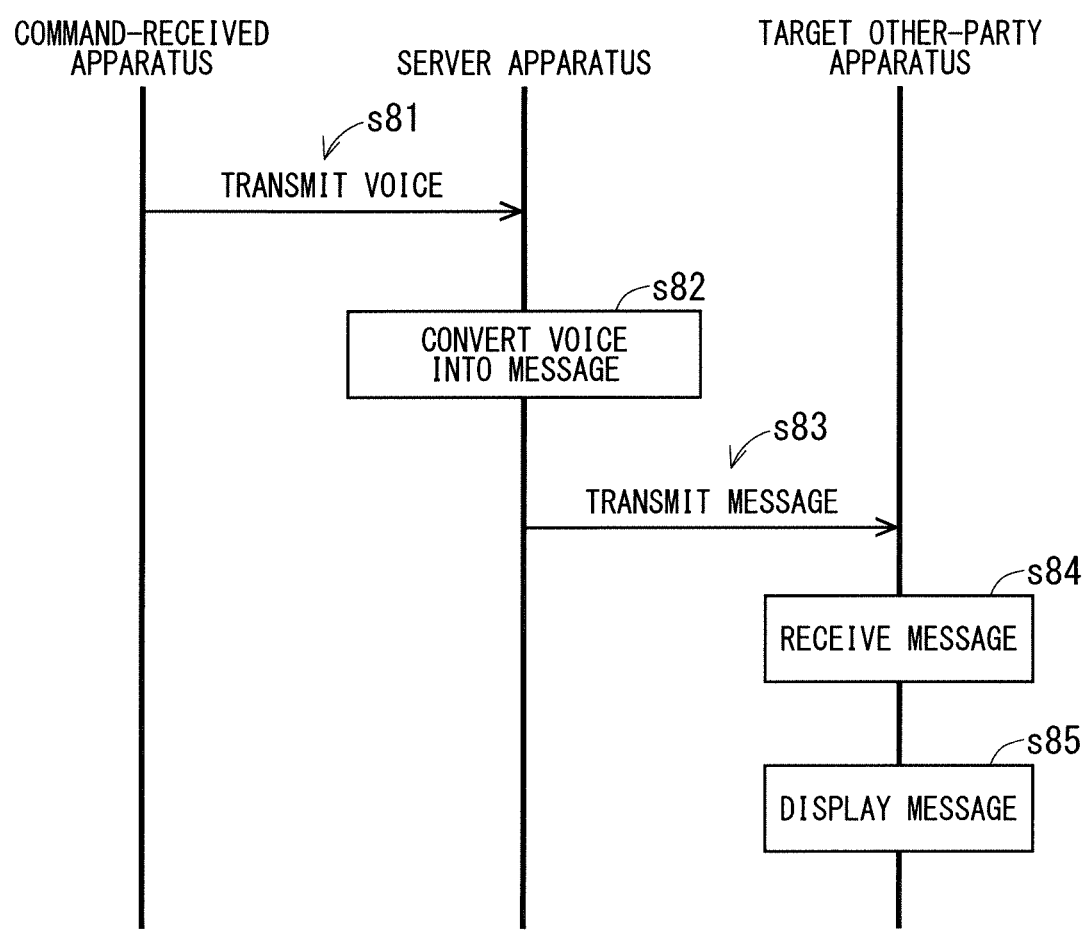
FIG. 26 is a flowchart illustrating one example of operation of the processing system.
Figure 27:
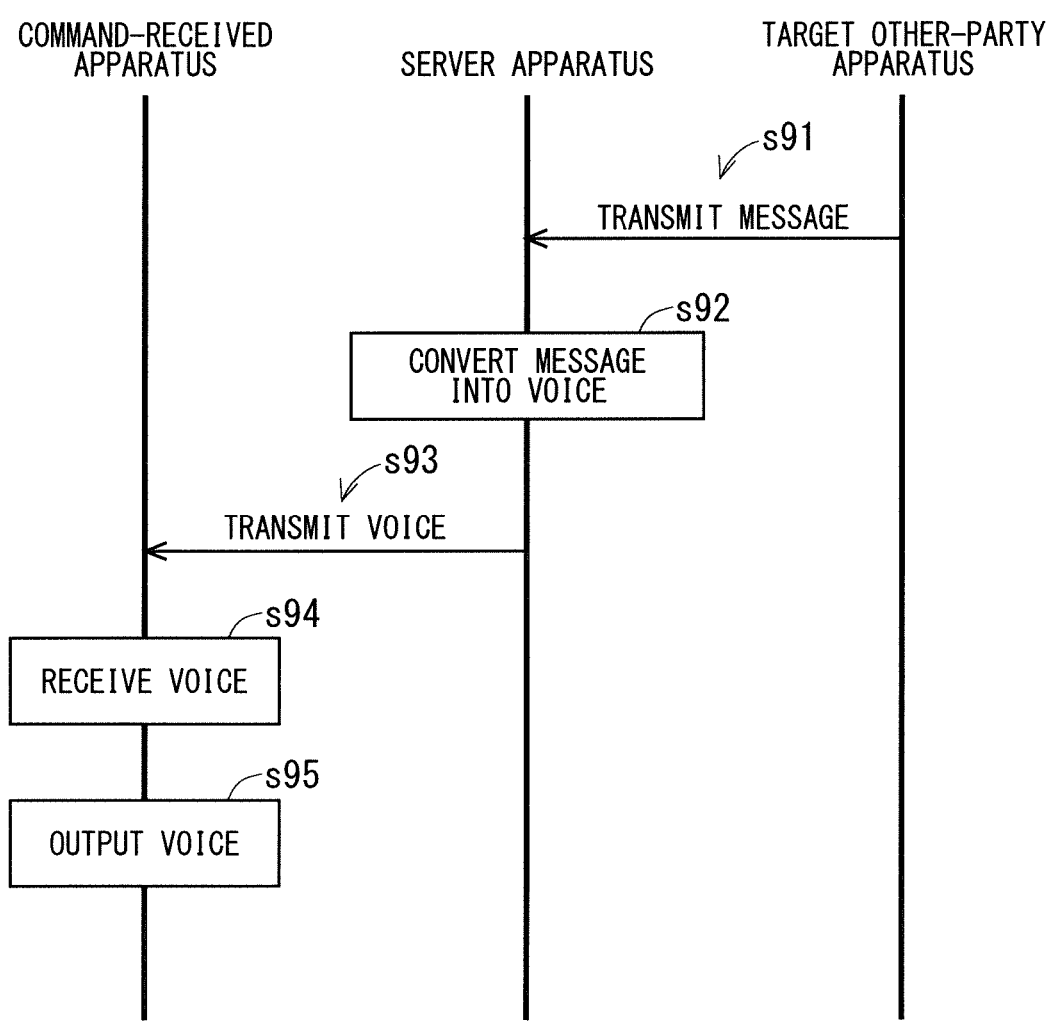
FIG. 27 is a flowchart illustrating one example of operation of the processing system.

FIG. 26 and FIG. 27 are each a diagram for describing the voice/message converted communication performed between the command-received apparatus 10 and the target other-party apparatus 10. The command-received apparatus 10 and the target other-party apparatus 10 perform the voice/message converted communication via the server apparatus 50, for example.

In Step s71, when execution of the voice/message converted communication is determined, as illustrated in FIG. 26, in Step s81, the command-received apparatus 10 executing the phone application transmits voice input to the microphone 170 of the subject apparatus to the server apparatus 50. Specifically, the controller 100 of the command-received apparatus 10 causes the wireless communication unit 110 to transmit a voice signal output from the microphone 170 to the server apparatus 50. In this case, the controller 100 also causes the wireless communication unit 110 to transmit a first conversion command signal to the server apparatus 50. The first conversion command signal is a signal for commanding the server apparatus 50 to convert voice to be transmitted from the command-received apparatus 10 into a message for the message communication application. The voice transmitted from the command-received apparatus 10 is, for example, converted into a message for the IM application.

In the server apparatus 50 that has received the voice signal and the first conversion command signal from the command-received apparatus 10, in Step s82, the controller 51 converts voice represented by the received voice signal into a message for the IM application according to the first conversion command signal. Specifically, the controller 51 transcribes the voice represented by the voice signal from the command-received apparatus 10 into text, and converts the transcribed text into a message. Subsequently, in Step s83, the controller 51 causes the communication unit 54 to transmit the generated message to the target other-party apparatus 10.

When the target other-party apparatus 10 receives the message from the server apparatus 50 in Step s84, in Step s85, the target other-party apparatus 10 causes the display 120 to display the received message. In Step s85, the controller 100 of the target other-party apparatus 10 starts the IM application in the storage 103. Then, the controller 100 causes the display 120 to display the message from the server apparatus 50. In this manner, as in FIG. 21 described above, the message from the server apparatus 50 is shown as the received message 765 on the create message screen 760 (i.e., the transmitted/received message display screen) for creating a message to be transmitted to the command-received apparatus 10. For example, if the voice transmitted by the command-received apparatus 10 is voice uttered by a person when the person reads text "hello", the text "hello" is shown as the received message 765 on the create message screen 760.

When voice is input to the command-received apparatus 10 afterwards, Steps s81 to s85 are executed, such that the voice input to the command-received apparatus 10 is converted into a message. Then, the message obtained through the conversion is displayed on the target other-party apparatus 10.

In contrast, in the target other-party apparatus 10 performing the voice/message converted communication, as illustrated in FIG. 27, in Step s91, the controller 100 executing the IM application causes the wireless communication unit 110 to transmit a message created by the target other-party user and addressed to the command-received apparatus 10 to the server apparatus 50. In this case, the controller 100 also causes the wireless communication unit 110 to transmit a second conversion command signal to the server apparatus 50. The second conversion command signal is a signal for commanding the server apparatus 50 to convert a message to be transmitted from the target other-party apparatus 10 into voice.

In the server apparatus 50 that has received the message and the second conversion command signal from the target other-party apparatus 10, in Step s92, the controller 51 converts the received message into voice according to the second conversion command signal. Specifically, the controller 51 converts the message from the target other-party apparatus 10 into a voice signal that represents voice that may be uttered by a person when the person reads the message. Subsequently, in Step s93, the controller 51 causes the communication unit 54 to transmit the generated voice signal to the command-received apparatus 10. For example, if the message transmitted by the target other-party apparatus 10 is text "thank you", in Step s92, a voice signal representing voice that may be uttered by a person when the person reads the text "thank you" is generated.

When the command-received apparatus 10 receives the voice signal from the server apparatus 50 in Step s94, in Step s95, the command-received apparatus 10 externally outputs voice represented by the received voice signal. In Step s95, the controller 100 inputs the voice signal from the server apparatus 50 to the receiver 150, for example. The receiver 150 converts the input voice signal into voice, and outputs the voice.

When a message is transmitted from the target other-party apparatus 10 afterwards, Steps s91 to s95 are executed, such that the message transmitted from the target other-party apparatus 10 is converted into voice. Then, the voice obtained through the conversion is output from the command-received apparatus 10.

In Step s72, when the command-received apparatus 10 executing the phone application stops executing the phone application after the voice/message converted communication between the command-received apparatus 10 and the target other-party apparatus 10 is started, the voice/message converted communication between the command-received apparatus 10 and the target other-party apparatus 10 ends.

As can be understood from the description above, the user of the command-received apparatus 10 can use the command-received apparatus 10 in a similar manner, whether the command-received apparatus 10 performs the phone communication or the voice/message converted communication with the target other-party apparatus 10. Further, the user of the target other-party apparatus 10 can also use the target other-party apparatus 10 in a similar manner, whether the target other-party apparatus 10 performs the message communication or the voice/message converted communication with the command-received apparatus 10.

As described above, in one example, when the movement state of the target other-party user is the train movement state, the controller 100 of the command-received apparatus 10 determines execution of the voice/message converted communication. With this configuration, when the target other-party user is moving by riding a train, the target other-party apparatus 10 can receive a message from the target other-party apparatus 10 instead of receiving an outgoing phone call from the command-received apparatus 10. As a result, people around the target other-party user can be less likely to be bothered. At the same time, the user of the command-received apparatus 10 who originally intends to have the command-received apparatus 10 execute phone communication can use the command-received apparatus 10 similarly to when the command-received apparatus 10 performs phone communication. Specifically, the user of the command-received apparatus 10 can communicate with the user of the target other-party apparatus 10 by inputting voice to the command-received apparatus 10 and hearing voice output from the command-received apparatus 10. As a result, convenience of the electronic apparatus 10 is enhanced.

Note that, in the first to third examples described above, when it is determined in Step s12 that the movement state of the target other-party user is the train movement state, similarly to FIG. 25, Step s42, Step s71, and Step s72 may be executed.

Further, in one example described above, the voice/message converted communication between the command-received apparatus 10 and the target other-party apparatus 10 are performed via the server apparatus 50. However, the voice/message converted communication may be performed without using the server apparatus 50. In this case, the controller 100 of the command-received apparatus 10 may convert voice input to the microphone 170 into a message, and the command-received apparatus 10 may transmit the message to the target other-party apparatus 10. Alternatively, the controller 100 of the target other-party apparatus 10 may convert voice (i.e., voice signal) transmitted from the command-received apparatus 10 into a message, and the target other-party apparatus 10 may display the message. Further, the controller 100 of the target other-party apparatus 10 may convert a message addressed to the command-received apparatus 10 into voice, and the target other-party apparatus 10 may transmit a voice signal representing the voice to the command-received apparatus 10. Alternatively, the controller 100 of the command-received apparatus 10 may convert a message from the target other-party apparatus 10 into voice, and the command-received apparatus 10 may output the voice.

Sixth Example

In Step s4 according to one example, the controller 100 of the command-received apparatus 10 notifies a notification unit of the subject apparatus of the movement state of the target other-party user determined in Step s12 during an outgoing call of phone communication with the target other-party apparatus 10. As the notification unit, for example, the display 120 is adopted. In this case, during an outgoing call of phone communication with the target other-party apparatus 10 after Step s14 described above (see FIG. 10 and other figures), the controller 100 causes the display 120 to display information 790 indicating the movement state of the target other-party user determined in Step s12. Further, the controller 100 may cause the display 120 to display the information 790 during an outgoing call of phone communication with the target other-party apparatus 10 after Step s13 described above (see FIG. 10 and other figures). Further, the controller 100 may cause the display 120 to display the information 790 during an outgoing call of phone communication with the target other-party apparatus 10 after Step s22 described above (see FIG. 16).

FIG. 28 is a diagram illustrating a display example of the information 790. As illustrated in FIG. 28, in the command-received apparatus 10, a placing outgoing call screen 780 is displayed on the display 120 during an outgoing call of phone communication with the target other-party apparatus 10. The placing outgoing call screen 780 is also referred to as a calling screen. The placing outgoing call screen 780 comprises information 781, an image 782, and an outgoing call stop button 783. The information 781 is information indicating that an outgoing phone call is being placed. The image 782 is an image included in information related to the target other-party apparatus 10, which is included in the address book in the storage 103. The outgoing call stop button 783 is a button for ping the outgoing phone call. For example, when the user of the command-received apparatus 10 performs a tap operation on the outgoing call stop button 783, the command-received apparatus 10 stops the outgoing phone call to the target other-party apparatus 10. The placing outgoing call screen 780 further comprises information 790 indicating the movement state of the target other-party user. One example of FIG. 28 illustrates the information 790 of a case where the movement state of the target other-party user determined in Step s12 is the train movement state.

Note that a notification unit that gives a notification of the movement state of the target other-party user determined in Step s12 during an outgoing phone call may be other than the display 120. For example, the notification unit may be the receiver 150, the speaker 160, or the vibrator 230. Further, at least two of the display 120, the receiver 150, the speaker 160, and the vibrator 230 may notify the user of the command-received apparatus 10 of the movement state of the target other-party user determined in Step s12 during an outgoing phone call.

Further, when the command-received apparatus 10 causes the notification unit to give a notification of the movement state of the target other-party user determined in Step s12 during an outgoing phone call, Step s13 need not be executed in the flowchart illustrated in FIG. 10 described above. In this case, in Step s12, when the movement state of the target other-party user is determined, Step s14 is executed regardless of the determined movement state. Then, during an outgoing call of phone communication with the target other-party apparatus 10 after Step s14, the movement state of the target other-party user determined in Step s12 is notified from the notification unit to the user of the command-received apparatus 10.

As described above, in one example, the command-received apparatus 10 notifies the subject apparatus user of the movement state of the target other-party user during an outgoing call of phone communication with the target other-party apparatus 10. Thus, the user of the command-received apparatus 10 can perform processing according to the movement state of the target other-party user that is notified from the command-received apparatus 10. For example, when the movement state of the target other-party user is the train movement state, the user of the command-received apparatus 10 can operate the outgoing call stop button 783 and cause the command-received apparatus 10 to stop the outgoing call of phone communication with the target other-party apparatus 10. In this manner, people around the target other-party user are less likely to be bothered. As a result, convenience of the electronic apparatus 10 is enhanced.

<Example of Other Use of Apparatus Information>

In one example described above, the electronic apparatus 10 uses the apparatus information acquired from the server apparatus 50 in processing in response to the place call command. However, the electronic apparatus 10 may use the apparatus information in other processing. For example, when the electronic apparatus 10 displays the address book, the incoming phone call history, or the outgoing phone call history, the electronic apparatus 10 may use the apparatus information acquired from the server apparatus 50. FIG. 29 is a flowchart illustrating one example of operation of the electronic apparatus 10 in the above-mentioned case. The electronic apparatus 10 being described may be hereinafter referred to as a "target electronic apparatus 10".

As illustrated in FIG. 29, in the target electronic apparatus 10, in Step s101, the touch panel 130 detects an operation commanding a display of the address book. Next, in Step s102, the controller 100 of the target electronic apparatus 10 generates a fourth request signal for requesting the server apparatus 50 to transmit apparatus information of each electronic apparatus 10 other than the subject apparatus that is registered in the address book of the storage 103. The fourth request signal includes a telephone number assigned each electronic apparatus 10 other than the target electronic apparatus 10 that is registered in the address book in the storage 103. The controller 100 causes the wireless communication unit 110 to transmit the generated fourth request signal to the server apparatus 50.

In the server apparatus 50 that has received the fourth request signal, the controller 51 reads apparatus information corresponding to each telephone number included in the fourth request signal from the storage 53. Then, the server apparatus 50 transmits the read apparatus information to the target electronic apparatus 10. In this manner, the target electronic apparatus 10 can acquire the apparatus information of each electronic apparatus 10 other than the subject apparatus that is registered in the address book.

After Step s102, in Step s103, when the target electronic apparatus 10 acquires the apparatus information of each electronic apparatus 10 other than the subject apparatus registered in the address book, Step s104 is executed. In Step s104, the controller 100 causes the display 120 to display the address book in the storage 103.

Figure 30:
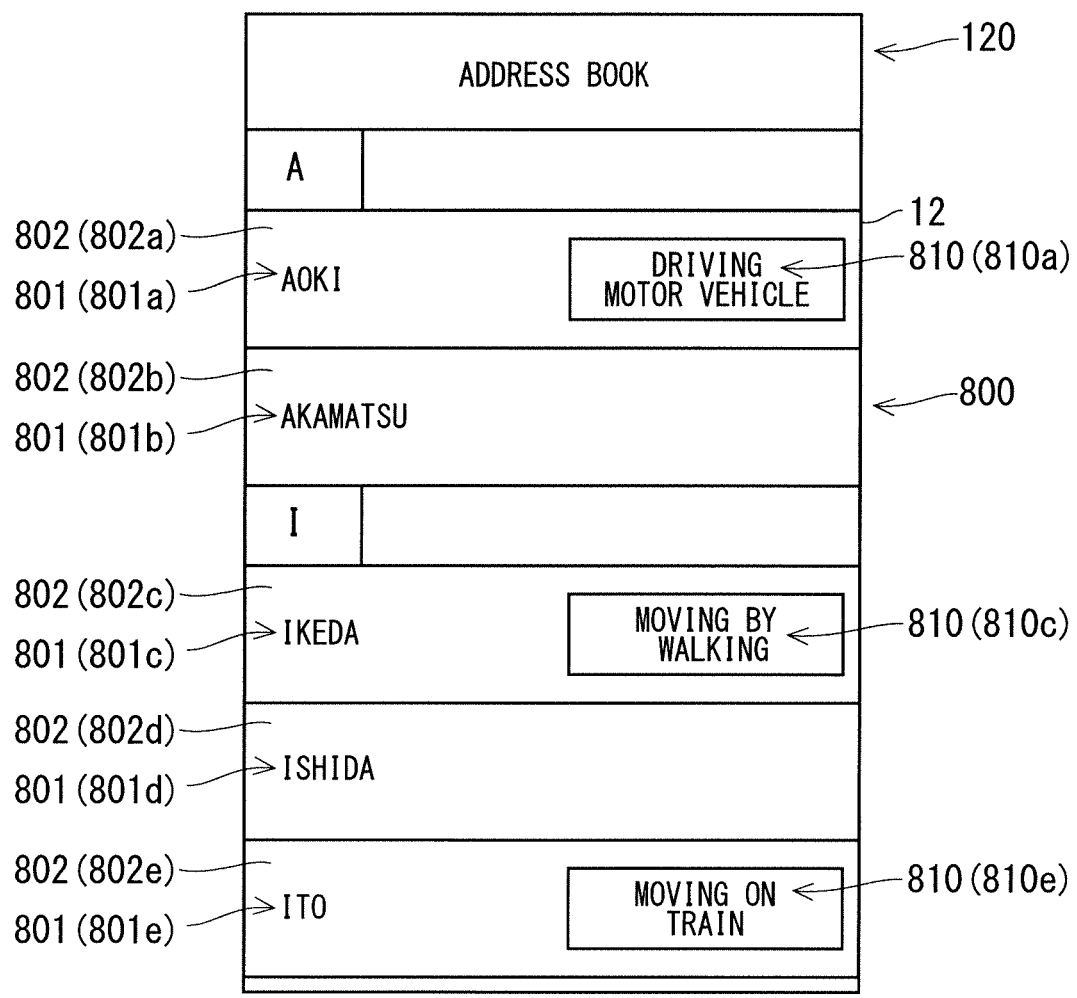
FIG. 30 is a diagram illustrating one example of display of the electronic apparatus.

FIG. 30 is a diagram illustrating one example of a display screen 800 that is displayed on the display surface 12 when the target electronic apparatus 10 displays the address book. The address book includes information related to each electronic apparatus 10 registered in the address book. The information related to the electronic apparatus 10 registered in the address book may be hereinafter referred to as "address registered information".

The address registered information includes names 801 of users of the electronic apparatuses 10, telephone numbers assigned to the electronic apparatuses 10, electronic mail addresses assigned to the electronic apparatuses 10, etc. In one example of FIG. 30, of the address registered information, only the names 801 of the users of the electronic apparatuses 10 (hereinafter referred to as "user names 801") are shown on the display screen 800. In other words, the display screen 800 shows a list of a plurality of user names 801 included in the address book. FIG. 30 illustrates a plurality of user names 801a to 801e included in the address book.

The display screen 800 comprises a plurality of name bars 802 in which respective ones of the plurality of user names 801 included in the address registered information are shown. FIG. 30 illustrates a plurality of name bars 802a to 802e in which respective one of the plurality of user names 801a to 801e included in the address book are shown. For example, when a tap operation is performed on one of the name bars 802 including a certain user name 801, the controller 100 of the target electronic apparatus 10 causes the display 120 to display details of the address registered information including the certain user name 801. For example, the controller 100 causes the display 120 to display the telephone number, the electronic mail address, etc. included in the address registered information. When the user of the target electronic apparatus 10 performs a predetermined operation on the display surface 12 while the display 120 displays the telephone number included in the address registered information, the user can input a place call command of phone communication with the electronic apparatus 10 assigned the telephone number to the target electronic apparatus 10.

When the controller 100 of the target electronic apparatus 10 causes the display 120 to display the address registered information of a certain electronic apparatus 10 in Step s104, the controller 100 also causes the display 120 to display information 810 indicating the current movement state of the user of the certain electronic apparatus 10. In one example of FIG. 30, the information 810 indicating the current movement state of the user of the electronic apparatus 10 is displayed as well as the user name 801 included in the address registered information of the electronic apparatus 10. The information 810 indicating the current movement state of the user of the electronic apparatus 10 is, for example, shown in the name bar 802 that shows the user name 801 of the electronic apparatus 10. The controller 100 can determine the current movement state of the user of the electronic apparatus 10, based on the movement information acquired in Step s103 that is included in the apparatus information of the electronic apparatus 10.

Here, in one example, when the controller 100 of the electronic apparatus 10 determines that the movement state of the user is the walking state, the controller 100 generates movement information indicating that the movement state of the user is the walking state. Here, in one example, when the controller 100 of the electronic apparatus 10 determines that the movement state of the user is the walking state, the controller 100 generates movement information indicating that the movement state of the user is the walking state.

In one example of FIG. 30, in the name bar 802a showing the user name 801a "Aoki", information 810a indicating that the current movement state of the user having the user name 801a is the motor vehicle driving state. Further, in the name bar 802c showing the user name 801c "Ikeda", information 810c indicating that the current movement state of the user having the user name 801c is the walking state. Further, in the name bar 802d showing the user name 801d "Ito", information 810e indicating that the current movement state of the user having the user name 801d is the train movement state.

Note that, in one example of FIG. 30, the apparatus information of the electronic apparatus 10 of the user having the user name 801b "Akamatsu" acquired in Step s103 does not include the movement information, and thus the information 810 is not shown in the name bar 802b. Similarly, the apparatus information of the electronic apparatus 10 of the user having the user name 801d "shida" acquired in Step s103 does not include the movement information, and thus the information 810 is not shown in the name bar 802d.

In this manner, with the target electronic apparatus 10 also displaying information indicating the current movement states of the users of other electronic apparatuses 10 when the target electronic apparatus 10 displays information related to the other electronic apparatuses 10 included in the address book, the user of the target electronic apparatus 10 can check the current movement states of the users of the other electronic apparatuses 10 as well as the information related to the other electronic apparatuses 10 included in the address book. As a result, convenience of the electronic apparatus 10 is enhanced.

Note that, when the target electronic apparatus 10 displays the information related to the other electronic apparatuses 10 included in an outgoing phone call history being a type of a call history, the target electronic apparatus 10 may also display information indicating the current movement states of the users of the other electronic apparatuses 10. Operation of the target electronic apparatus 10 in the above-mentioned case will be described below with reference to FIG. 29.

In Step s101 of FIG. 29, in the target electronic apparatus 10, the touch panel 130 detects an operation commanding a display of the outgoing phone call history. Next, Step s102 described above is executed. After Step s102, in Step s103, when the target electronic apparatus 10 acquires the apparatus information of each electronic apparatus 10 other than the subject apparatus registered in the address book, in Step s104, the controller 100 causes the display 120 to display the outgoing phone call history.

FIG. 31 is a diagram illustrating one example of a display screen 820 that is displayed on the display surface 12 when the target electronic apparatus 10 displays the outgoing phone call history. The outgoing phone call history comprises, regarding each of the electronic apparatuses 10 of previous outgoing phone call destinations, outgoing call information 821 indicating outgoing phone call placed to the electronic apparatus 10. The outgoing call information 821 comprises, for example, a name 822 of a user of an electronic apparatus 10 as an outgoing call destination, and outgoing call date and time 823. FIG. 31 illustrates a plurality of pieces of outgoing call information 821a to 821c. Regarding the outgoing call information 821 indicating an outgoing phone call placed to an electronic apparatus 10, the electronic apparatus 10 may be hereinafter referred to as an electronic apparatus 10 corresponding to the outgoing call information 821.

The outgoing call information 821 comprises first outgoing call information 821 and second outgoing call information 821. The first outgoing call information 821 is the outgoing call information 821 indicating an outgoing phone call of a case where another electronic apparatus 10 answered an incoming call corresponding to the outgoing phone call placed to the another electronic apparatus 10 by the target electronic apparatus 10. The second outgoing call information 821 is the outgoing call information 821 indicating an outgoing phone call of a case where another electronic apparatus 10 did not answer an incoming call corresponding to the outgoing phone call placed to the another electronic apparatus 10 by the target electronic apparatus 10. The first outgoing call information 821 may be hereinafter referred to as "answered outgoing call information 821", and the second outgoing call information 821 may be hereinafter referred to as "unanswered outgoing call information 821".

When the outgoing call information 821 is the unanswered outgoing call information 821, the outgoing call information 821 includes information 824 indicating that the outgoing call information 821 is the unanswered outgoing call information 821. In one example of FIG. 31, the outgoing call information 821b is the unanswered outgoing call information 821b, and the outgoing call information 821b includes the information 824. The pieces of outgoing call information 821a and 821c are each the answered outgoing call information 821.

The display screen 820 comprises a plurality of information bars 825 in which respective ones of the plurality of pieces of outgoing call information 821 are shown FIG. 31 illustrates a plurality of information bars 825a to 825c in which respective ones of the plurality of pieces of outgoing call information 821a to 821c are shown. For example, when the user of the target electronic apparatus 10 performs a tap operation on one of the information bars 825, the user can input a place call command of phone communication with the electronic apparatus 10 corresponding to the outgoing call information 821 included in the information bar 825 to the target electronic apparatus 10.

When the controller 100 of the target electronic apparatus 10 causes the display 120 to display the outgoing call information 821 included in the outgoing phone call history in Step s104, the controller 100 also causes the display 120 to display information 830 indicating the current movement state of the user of the electronic apparatus 10 corresponding to the outgoing call information 821. As illustrated in FIG. 31, the information 830 indicating the current movement state of the user of the electronic apparatus 10 is, for example, shown in the information bar 825 that shows the outgoing call information 821 indicating an outgoing phone call placed to the electronic apparatus 10. The controller 100 can determine the current movement state of the user of the electronic apparatus 10, based on the movement information acquired in Step s103 that is included in the apparatus information of the electronic apparatus 10.

In one example of FIG. 31, the information bar 825a showing the outgoing call information 821a shows information 830a indicating that the current movement state of the user of the electronic apparatus 10 corresponding to the outgoing call information 821a is the motor vehicle driving state. Note that, in one example of FIG. 31, the apparatus information of the electronic apparatus 10 corresponding to the outgoing call information 821b acquired in Step s103 does not include the movement information, and thus the information 830 is not shown in the information bar 825b. Similarly, the apparatus information of the electronic apparatus 10 corresponding to the outgoing call information 821c acquired in Step s103 does not include the movement information, and thus the information 830 is not shown in the information bar 825c.

In this manner, with the target electronic apparatus 10 also displaying information of the current movement states of the users of other electronic apparatuses 10 when the target electronic apparatus 10 displays information (i.e., the outgoing call information 821) related to the other electronic apparatuses 10 included in the outgoing phone call history (i.e., the call history), the user of the target electronic apparatus 10 can check the current movement states of the users of the other electronic apparatuses 10 as well as the information related to the other electronic apparatuses 10 included in the outgoing phone call history. As a result, convenience of the electronic apparatus 10 is enhanced.

Note that, when the target electronic apparatus 10 displays the information related to the other electronic apparatuses 10 included in an incoming phone call history being a type of a call history, the target electronic apparatus 10 may also display information indicating the current movement states of the users of the other electronic apparatuses 10. Operation of the target electronic apparatus 10 in the above-mentioned case will be described below with reference to FIG. 29.

In Step s101 of FIG. 29, in the target electronic apparatus 10, the touch panel 130 detects an operation commanding a display of the incoming phone call history. Next, Step s102 described above is executed. After Step s102, in Step s103, when the target electronic apparatus 10 acquires the apparatus information of each electronic apparatus 10 other than the subject apparatus registered in the address book, in Step s104, the controller 100 causes the display 120 to display the incoming phone call history.

FIG. 32 is a diagram illustrating one example of a display screen 840 that is displayed on the display surface 12 when the target electronic apparatus 10 displays the incoming phone call history. The incoming phone call history comprises, regarding each of the each electronic apparatuses 10 from which the target electronic apparatus 10 have previously received incoming phone calls, incoming call information 841 indicating incoming phone calls from the electronic apparatuses 10. The incoming call information 841 comprises, for example, names 842 of users of the electronic apparatuses 10 from which incoming phone calls are received, and incoming phone call date and time 843. FIG. 32 illustrates a plurality of pieces of incoming call information 841a to 841c. Regarding the incoming call information 841 indicating an incoming phone call from an electronic apparatus 10, the electronic apparatus 10 may be hereinafter referred to as an electronic apparatus 10 corresponding to the incoming call information 841.

The incoming call information 841 comprises first incoming call information 841 and second incoming call information 841. The first incoming call information 841 is the incoming call information 841 indicating an incoming phone call of a case where the target electronic apparatus 10 answered the incoming phone call from another electronic apparatus 10. The second incoming call information 841 is information indicating an incoming phone call of a case where the target electronic apparatus 10 did not answer the incoming phone call from another electronic apparatus 10. The first incoming call information 841 may be referred to as "answered incoming call information 841", and the second incoming call information 841 may be referred to as "missed call information 841". It can also be said that the missed call information 841 is unanswered incoming call information 841.

When the incoming call information 841 is the missed call information 841, the incoming call information 841 includes information 844 indicating that the incoming call information 841 is the missed call information 841. In one example of FIG. 32, the incoming call information 841a is the missed call information 841a, and the incoming call information 841a includes the information 844. The pieces of incoming call information 841b and 841c are each the answered incoming call information 841.

The display screen 840 comprises a plurality of information bars 845 in which respective ones of the plurality of pieces of incoming call information 841 are shown FIG. 32 illustrates a plurality of information bars 845a to 845c in which respective ones of the plurality of pieces of incoming call information 841a to 841c are shown. For example, when the user of the target electronic apparatus 10 performs a tap operation on one of the information bars 845, the user can input a place call command of phone communication with the electronic apparatus 10 corresponding to the incoming call information 841 included in the information bar 845 to the target electronic apparatus 10.

When the controller 100 of the target electronic apparatus 10 causes the display 120 to display the incoming call information 841 included in the incoming phone call history in Step s104, the controller 100 also causes the display 120 to display information 850 indicating the current movement state of the user of the electronic apparatus 10 corresponding to the incoming call information 841. As illustrated in FIG. 32, the information 850 indicating the current movement state of the user of the electronic apparatus 10 is, for example, shown in the information bar 845 that shows the incoming call information 841 indicating an incoming phone call from the electronic apparatus 10. The controller 100 can determine the current movement state of the user of the electronic apparatus 10, based on the movement information acquired in Step s103 that is included in the apparatus information of the electronic apparatus 10.

In one example of FIG. 32, the information bar 845c showing the incoming call information 841c shows information 850c indicating that the current movement state of the user of the electronic apparatus 10 corresponding to the incoming call information 841c is the running state. Note that, in one example of FIG. 32, the apparatus information of the electronic apparatus 10 corresponding to the incoming call information 841a acquired in Step s103 does not include the movement information, and thus the information 850 is not shown in the information bar 845a. Similarly, the apparatus information of the electronic apparatus 10 corresponding to the incoming call information 841b acquired in Step s103 does not include the movement information, and thus the information 850 is not shown in the information bar 845b.

In this manner, with the target electronic apparatus 10 also displaying information of the current movement states of the users of other electronic apparatuses 10 when the target electronic apparatus 10 displays information (i.e., the incoming call information 841) related to the other electronic apparatuses 10 included in the incoming phone call history (i.e., the call history), the user of the target electronic apparatus 10 can check the current movement states of the users of the other electronic apparatuses 10 as well as the information related to the other electronic apparatuses 10 included in the incoming phone call history. As a result, convenience of the electronic apparatus 10 is enhanced.

Figure 33:
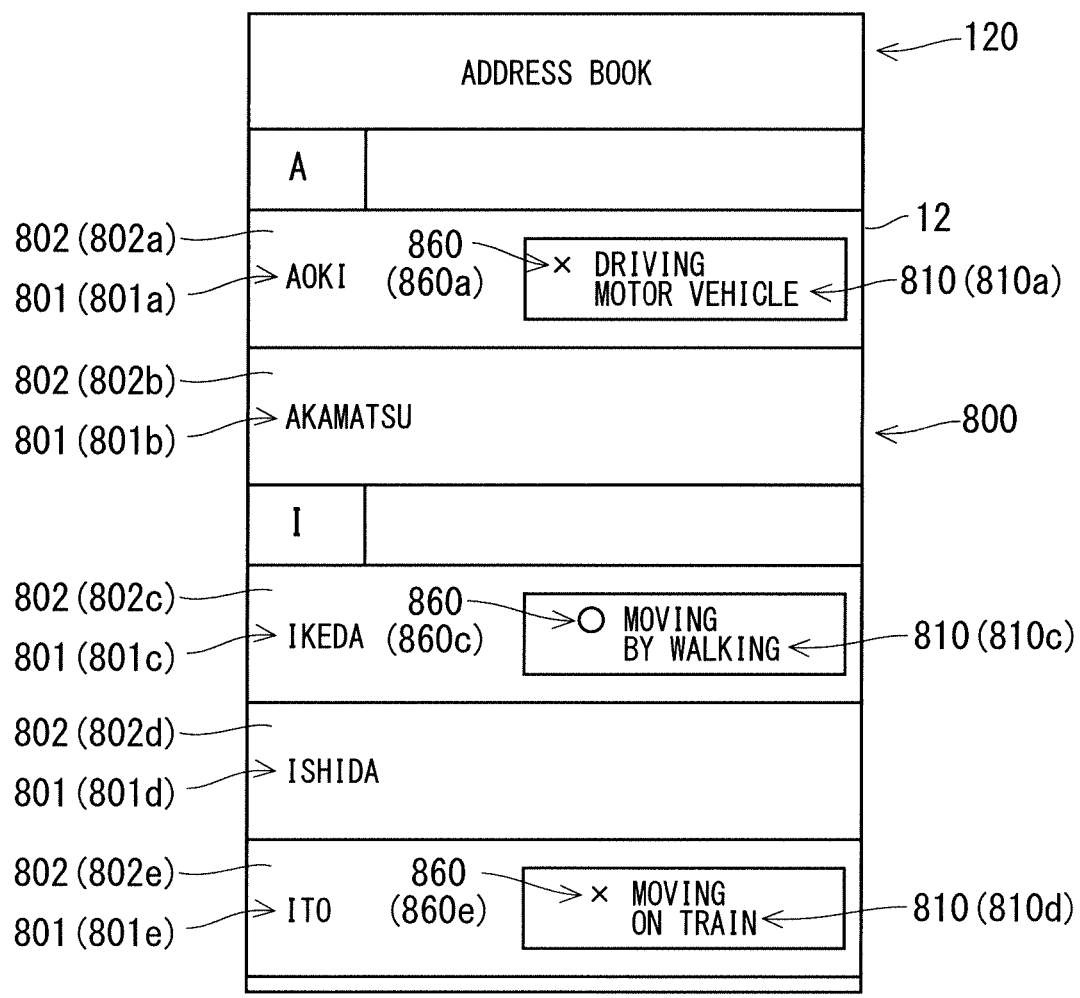
FIG. 33 is a diagram illustrating one example of display of the electronic apparatus.

Note that, when the target electronic apparatus 10 displays the information indicating the current movement states of the users of the other electronic apparatuses 10 as well as the address book etc., the target electronic apparatus 10 may perform estimation processing of estimating whether or not each of the other electronic apparatuses 10 will answer an incoming call of phone communication with the target electronic apparatus 10. Further, the target electronic apparatus 10 may display estimation results information 860 indicating results of the estimation processing as well as the information indicating the current movement state of the user of the electronic apparatus 10. FIG. 33 is a diagram illustrating one example of the display screen 800 described above in the above-mentioned case.

The estimation results information 860 is, for example, represented by a circle or a cross. The estimation results information 860 regarding the electronic apparatus 10 represented by a circle indicates that the electronic apparatus 10 will probably answer an incoming call of phone communication with the target electronic apparatus 10. In contrast, the estimation results information 860 regarding the electronic apparatus 10 represented by a cross indicates that the electronic apparatus 10 will not probably answer an incoming call of phone communication with the target electronic apparatus 10.

In Step s104, the controller 100 of the target electronic apparatus 10 performs the estimation processing of estimating whether or not the electronic apparatus 10 will answer an incoming call of phone communication with the target electronic apparatus 10, based on the movement information included in the apparatus information of the electronic apparatus 10 acquired in Step s103. For example, when the movement information of the electronic apparatus 10 indicates the walking state, the controller 100 estimates that the electronic apparatus 10 will answer an incoming call of phone communication with the target electronic apparatus 10. Further, when the movement information of the electronic apparatus 10 is the running state, the controller 100 estimates that the electronic apparatus 10 will answer an incoming call of phone communication with the target electronic apparatus 10. In contrast, when the movement information of the electronic apparatus 10 indicates the bicycle movement state, the controller 100 estimates that the electronic apparatus 10 will not answer an incoming call of phone communication with the target electronic apparatus 10. Further, when the movement information of the electronic apparatus 10 indicates the train movement state, the controller 100 estimates that the electronic apparatus 10 will not answer an incoming call of phone communication with the target electronic apparatus 10. Further, when the movement information of the electronic apparatus 10 indicates the motor vehicle driving state, the controller 100 estimates that the electronic apparatus 10 will not answer an incoming call of phone communication with the target electronic apparatus 10. Further, when the movement information of the electronic apparatus 10 indicates the another vehicle movement state, the controller 100 estimates that the electronic apparatus 10 will not answer an incoming call of phone communication with the target electronic apparatus 10. In Step s104, the controller 100 causes the display 120 to display the address book etc., the information indicating the current movement state of the user of the electronic apparatus 10, and the estimation results information 860 regarding the electronic apparatus 10.

In one example of FIG. 33, the name bar 802a showing the user name 801a of a certain electronic apparatus 10 shows estimation results information 860a indicating that the certain electronic apparatus 10 will not answer the incoming call of phone communication with the target electronic apparatus 10. Further, the name bar 802c showing the user name 801c of a certain electronic apparatus 10 shows estimation results information 860c indicating that the certain electronic apparatus 10 will answer an incoming call of phone communication with the target electronic apparatus 10. Further, the name bar 802e showing the user name 801e of a certain electronic apparatus 10 shows estimation results information 860e indicating that the certain electronic apparatus 10 will not answer an incoming call of phone communication with the target electronic apparatus 10.

Note that the estimation results information 860 may be shown on the display screen 820 illustrated in FIG. 31 described above. Further, the estimation results information 860 may be shown on the display screen 840 illustrated in FIG. 32 described above.

In this manner, with the target electronic apparatus 10 displaying the estimation results information 860, the user of the target electronic apparatus 10 can check whether or not other electronic apparatuses 10 will answer an incoming call of phone communication with the target electronic apparatus 10. As a result, convenience of the electronic apparatus 10 is enhanced.

Note that, when the target electronic apparatus 10 executes a series of processing illustrated in FIG. 29 described above, the target electronic apparatus 10 may execute Step s14 instead of Steps s2 to s4 in FIG. 7 described above. In other words, the target electronic apparatus 10 may unconditionally place an outgoing phone call in response to an input place call command. Further, when the target electronic apparatus 10 executes a series of processing illustrated in FIG. 29, Step s14 may be executed instead of Step s4 in FIG. 9 described above.

Further, when the target electronic apparatus 10 displays the outgoing call information 821 (i.e., the unanswered outgoing call information 821) indicating an outgoing phone call included in the outgoing phone call history in a case where the other-party apparatus 10 did not answer an incoming call corresponding to the outgoing phone call placed to the other-party apparatus 10 by the subject apparatus, the target electronic apparatus 10 may display information 900 indicating the movement state of the other-party user when the other-party apparatus 10 did not answer the incoming call, instead of the information 830 described above. FIG. 34 is a diagram illustrating a display example of the information 900.

In one example illustrated in FIG. 34, the information bar 825b showing the unanswered outgoing call information 821b shows information 900b regarding the electronic apparatus 10 corresponding to the unanswered outgoing call information 821b. The information 900b indicates that the movement state of the user of the electronic apparatus 10 when the electronic apparatus 10 corresponding to the unanswered outgoing call information 821b did not answer an incoming call corresponding to an outgoing call indicated by the unanswered outgoing call information 821b is the train movement state.

In this manner, if the target other-party apparatus 10 did not answer an incoming call corresponding to an outgoing phone call of Step s14, Step s13, or Step s22 described above (see FIGS. 10 and 16 and other figures), for example, when the electronic apparatus 10 displays the unanswered outgoing call information 821 and the information 900, the controller 100 of the command-received apparatus 10 uses the movement state determined in Step s12 as the movement state of the target other-party user when the target other-party apparatus 10 did not answer the incoming call.

For example, it is assumed that the movement state of the target other-party user is determined as the train movement state in Step s12 of the flowchart illustrated in FIG. 10. In this case, if the target other-party apparatus 10 did not answer an incoming call corresponding to an outgoing phone call of Step s14 after Step s12, the controller 100 determines that the movement state of the target other-party user when the target other-party apparatus 10 did not answer the incoming call is the train movement state. When the controller 100 displays the outgoing call information 821 indicating the outgoing phone call of Step s14 on the display 120, the controller 100 causes the display 120 to display the information 900, such as the information 900b of FIG. 34, indicating that the movement state of the target other-party user is the train movement state.

In another example, it is assumed that the movement state of the target other-party user is determined as the motor vehicle driving state in Step s12 of the flowchart illustrated in FIG. 10. In this case, if the target other-party apparatus 10 did not answer an incoming call corresponding to an outgoing phone call of Step s13 after Step s12, the controller 100 determines that the movement state of the target other-party user when the target other-party apparatus 10 did not answer the incoming call is the motor vehicle driving state. When the controller 100 displays the outgoing call information 821 indicating the outgoing phone call of Step s13 on the display 120, the controller 100 causes the display 120 to display the information 900 indicating that the movement state of the target other-party user is the motor vehicle driving state.

In another example, it is assumed that the movement state of the target other-party user is determined as the bicycle movement state in Step s12 of the flowchart illustrated in FIG. 16. In this case, if the target other-party apparatus 10 did not answer an incoming call corresponding to an outgoing phone call of Step s22 after Step s12, the controller 100 determines that the movement state of the target other-party user when the target other-party apparatus 10 did not answer the incoming call is the bicycle movement state. When the controller 100 displays the outgoing call information 821 indicating the outgoing phone call of Step s22 on the display 120, the controller 100 causes the display 120 to display the information 900 indicating that the movement state of the target other-party user is the bicycle movement state.

Note that, when the target electronic apparatus 10 displays the unanswered outgoing call information 821 and the information 900, Step s13 need not be executed in the flowchart illustrated in FIG. 10 described above. In this case, in Step s12, when the movement state of the target other-party user is determined, Step s14 is executed regardless of the determined movement state.

Further, when the target electronic apparatus 10 displays the unanswered outgoing call information 821 and the information 900, the target electronic apparatus 10 may or may not display the information 830 when the target electronic apparatus 10 displays the answered outgoing call information 821.

In this manner, with the target electronic apparatus 10 displaying the information 900, the user of the target electronic apparatus 10 can check the movement state of the other-party user when the other-party apparatus 10 did not answer an incoming call corresponding to an outgoing phone call placed to the other-party apparatus 10 by the target electronic apparatus 10. As a result, convenience of the electronic apparatus 10 is enhanced.

Figure 35:
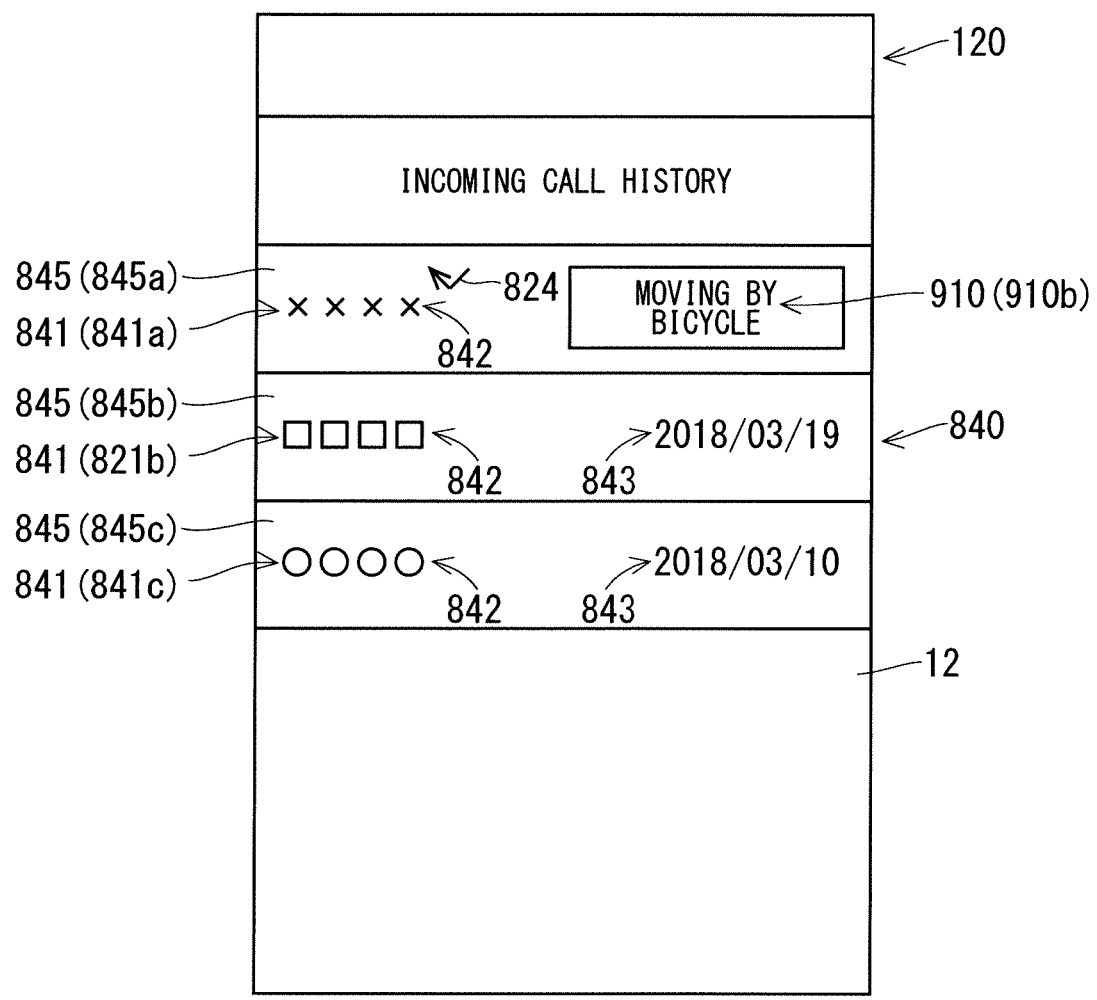
FIG. 35 is a diagram illustrating one example of display of the electronic apparatus.

When the target electronic apparatus 10 displays the incoming call information 841 (i.e., the missed call information 841) indicating an incoming call included in the incoming phone call history in a case where the target electronic apparatus 10 did not answer the incoming call corresponding to an outgoing phone call from the other-party apparatus 10, the target electronic apparatus 10 may display information 910 indicating the movement state of subject apparatus user when the subject apparatus did not answer the incoming call, instead of the information 850 described above. FIG. 35 is a diagram illustrating a display example of the information 910.

In one example illustrated in FIG. 35, the information bar 845a showing the missed call information 841a shows information 910a indicating the movement state of the user of the target electronic apparatus 10 when the target electronic apparatus 10 did not answer an incoming call indicated by the missed call information 841a. The information 910a indicates that the movement state of the user of the target electronic apparatus 10 when the target electronic apparatus 10 did not answer the incoming call indicated by the missed call information 841a is the bicycle movement state.

In this manner, when the electronic apparatus 10 displays the missed call information 841 and the information 910 and the subject apparatus did not answer an incoming call corresponding to an outgoing phone call from the other-party apparatus 10, the controller 100 determines the movement state of subject apparatus user, based on the acceleration detection results etc. of the subject apparatus as described above. Further, the controller 100 uses the determined movement state as the movement state of subject apparatus user when the subject apparatus did not answer the incoming call corresponding to the outgoing phone call from the other-party apparatus 10.

Note that, when the target electronic apparatus 10 displays the missed call information 841 and the information 910, Step s14 may be executed instead of Steps s2 to s4 in FIG. 7 described above, and Step s14 may be executed instead of Step s4 in FIG. 9 described above.

Further, when the target electronic apparatus 10 displays the missed call information 841 and the information 910, the target electronic apparatus 10 may or may not display the information 850 when the target electronic apparatus 10 displays the answered incoming call information 841.

In this manner, with the target electronic apparatus 10 displaying the information 910, the user of the target electronic apparatus 10 can check the movement state of the user when the target electronic apparatus 10 did not answer the incoming call corresponding to the outgoing phone call from the other-party apparatus 10. As a result, convenience of the electronic apparatus 10 is enhanced.

In various examples described above, the electronic apparatus 10 determines the movement state of subject apparatus user. However, the server apparatus 50 may determine the movement state of the user of the electronic apparatus 10. In this case, the electronic apparatus 10 transmits apparatus information including information necessary for another apparatus to determine the movement state of subject apparatus user to the server apparatus 50. For example, the electronic apparatus 10 transmits apparatus information including the acceleration detection results, the position information acquired from the position acquisition unit 140, and the engine operation history to the server apparatus 50. In the server apparatus 50, the controller 51 determines the movement state of the user of the electronic apparatus 10 as described above, based on the apparatus information from the electronic apparatus 10 and the map information in the storage 53. Then, the controller 51 includes the movement information indicating the determined movement state of the user of the electronic apparatus 10 in the apparatus information of the electronic apparatus 10 and stores the apparatus information in the storage 53. In this manner, the apparatus information of a certain electronic apparatus 10 in the storage 53 of the server apparatus 50 includes the movement information indicating the movement state of the user of the certain electronic apparatus 10.

Further, the electronic apparatus 10 may determine the movement state of the user of another electronic apparatus 10. In this case, similarly to the above, the electronic apparatus 10 transmits apparatus information including information necessary for the another apparatus to determine the movement state of subject apparatus user to the server apparatus 50. The server apparatus 50 directly stores the apparatus information received from the electronic apparatus 10 in the storage 53. When the electronic apparatus 10 acquires the apparatus information of the another electronic apparatus 10 from the server apparatus 50, the electronic apparatus 10 determines the movement state of the user of the another electronic apparatus 10, based on the acquired apparatus information and the map information 103b in the storage 103. For example, in Step s11, Step s21, or Step s31 described above or in other steps, the controller 100 of the electronic apparatus 10 determines the movement state of the user of the another electronic apparatus 10, based on the apparatus information of the another electronic apparatus 10 and the map information 103b in the storage 103.

While the processing system 1 has been shown and described in detail, the foregoing description is in all aspects illustrative, and the present disclosure is not limited to the foregoing description. Further, various modifications described above are applicable in combination as long as such combination remains consistent. It is therefore understood that numerous unillustrated modifications and variations can be devised without departing from the scope of the present disclosure.

The invention claimed is:

1. An electronic apparatus to be operated by a first user, the electronic apparatus comprising:
    a communication unit configured to acquire first information related to an other-party apparatus; and
    at least one processor configured to determine a movement state of a second user of the other-party apparatus, based on the first information, wherein
    the at least one processor performs processing based on the determined movement state, in response to a place call command from the first user regarding first phone communication with the other-party apparatus, and
    when the determined movement state is a state in which the second user is moving on their own without riding a vehicle, a state in which the second user is moving by riding a bicycle, or the state in which the second user is moving by driving a motor vehicle, in the processing, the at least one processor controls the other-party apparatus so that a handsfree apparatus for phone communication gives an incoming call notification of the first phone communication based on control of the other-party apparatus.

2. The electronic apparatus according to claim 1, wherein in the processing, the at least one processor controls an incoming call notification of the first phone communication of the other-party apparatus, according to the determined movement state.

3. The electronic apparatus according to claim 2, wherein when the determined movement state is a first movement state corresponding to the state in which the second user is moving on their own without riding a vehicle, a second movement state corresponding to the state in which the second user is moving by riding a bicycle, or a third movement state corresponding to the state in which the second user is moving by driving a vehicle, in the processing, the at least one processor controls the other-party apparatus so that the other-party apparatus does not output a ringtone for the first phone communication.

4. The electronic apparatus according to claim 3, wherein when the determined movement state is the first movement state, the second movement state, or the third movement state, in the processing, the at least one processor controls the other-party apparatus so that the other-party apparatus does not perform vibration for the incoming call notification of the first phone communication.

5. The electronic apparatus according to claim 3, wherein when the other-party apparatus receives an outgoing call of the first phone communication placed by the electronic apparatus, in the processing, the at least one processor controls operation of the electronic apparatus so that the electronic apparatus stops the outgoing call.

6. The electronic apparatus according to claim 5, when the other-party apparatus determines that the first movement state, the second movement state, or the third movement state has finished, in the processing, the at least one processor controls the other-party apparatus so that the other-party apparatus notifies the electronic apparatus that the first movement state, the second movement state, or the third movement state has finished.

7. The electronic apparatus according to claim 1, wherein when the determined movement state is the state in which the second user is moving by driving a motor vehicle, in the processing, the at least one processor controls operation of the electronic apparatus so that the electronic apparatus determines an apparatus other than the other-party apparatus being present in the motor vehicle and capable of phone communication and places an outgoing call of second phone communication to the determined apparatus.

8. The electronic apparatus according to claim 1, wherein in the processing, the at least one processor determines which of the first phone communication and message communication is to be performed by the electronic apparatus, according to the determined movement state.

9. The electronic apparatus according to claim 8, wherein when the determined movement state is a state in which the second user is moving by riding a train, in the processing, the at least one processor determines execution of the message communication, and executes an application for the message communication.

10. The electronic apparatus according to claim 9, wherein when the at least one processor determines that the second user has alighted from the train based on the first information while the electronic apparatus displays a create message screen of the application, the at least one processor controls operation of the electronic apparatus so that the electronic apparatus places an outgoing call of second phone communication with the other-party apparatus.

11. The electronic apparatus according to claim 9, further comprising
a notification unit configured to give a notification to the first user, wherein
when the at least one processor determines that the second user has alighted from the train based on the first information while the electronic apparatus displays a create message screen of the application, the at least one processor controls causes the notification unit to give a notification suggesting that the first user make a selection as to whether or not the electronic apparatus places an outgoing call of second phone communication with the other-party apparatus.

12. The electronic apparatus according to claim 1, wherein
the electronic apparatus and the other-party apparatus are capable of communicating with each other with voice/message converted communication in which first voice of the first user input to the electronic apparatus is converted into a first message, the first message is displayed on the other-party apparatus, a second message to be transmitted by the other-party apparatus is converted into a second voice, and the second voice is output from the electronic apparatus, and
when the determined movement state is a state in which the second user is moving by riding a train, in the processing, the at least one processor determines execution of the voice/message converted communication.

13. The electronic apparatus according to claim 1, further comprising
a notification unit configured to give a notification to the first user, wherein
the at least one processor causes the notification unit to give a notification about the determined movement state during an outgoing call of phone communication with the other-party apparatus.

14. The electronic apparatus according to claim 1, further comprising
a display, wherein
the at least one processor causes the display to display third information indicating the current movement state as well as second information related to the other-party apparatus included in an address book or a call history.

15. The electronic apparatus according to claim 14, wherein
the at least one processor performs estimation processing of estimating whether or not the other-party apparatus is able to answer an incoming call of phone communication with the electronic apparatus, based on the movement state, and
the at least one processor causes the display to display fourth information indicating results of the estimation processing as well as the second and third information.

16. The electronic apparatus according to claim 1, further comprising
a display, wherein
the at least one processor causes the display to display second information indicating the movement state when the other-party apparatus does not answer an incoming call as well as outgoing call information indicating an outgoing call included in a call history when the other-party apparatus does not answer the incoming call corresponding to the outgoing call of phone communication placed to the other-party apparatus by the electronic apparatus.

17. An electronic apparatus is the other-party apparatus with which the electronic apparatus according to claim 1 is capable of communicating.

18. A processing system comprising:
- the electronic apparatus according to claim 1; and
- the other-party apparatus with which the electronic apparatus is capable of communicating.

19. A method for controlling an electronic apparatus to be operated by a first user, the method comprising:
- acquiring, by a communication unit, first information related to an other-party apparatus;
- determining, by at least one processor, a movement state of a second user of the other-party apparatus, based on the first information; and
- performing, by the at least one processor, processing based on the determined movement state, in response to a place call command from the first user regarding first phone communication with the other-party apparatus, such that when the determined movement state is a state in which the second user is moving on their own without riding a vehicle, a state in which the second user is moving by riding a bicycle, or the state in which the second user is moving by driving a motor vehicle, in the processing, the at least one processor controls the other-party apparatus so that a handsfree apparatus for phone communication gives an incoming call notification of the first phone communication based on control of the other-party apparatus.

* * * * *